US008454433B2

(12) United States Patent
Okada et al.

(10) Patent No.: US 8,454,433 B2
(45) Date of Patent: Jun. 4, 2013

(54) READ/WRITE DEVICE FOR INFORMATION DATA STORAGE MEDIUM

(75) Inventors: Kazuo Okada, Tokyo (JP); Jun Fujimoto, Tokyo (JP)

(73) Assignees: Universal Entertainment Corporation, Tokyo (JP); Aruze Gaming America, Inc., Las Vegas, NV (US)

( * ) Notice: Subject to any disclaimer, the term of this patent is extended or adjusted under 35 U.S.C. 154(b) by 0 days.

(21) Appl. No.: 13/322,858

(22) PCT Filed: Oct. 7, 2009

(86) PCT No.: PCT/JP2009/067484

§ 371 (c)(1),
(2), (4) Date: Nov. 28, 2011

(87) PCT Pub. No.: WO2010/137187

PCT Pub. Date: Dec. 2, 2010

(65) Prior Publication Data

US 2012/0115586 A1 May 10, 2012

(30) Foreign Application Priority Data

May 29, 2009 (JP) ................................ 2009-131057
Aug. 21, 2009 (JP) ................................ 2009-191729

(51) Int. Cl.
*A63F 9/24* (2006.01)
*A63F 13/00* (2006.01)

(52) U.S. Cl.
USPC .................. 463/25; 463/16; 463/20; 463/29; 463/42; 273/138.1; 273/138.2; 273/143 R

(58) Field of Classification Search
USPC ................ 463/16, 20, 25, 29, 42; 273/138.1, 273/138.2, 143 R; 340/825.33
See application file for complete search history.

(56) References Cited

U.S. PATENT DOCUMENTS

| | | | | |
|---|---|---|---|---|
| 4,420,751 | A * | 12/1983 | Paganini et al. | 705/43 |
| 5,735,742 | A * | 4/1998 | French | 463/25 |
| 5,833,540 | A * | 11/1998 | Miodunski et al. | 463/42 |
| 6,409,595 | B1 * | 6/2002 | Uihlein et al. | 463/29 |
| 7,004,385 | B1 * | 2/2006 | Douglass | 235/379 |
| 7,118,478 | B2 | 10/2006 | Fayter et al. | |
| 7,347,377 | B2 * | 3/2008 | Kitazawa | 235/475 |
| 2003/0083127 | A1 * | 5/2003 | Weiss | 463/25 |
| 2005/0209008 | A1 * | 9/2005 | Shimizu et al. | 463/43 |
| 2006/0138241 | A1 * | 6/2006 | Kitazawa | 235/475 |
| 2007/0243932 | A1 * | 10/2007 | Rothschild et al. | 463/37 |
| 2008/0058065 | A1 | 3/2008 | Okada | |

FOREIGN PATENT DOCUMENTS

| | | |
|---|---|---|
| JP | 2006-304977 | 11/2006 |
| JP | 2008-062047 | 3/2008 |
| JP | 2008-299745 | 12/2008 |

* cited by examiner

*Primary Examiner* — Dmitry Suhol
*Assistant Examiner* — Ryan Hsu
(74) *Attorney, Agent, or Firm* — Lexyoume IP Meister, PLLC.

(57) ABSTRACT

A device for reading information data recording medium, which is capable of reducing failure to take an IC card that is ejected from a gaming machine, is provided.
When it is determined that the information data recording medium exists at an eject position and when it is determined that a player does not exist, the information data recording medium is carried from the eject position to a housing position by means of a carrying device.

3 Claims, 28 Drawing Sheets

FIG. 5

| | First video reel | Second video reel | Third video reel | Fourth video reel | Fifth video reel |
|---|---|---|---|---|---|
| Code number | Symbol | Symbol | Symbol | Symbol | Symbol |
| 00 | JACKPOT 7 | JACKPOT 7 | JACKPOT 7 | JACKPOT 7 | JACKPOT 7 |
| 01 | PLUM | BELL | CHERRY | ORANGE | APPLE |
| 02 | ORANGE | APPLE | ORANGE | PLUM | ORANGE |
| 03 | PLUM | BELL | APPLE | STRAWBERRY | BELL |
| 04 | ORANGE | CHERRY | ORANGE | BELL | PLUM |
| 05 | PLUM | ORANGE | PLUM | PLUM | BLUE 7 |
| 06 | ORANGE | PLUM | ORANGE | APPLE | ORANGE |
| 07 | PLUM | CHERRY | PLUM | BLUE 7 | APPLE |
| 08 | BLUE 7 | BELL | ORANGE | PLUM | PLUM |
| 09 | CHERRY | APPLE | PLUM | ORANGE | BELL |
| 10 | ORANGE | BELL | ORANGE | BELL | CHERRY |
| 11 | BELL | STRAWBERRY | PLUM | ORANGE | PLUM |
| 12 | ORANGE | PLUM | BELL | PLUM | BELL |
| 13 | STRAWBERRY | BLUE 7 | STRAWBERRY | CHERRY | ORANGE |
| 14 | BLUE 7 | BELL | BLUE 7 | APPLE | APPLE |
| 15 | ORANGE | APPLE | BELL | STRAWBERRY | PLUM |
| 16 | APPLE | BELL | CHERRY | CHERRY | CHERRY |
| 17 | PLUM | STRAWBERRY | PLUM | BELL | ORANGE |
| 18 | ORANGE | PLUM | ORANGE | PLUM | BELL |
| 19 | PLUM | CHERRY | PLUM | ORANGE | ORANGE |
| 20 | BLUE 7 | BELL | ORANGE | CHERRY | PLUM |
| 21 | CHERRY | APPLE | PLUM | PLUM | STRAWBERRY |

FIG. 7

Symbol combination table

| Combination of symbols | | | | | Number of payouts | Winning combination |
|---|---|---|---|---|---|---|
| First video reel | Second video reel | Third video reel | Fourth video reel | Fifth video reel | | |
| JACKPOT 7 | JACKPOT 7 | JACKPOT 7 | JACKPOT 7 | JACKPOT 7 | Amount of jackpot | Jackpot |
| APPLE | APPLE | APPLE | APPLE | APPLE | Bonus game※ | Bonus game trigger |
| BLUE 7 | BLUE 7 | BLUE 7 | BLUE 7 | BLUE 7 | 10 | BLUE |
| BELL | BELL | BELL | BELL | BELL | 8 | BELL |
| CHERRY | CHERRY | CHERRY | CHERRY | CHERRY | 5 | CHERRY 3 |
| STRAWBERRY | STRAWBERRY | STRAWBERRY | STRAWBERRY | STRAWBERRY | 5 | STRAWBERRY |
| PLUM | PLUM | PLUM | PLUM | PLUM | 4 | PLUM |
| ORANGE | ORANGE | ORANGE | ORANGE | ORANGE | 3 | ORANGE 3 |
| CHERRY | CHERRY | CHERRY | (ANY) | (ANY) | 2 | CHERRY 2 |
| ORANGE | ORANGE | ORANGE | (ANY) | (ANY) | 2 | ORANGE 2 |
| CHERRY | (ANY) | (ANY) | (ANY) | (ANY) | 1 | CHERRY 1 |
| ORANGE | (ANY) | (ANY) | (ANY) | (ANY) | 1 | ORANGE 1 |

※Free games of the number of times determined by lottery are conducted.

FIG. 22

| CARD ID | IMAGE RECORDING DATA |
| --- | --- |
| .... | ..... |
| .... | ..... |
| 001245 | 090715-131213-0012.avi |
| .... | ..... |
| .... | ..... |
| .... | ..... |

FIG. 24

| | |
|---|---|
| CARD ID (IDENTIFICATION INFORMATION) | 001245 |
| AMOUNT-OF-MONEY INFORMATION | 23.005 |
| TYPE OF ALERT | 2 |
| DATE AND TIME WHEN ALERT OCCURRED | 090715:131213 |
| MACHINE IDENTIFICATION NUMBER | 0012 |
| .... | ..... |
| .... | ..... |

READ/WRITE DEVICE FOR INFORMATION DATA STORAGE MEDIUM

TECHNICAL FIELD

The present invention relates to a reading device that can be employed in a gaming machine, and in particular, to a player tracking system.

BACKGROUND ART

In the United State casinos, a money exchange system called EZ PAY for making payment in a coinless manner is introduced (for example, refer to Patent Document 1). Conventionally, in order to play a game, money per se has been used as game coins, or alternatively, tokens that are exchanged with money have been used. In contrast, the system called EZ PAY employs paper-based tickets in place of coins or tokens. On a paper-based ticket, the number of credits is printed by means of barcodes. When a game is completed at one gaming machine, the number of credits at that time point is printed on the paper-based ticket at that gaming machine. After that, when a player moves to another gaming machine, the player causes such another gaming machine to read a paper-based ticket having the number of credits printed thereon and then starts a game. By doing this, when the player moves a gaming machine as well, the number of credits can be continued at another gaming machine. In addition, when exchanging money, a player shows the staff in gaming facility the paper-based ticket having the number of credits printed thereon or causes a money exchanger to read the paper-based ticket.

PRIOR ART DOCUMENT

Patent Document

[Patent Document 1] U.S. Pat. No. 7,118,478

SUMMARY OF THE INVENTION

Problems to be Solved by the Invention

In the EZ PAY system described above, paper-based mediums called paper-based tickets targeted for recording the number of credits have been thus employed. Therefore, when a player moves or eats and drinks something in casino, there has been a possibility that the user loses, stains, or damages a paper-based ticket. In addition, there has also been a possibility that security is not sufficient because the number of credits has been printed by means of barcodes.

On the other hand, the widespread use of IC cards in recent years has been remarkable; while in the beginning, there were contact-type IC cards at which electrical contacts exist, in the latest noncontact-type IC cards have been popular with lower pricing of RFID. However, in a case where an IC card become available in casino in place of paper-based tickets having barcodes printed thereon, there may arise a problem that a player fails to take an IC card that is ejected from a gaming machine.

Means for Solving the Problems

The present invention has been made in view of the circumstance described above, and it is an object of the present invention to provide a device for reading information data storage medium, which is capable of reducing failure to take an IC card that is ejected from a gaming machine.

(1) A device for reading information data storage medium according to the present invention, the device comprising:

a player detection device for detecting a presence of a player playing at a gaming machine;

a carrying device for carrying a removable information data recording medium to a housing position or an eject position;

a recording medium detection device for detecting that the information data recording medium exists at the eject position; and a controller that is programmed to execute processing operations of:

(A) determining whether or not the information data recording medium exists at the eject position by means of the recording medium detection device;

(B) determining whether or not the player exists by means of the player detection device; and (C) carrying the information data recording medium from the eject position to the housing position by means of the carrying device when it is determined that the information data recording medium exists at the eject position and when it is determined that the player does not exist.

By employing such a configuration, in a case where an information data recording medium exists at an eject position and in a case where no player exists, the information data recording medium is carried to a housing position. That is, in a case where an information data recording medium exists at an eject position and in a case where no player exists, the information data recording medium can be removed from the eject position. Thus, even in a case where an IC card is left at a gaming machine, there is no need for the staff in gaming facility to go to the gaming machine and remove the IC card, making it possible to reduce the workload in gaming facility or to prevent the work from being complicated. Further, it is also possible to prevent illegal act that another player obtains the left IC card and illegally acquires credits.

The device for reading information data storage medium, according to above (1), comprising an alert output device for outputting alert information, wherein the controller is programmed to execute a processing operation of:

(D) outputting alert information from the alert output device when it is determined that the information data recording medium exists at the eject position and when it is determined that the player does not exist.

By employing such a configuration, in a case where an information data recording medium exists at an eject position and in a case where no player exists, hall alert information is output. Thus, it is possible to broadcast that an IC card is left at a gaming machine. Therefore, in a case where a player is not far away from the gaming machine yet, it is possible to cause the player to recognize failure to take the IC card. Further, it is possible to immediately broadcast the staff in game facility or the staff in hall that failure to take the IC card occurs, and it is also possible to speedily do appropriate work.

The device for reading information data storage medium, according to above (1) or (2), comprising a reader/writer for reading or writing amount-of-money information relating to a cash for a game to be played at a gaming machine from or into the information data recording medium, wherein the controller is programmed to execute processing operations of:

(E) writing the amount-of-money information relating to the cash for the game to be played at the gaming machine into the information data recording medium;

(F) executing a mini-game when an amount of money indicated by the amount-of-money information that is written into the information data recording medium is less than a predetermined number, and according to a result of the executed mini-game, changing the amount-of-money information; and (G) carrying the information data recording medium to the eject position by means of the carrying device when the amount of money indicated by the amount-of-money information that is written into the information data recording medium is equal to or greater than the predetermined number.

By employing such a configuration, in a case where more amount of money is stored in an information data recording medium by means of a mini-game, it is possible to enhance the value of an IC card, to cause a player to actively recognize the presence of the information data recording medium, and to prevent failure to take the IC card.

A device for reading information data storage medium according to the present invention, the device comprising:

a communication device for communicating with an event management server and a broadcast transmission server;

an input device by means of which an item of information is to be input according to an operation of a player;

a broadcasting device for broadcasting a real situation, based on broadcast data that is indicative of the real situation of an event that is transmitted from the broadcast transmission server; and a controller that is programmed to execute processing operations of:

(M) inputting a type of an event targeted to be betted and a bet amount relative to a result of the event, by means of the input device;

(N) transmitting the type of the event and the bet amount to the event management server via the communication device;

(O) receiving the broadcast data from the broadcast transmission server according to the type of the event and then broadcasting the real situation from the broadcasting device; and (P) receiving a prize result that is defined by the event management server according to a result of the event, from the event management server, and then, broadcasting the received prize result from the broadcasting device.

By employing such a configuration, it is possible for a player to take part in an event such as sports book while playing a game at a gaming machine, to effectively utilize time intervals between game sessions in the gaming machine, and to enhance a possibility of obtaining a prize by placing a bet on the event. In addition, when a prize is obtained by placing a bet, it is possible to ensure a fund for playing a game at a gaming machine, and it is also possible to enjoy a game at the gaming machine over a long period of time.

Effect of the Invention

The present invention, in its effect, is capable of reducing a circumstance of a player failing to take an IC card that is ejected from a gaming machine.

BRIEF DESCRIPTION OF THE DRAWINGS

[FIG. 5] It is a view showing a symbol table for normal game.

[FIG. 7] It is a table showing symbol combinations in the gaming machine on which the PTS terminal according to the embodiment of the present invention is mounted.

[FIG. 22] It is a table showing a structure of recording data of a visual image of a player, which is stored in a hard disk drive of the PTS terminal.

[FIG. 24] It is a table showing items stored in an IC card that is employed at the PTS terminal according to the embodiment of the present invention.

DESCRIPTION OF THE PREFERRED EMBODIMENTS

Figure 1:
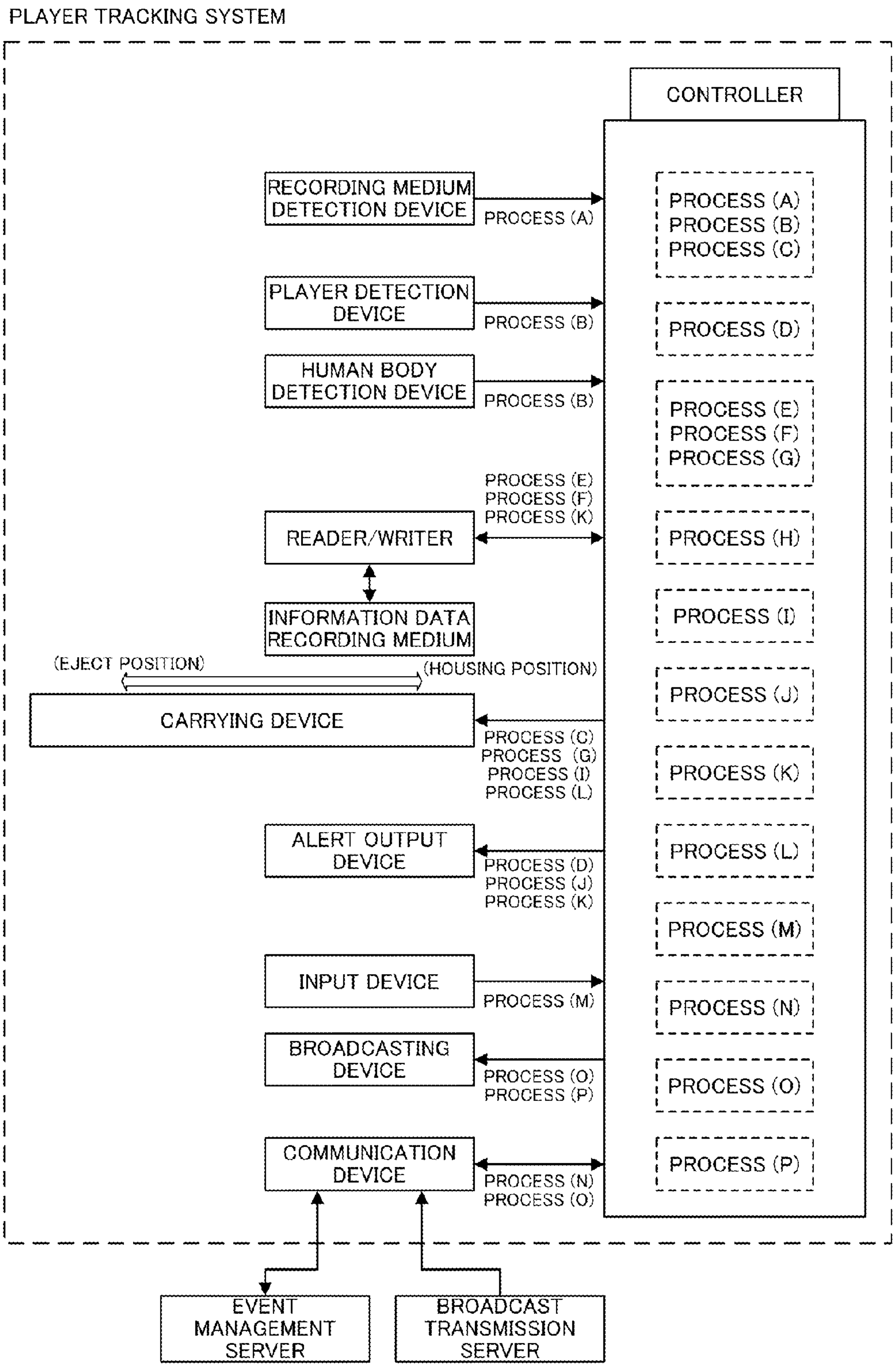
[FIG. 1] It is a view showing schematics of a PTS terminal according to an embodiment of the present invention.

Hereinafter, the embodiments of the present invention will be described with reference to the drawings.

A device for reading information storage medium, according to an embodiment of the present invention, (hereinafter, referred to as a player tracking system (PTS)) has a player detection, a carrying device, a recording medium detection device, and a controller. A PTS terminal 64 to be described later corresponds to the "device for reading information data storage medium", or the "player tracking system"; a CCD camera 251 or a human body detection sensor 252 corresponds to the "player detection device"; a motor 254 corresponds to the "carrying device"; an eject position sensor 255 corresponds to the "recording medium detection device"; and a CPU 241, a ROM 242, and a RAM 243 correspond to the "controller".

The player detection device is a device for detecting a presence of a player who is playing at a gaming machine. This device may be the one that optically detects a player's image or that thermally or mechanically detects a player. When the presence of a player has been detected, it is preferable to generate a detection signal. Therefore, it is sufficient if the player detection device is capable of detecting whether or not a human exists in front of a gaming machine.

The carrying device carries an information data recording medium. It is preferable that the carrying device be powered up and driven. By means of the carrying device, the information data recording medium is carried to a housing position or an eject portion, and is positioned.

The eject position is a position at which an information data recording medium is carried by means of the carrying device, part of the information data recording medium is exposed or protruded, enabling a player to remove the information data recording medium from the player tracking system while the player holds the medium with hand.

The housing position is a predetermined position inside of the player tracking system. The housing position is not limited to one position, and can be set at a plurality of positions. For example, as one of the housing positions, a load position may be set. The load position is a position at which communication is performed with the player tracking system by means of a reader/writer to be described later, enabling predetermined information or data to be written into an information data recording medium or to be read out from the information data recording medium.

Further, the storage positions also include a tracker position adapted to carry an information data recording medium to a stacker for housing the medium. It is preferable that two stacker positions be set. One is an ordinary stacker and the other is an alert stacker. Either of the stackers is capable of housing a predetermined number of IC cards. The ordinary stacker is adapted to house an initialized IC card. Alternatively, the alert stacker is adapted to house an IC card that meets a predetermined alert condition, and that is targeted to be alerted.

Therefore, in the player tracking system according to the embodiment of the present invention, it is preferable that a load position, a housing position of an ordinary stacker, and a housing position of an alert stacker be set as housing positions.

In addition, an information data recording medium can be removable from the player tracking system. As described above, when an information data recording medium is positioned at an eject position, it is possible for a player to remove the information data recording medium from the player tracking system. Further, it is also possible for the player to position the information data recording medium at the eject position by inserting the information data recording medium into the player tracking system. When the information data recording medium is positioned at the eject position, the information data recording medium is carried to any one of these housing positions by means of the carrying device.

Furthermore, the information data recording medium may be of a contact type or of a noncontact type. When the information data recording medium is positioned at the load position, communication is performed with the player tracking system, whereby it may be possible to write predetermined information or data into the information data recording medium or read out the information or data from the information data recording medium. For example, the information data recording mediums include an IC card or the like.

The recording medium detection device is provided at the eject position described above. When an information data recording medium is positioned at an eject position, the recording medium detection device detects that the information data recording medium exists at the eject position. It is preferable that the recording medium detection device generate a detection signal when the device detects the information data recording medium. There will be several cases in which the information data recording medium is positioned at the eject position. Namely, there will be not only a case in which the medium is positioned after carried to the eject position by means of the carrying device, but also a case in which the information data recording medium is positioned at the eject position by inserting the medium into the player tracking system from the outside of the player tracking system.

It is preferable that the controller be made of a central processing unit (CPU), a read-only memory (ROM), and a random access memory (RAM). This controller is capable of executing the processing operations (A) to (C) described below.

The processing operation of (A) is a processing operation of determining whether or not an information data recording medium exists at an eject position, by means of the recording medium detection device. It is preferable that the determination processing of (A) be performed based on a detection signal issued from the recording medium detection device. The processing operation of step S2013 in FIG. 20 to be described later corresponds to that of (A).

The processing operation of (B) is a processing operation of determining whether or not a player exists, by means of the player detection device. It is preferable that the processing operation of (B) be performed based on a detection signal issued from the player detection device. The processing of step S2021 in FIG. 20 to be described later corresponds to that of (B).

The processing operation of (C) is a processing operation of carrying an information data recording medium from an eject position to a housing position by means of the carrying device when it is determined that the information data recording medium exists at the eject position and when it is determined that no player exists. In the processing operation of (C), it is preferable that, when it is determined that no player exists, a drive control signal be issued to the carrying device to thereby drive the carrying device and then carry the information data recording medium from the eject position to the housing position. The processing operation of step S2051 in FIG. 20 corresponds to that of (C).

By employing such a configuration, in a case where an information data recording medium exists at an eject position and in a case where no player exists at a gaming machine, the information data recording medium is carried to the housing position. That is, in a case where the information data recording medium exists at the eject position and in a case where no player exists, the information data recording medium can be removed from the eject position. Further, the information data recording medium that is removed from the eject position is housed inside of the player tracking system.

Thus, even in a case where an information data recording medium is left in a gaming machine, it is possible to eliminate a work for the staff in gaming facility to go to the gaming machine and then remove the information data recording medium, to reduce the workload in gaming facility, or to prevent the work from being complicated. Further, it is possible to prevent illegal act that another player obtains the left information data recording medium and then illegally acquires credits.

In addition, it is preferable that the player tracking system (PTS) according to the embodiment of the present invention have an alert output device for outputting alert information. In this case, it is preferable that the controller described above execute the processing operations of (D) described below.

The processing operation of (D) is a processing operation of outputting hall alert information from an alert output device when it is determined that an information data recording medium exists at an eject position and when it is determined that no player exists. In the processing operation of (D), it is preferable that, when it is determined that the information data recording medium exists at the eject position and when it is determined that no player exists, hall alert information for indicating an alert be supplied to the alert output device to thereby output the hall alert information from the alert output device. The processing operation of step S2045, S2047, or S2049 in FIG. 20 to be described later corresponds to that of (D).

It is preferable that an output of the hall alert information be recognizable to a player of the staff in gaming facility. In addition, it is preferable that information or data recognizable to a control device such as a hall computer as well as a player or the staff in gaming facility be included in the hall alert information. The information or data can be recorded by means of the control device such as the hall computer or what happens in gaming facility can be appropriately managed.

By employing such a configuration, in a case where an information data recording medium exists at an eject position and in a case where no player exists, hall alert information is output. Thus, it is possible to broadcast that an IC card is left in a gaming machine. Therefore, in a case where a player is not far away from the gaming machine yet, it is possible to cause the player to recognize failure to take the IC card. Further, it is possible to immediately broadcast the staff in gaming facility or the staff in hall that failure to take the IC card occurs, and speedily do an appropriate work.

Further, it is preferable that the player tracking system (PTS) according to the embodiment of the present invention have a reader/writer. This reader/writer is adapted to write predetermined information into an information data recording medium or read out the information from the information data recording medium. The predetermined information includes denomination information relating to cash for a game to be played at a gaming machine. Amount-of-money information is adapted to enter the cash owned or managed by a player into a gaming machine in order to play a game at the gaming machine, and then, convert the entered cash to information indicative of the amount of the entered cash. In respect of the amount-of-money information, the contents of amount-of-money information (for example, numeric value) vary by a player who is playing a game at a gaming machine. As described later, when a player plays a game at a gaming machine, the number of credits obtained after amount-of-money information is converted is employed. Therefore, while the number of credits is varied every time a player plays a game at one gaming machine, there is no need to vary amount-of-money information as long as the player continues a game at one gaming machine. With a predetermined timing such as when a player completes a game at one gaming machine, it may be well that the number of credits is converted to amount-of-money information and then the amount-of-money information may be varied.

It is possible to convert to the number of credits according to the amount of money indicated by amount-of-money information. Credits are virtual gaming mediums that are available as wages to be betted during the play of game or that are continuously available as wages to be betted until it has been stored in gaming machine and cashed.

In addition, the controller is capable of executing the processing operations of (E) to (G) described below.

The processing operation of (E) is a processing operation of writing amount-of-money information relating to cash for a game to be played at a gaming machine into an information data recording medium. As described above, amount-of-money information is converted to the number of credits. Credits are used as wages to be betted, and the number of credits varies with the progress of game. A timing of writing amount-of-money information into the information data recording medium may be when the play of game at a gaming machine completes or every time a game is played at a gaming machine. In any case, the number of credits is transmitted to a gaming machine to the player tracking system, the number of credits is converted to amount-of-money information, and then, the converted amount-of-money information is written into the information data recording medium. The processing operation of step S1939 in FIG. 19 to be described later corresponds to that of (E).

The processing operation of (F) is a processing operation of executing a mini-game when amount-of-money information written into an information data recording medium is less than a predetermined number, and according to a result of the mini-game, varying the amount of money indicating the amount-of-money information. It is preferable that a mini-game complete within a shorter period of time than a game to be played at a gaming machine. The mini-game is executed to adjust the amount of money indicated by amount-of-money information in the information data recording medium after the game at a gaming machine completes. By organizing a game that can be completed within a short period of time, it is possible for a next player to play a game immediately at a gaming machine, and it is also possible to maintain workability of the gaming machine. The processing operations of steps S2113 to S2121 in FIG. 21 to be described later correspond to that of (F).

The processing operation of (G) is a processing operation of carrying an information data recording medium to an eject position by means of a carrying device when amount of money indicated by amount-of-money information written into the information data recording medium is equal to or greater than a predetermined number. When the amount of money indicated by the amount-of-money information is equal to or greater than the predetermined number, since the value of the information data recording medium is high, there is a low possibility that a player fails to take the medium; and therefore, it is preferable that the information data recording medium be carried to the eject position so that the player can remove the information data recording medium. The processing operations of step S2119 in FIG. 21 and step S2011 in FIG. 20 to be described later correspond to that of (G).

By employing such a configuration, in a case where the amount of money indicated by the amount-of-money information is increased by means of a mini-game, it is possible to enhance the value of an information data recording medium, to cause a player to actively recognize the presence of the information data recording medium, and to prevent failure to take the medium.

Further, the controller is capable of execute the processing operation of (H) described below.

The processing operation of (H) is a processing operation of converting the cash entered into a gaming machine to the amount of money indicated by amount-of-money information according to a rate corresponding to a denomination. The processing operation of a subroutine in FIG. 26 to be described later corresponds to that of (G).

By employing such a configuration, since the cash owned by a player is converted to amount-of-money information at a rate corresponding to a predetermined denomination, even if a fraction occurs to the amount of money indicated by the amount-of-money information, it is possible to appropriate convert the amount of cash including the fraction, without imparting a disadvantage to the player, and it is also possible to convert the amount-of-money information.

Further, the controller is capable of executing the processing operation of (I) described below.

The processing operation of (I) is a processing operation of converting an information data recording medium to a housing position by means of the carrying device when the amount of money indicated by the amount-of-money information written into the information data recording medium is less than a predetermined number. That is, in a case where a player loses an executed mini-game, the information data recording medium is confiscated and then the confiscated recording medium is carried to the housing position. Even if this is done, since the amount of money indicated by the amount-of-money information that is written into the information data recording medium is less than a predetermined number, the value of the information data recording medium is not high, and no player feels dissatisfaction. The processing operations of steps S2117 and S2129 in FIG. 21 to be described later correspond to that of (I).

The information data recording medium is thus housed inside of the player tracking system, whereby the information data recording medium is not left in the player tracking system, making it possible to reduce the cumbersomeness or workload of the staff in gaming facility. In addition, the information data recording medium is housed inside of the player tracking system, thus making it possible for a next player to immediately start a game at the gaming machine and to enhance the workability of the gaming machine. Further, the information data recording medium is housed inside of the player tracking system, thereby making it possible for the staff in gaming facility to appropriately re-collect the information data recording medium, and reuse the re-collected information data recording medium in gaming facility. Therefore, it is possible to reduce costs required for the information data recording mediums.

Further, the controller is capable of executing the processing operation of (J) described below.

The processing operation of (J) is a processing operation of outputting player alert information from the alert output device when it is determined that the information data recording medium exists at an eject position and when it is determined that a player exits. The processing operation of step S2023 or S2025 in FIG. 20 to be described later corresponds to that of (J).

In the processing operation of (D) described above, when it is determined that an information data recording medium exists at an eject position and when it is determined that no player exists, hall alert information is output from an alert output device. This hall alert information is output when it is determined that no player exists. Therefore, even if the hall alert information is output, it is also deemed that a player leaving a gaming machine quickly cannot recognize the hall alert information. Thus, first of all, by executing the processing operation of (J), it is preferable that player alert information be output for a player when the player exists. Doing this enables a player to be broadcasted that there is a possibility that the player fails to take the information data recording medium.

Further, the controller is capable of executing the processing operation of (K) described below.

The processing operation of (K) is a processing operation of outputting hall alert information from an alert output device when it is determined that no player exists after player alert information is output from the alert output device. The processing operations of step S2023 or S2025 and steps S2045 and S2047 or S2049 in FIG. 20 to be described later correspond to that of (K).

That is, when a player exists, in a case where the player leaves a gaming machine without being aware of player alert information in spite of output of the player alert information, the information is changed to hall alert information and then the changed hall alert information is output. The output of alert information is thus set to two steps, whereby the subject of the broadcasting is changed from the player to the gaming facility (staff or hall computer). This makes it possible to appropriately and speedily do a work when a player fails to take an information data recording medium.

Further, the controller is capable of executing the processing operation of (L) described below.

The processing operation of (L) is a processing operation of initializing an information data recording medium after elapse of a predetermined period, the information data recording medium being carried to a housing position by means of the processing operation of (C) or (I) described above, carrying the initialized medium to an ordinary stacker, and then, resupplying the carried information data recording medium. The processing operations of steps S2315, S2317, and S2319 in FIG. 23 to be described later correspond to that of (L).

By doing this, the staff in gaming facility can resupply an information data recording medium without need to newly purchase an information data recording medium, thus making it possible to reduce costs required for the information data recording medium. In addition, an information data recording medium can be resupplied without need to open a gaming machine, thus making it possible to maintain fairness or safety of game and to prevent complication of work of resupplying the information data recording medium.

While only the player tracking system according to the embodiment of the present invention has been described hereinabove, there may be a method of executing the processing operations (A) to (L) described above in the player tracking system according to the embodiment of the present invention.

Further, the player tracking system according to the embodiment of the present invention has a communication device, an input device, a broadcasting device, and a controller. A communication interface 245 corresponds to the "communication device"; a touch panel 259 corresponds to the "input device"; and an LCD 253 or a speaker 257 corresponds to the "broadcasting device".

The communication device is capable of communicating with an event management server and a broadcast transmission server. To the input device, a variety of information or commands are input according to a player operation. The player tracking system receives broadcast data indicative of a real situation that is transmitted from the broadcast transmission server, and the broadcasting device broadcasts the real situation, based on the received broadcast data.

The controller executes the processing operations of (M) to (P) described below.

The processing operation of (M) is a processing operation of inputting a type of an event targeted to be betted and a bet amount relative to a result of the event by means of the input device. The processing operation of (N) is a processing operation of transmitting the type of the event and the bet amount to the event management server via the communication device. The processing operation of (O) is a processing operation of receiving broadcast data from a broadcast transmission server according to the type of the event and then broadcasting a real situation from the broadcasting device. The processing operation of (P) is a processing operation of receiving a result of a prize defined by the event management server according to a result of an event from the event management server and then broadcasting the received result of the prize from the broadcasting device.

By employing such a configuration and executing the processing operation, a player can take part in an event such as sports book while playing a game at a gaming machine, can effectively utilize time intervals between game sessions in the gaming machine, and can enhance a possibility of obtaining a prize by placing a bet on the event. In addition, when a prize is obtained by placing a bet, it is possible to ensure a fund for playing a game at a gaming machine, and to enjoy a game at the gaming machine over a long period of time.

[Explanation of Function Flow Diagram]

Figure 2:
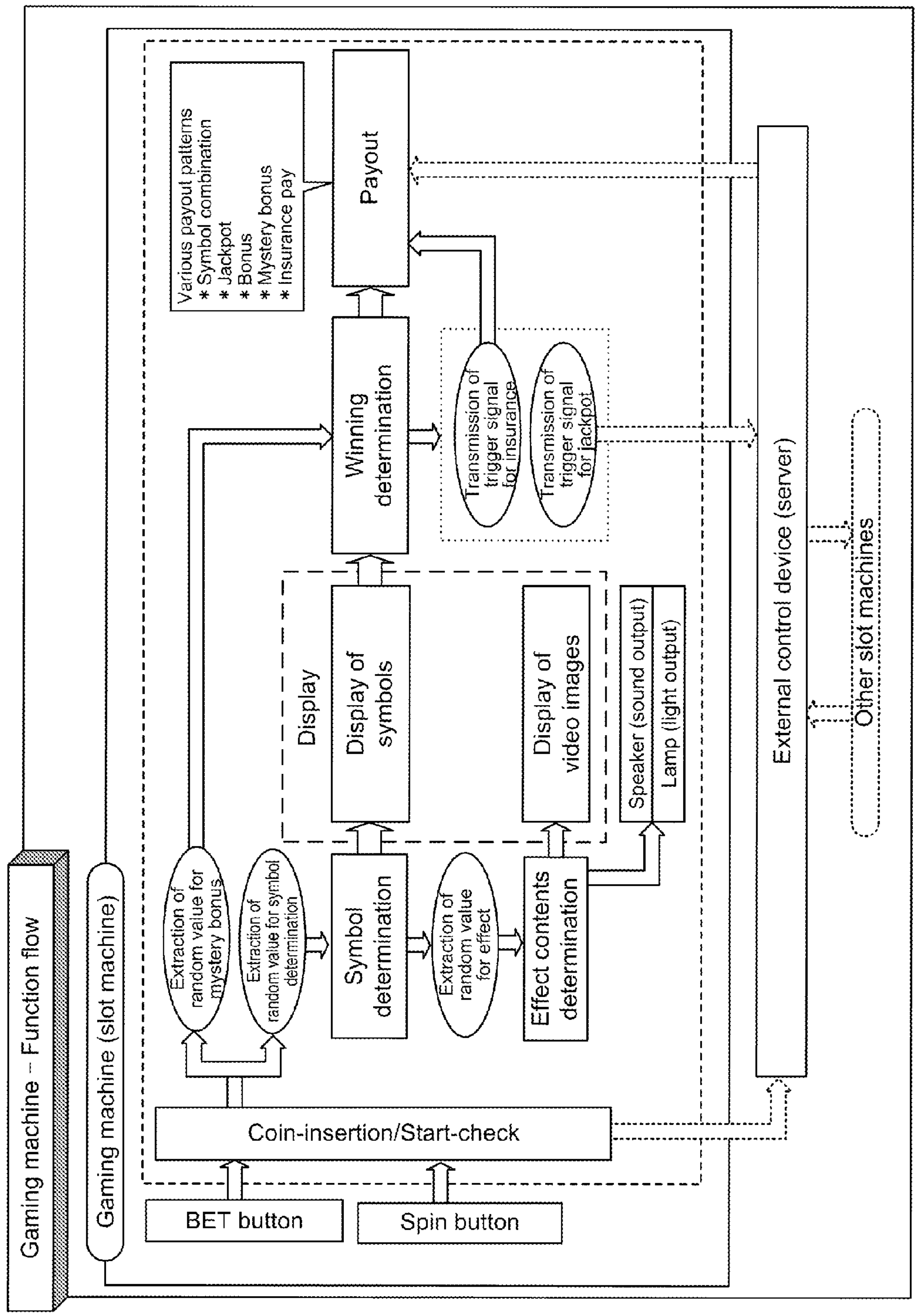
[FIG. 2] It is a view showing a functional flowchart of a gaming machine on which the PTS terminal according to the embodiment of the present invention is mounted.

With reference to FIG. 2, basic functions of the gaming machine according to the present embodiment are described.

FIG. 2 is a view illustrating a function flow of the gaming machine according to the embodiment of the present invention.

<Coin-Insertion/Start-Check>

First, the gaming machine checks whether or not a BET button has been pressed by the player, and subsequently checks whether or not a spin button has been pressed by the player.

<Symbol Determination>

Next, when the spin button has been pressed by the player, the gaming machine extracts random values for symbol determination, and determines symbols to be displayed at the time of stopping scrolling of symbol arrays for the player, for a plurality of respective video reels displayed to a display.

<Symbol Display>

Next, the gaming machine starts scrolling of the symbol array of each of the video reels and then stops scrolling so that the determined symbols are displayed for the player.

<Winning Determination>

When scrolling of the symbol array of each video reel has been stopped, the gaming machine determines whether or not a combination of symbols displayed for the player is a combination related to winning.

<Payout>

When the combination of symbols displayed for the player is a combination related to winning, the gaming machine offers benefits according to the combination to the player.

For example, when a combination of symbols related to a payout of coins has been displayed, the gaming machine pays out coins of the number corresponding to the combination of symbols to the player.

Further, when a combination of symbols related to a bonus game trigger has been displayed, the gaming machine starts the bonus game. It is to be noted that, in the embodiment, as a bonus game, a game (free game) in which lottery according to determination of to-be-stopped-symbols described previously is performed over a predetermined number of times is played without a need to consume coins.

When a combination of symbols related to a jackpot trigger is displayed, the gaming machine pays out coins in an amount of jackpot to the player. The jackpot refers to a function which accumulates parts of coins used by players at the respective gaming machines as the amount of jackpot and which, when the jackpot trigger has been established in any of the gaming machines, pays out coins of the accumulated amount of jackpot to that gaming machine. In each game, the gaming machine calculates the amount (amount for accumulation) to be accumulated to the amount of jackpot and transmits to an external control device. The external control device accumulates to the amount of jackpot the amounts for accumulation transmitted from the respective gaming machines.

Further, in addition to the aforementioned benefits, the gaming machine is provided with benefits such as a mystery bonus and insurance. The mystery bonus is a bonus in which a predetermined amount of coins are paid out for winning of a lottery that is adapted for the mystery bonus. When the spin button has been pressed, the gaming machine extracts a random value for mystery bonus and determines whether or not to establish a mystery bonus by lottery.

The insurance is a function provided for a purpose of relieving the player from a situation in which a free game has not been played for long periods of time. In the present embodiment, the player can arbitrarily select whether or not to make the insurance effective. Making insurance effective requires a predetermined insurance-purchase amount to be paid in exchange. In the case where the insurance has been made effective, the gaming machine starts counting the number of games. The gaming machine conducts a payout of coins of the amount that is set for the insurance, when the number of counted games has reached a previously determined number of times without a large amount of payout relating to a free game or the like being conducted.

<Determination of Effects>

The gaming machine produces effects by displaying images to the display, outputting the light from lamps, and outputting sounds from speakers. The gaming machine extracts a random value for effect and determines contents of the effects based on the symbols and the like determined by lottery.

[Overall Game System]

Figure 3:
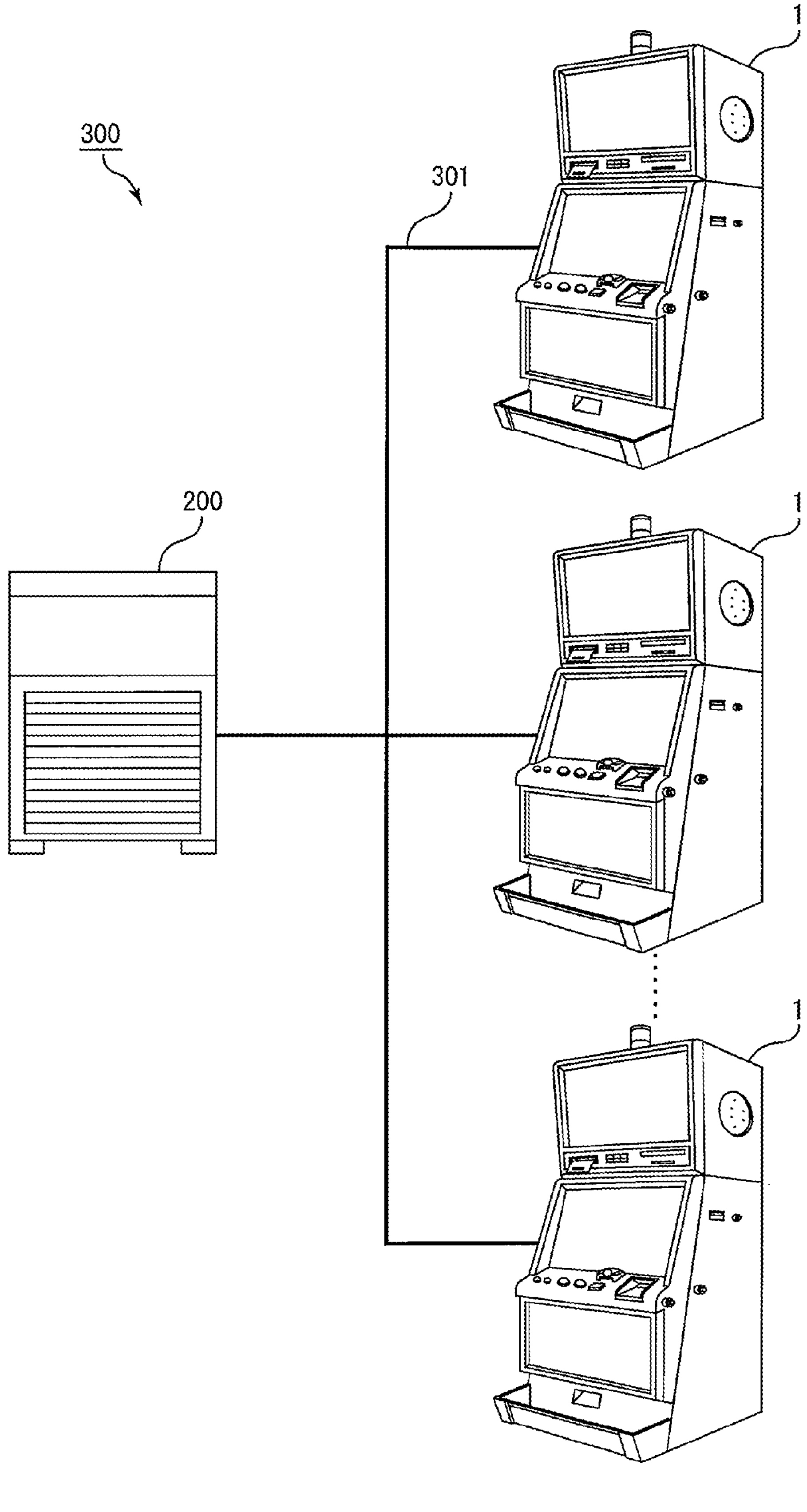
[FIG. 3] It is a view showing a game system including the gaming machine on which the PTS terminal according to the embodiment of the present invention is mounted.

The basic functions of the gaming machine have been described above. Next, with reference to FIG. 3, a game system including the gaming machine is described. FIG. 3 is a view illustrating the game system including the gaming machine according to the embodiment of the present invention.

A game system 300 includes the plurality of gaming machines 1, and an external control device 200 that is connected to each of the gaming machines 1 through a communication line 301.

The external control device 200 is for controlling the plurality of gaming machines 1. In the present embodiment, the external control device 200 is a so-called hall server which is installed in a game facility having the plurality of gaming machines 1. Each of the gaming machines 1 is provided with a unique identification number, and the external control device 200 identifies transmission sources of data transmitted from the respective gaming machines 1 by using the identification numbers. Also in the case where the external control device 200 transmits data to a gaming machine 1, the identification numbers are used for specifying the transmission destination.

It is to be noted that the game system 300 may be constructed within a single game facility where various games can be conducted, such as a casino, or may be constructed among a plurality of game facilities. Further, when the game system 300 is constructed in a single game facility, the game system 300 may be constructed in each floor or section of the game facility. The communication line 301 may be a wired or wireless line, and can adopt a dedicated line, an exchange line or the like.

[Overall Configuration of Gaming Machine]

Figure 4:
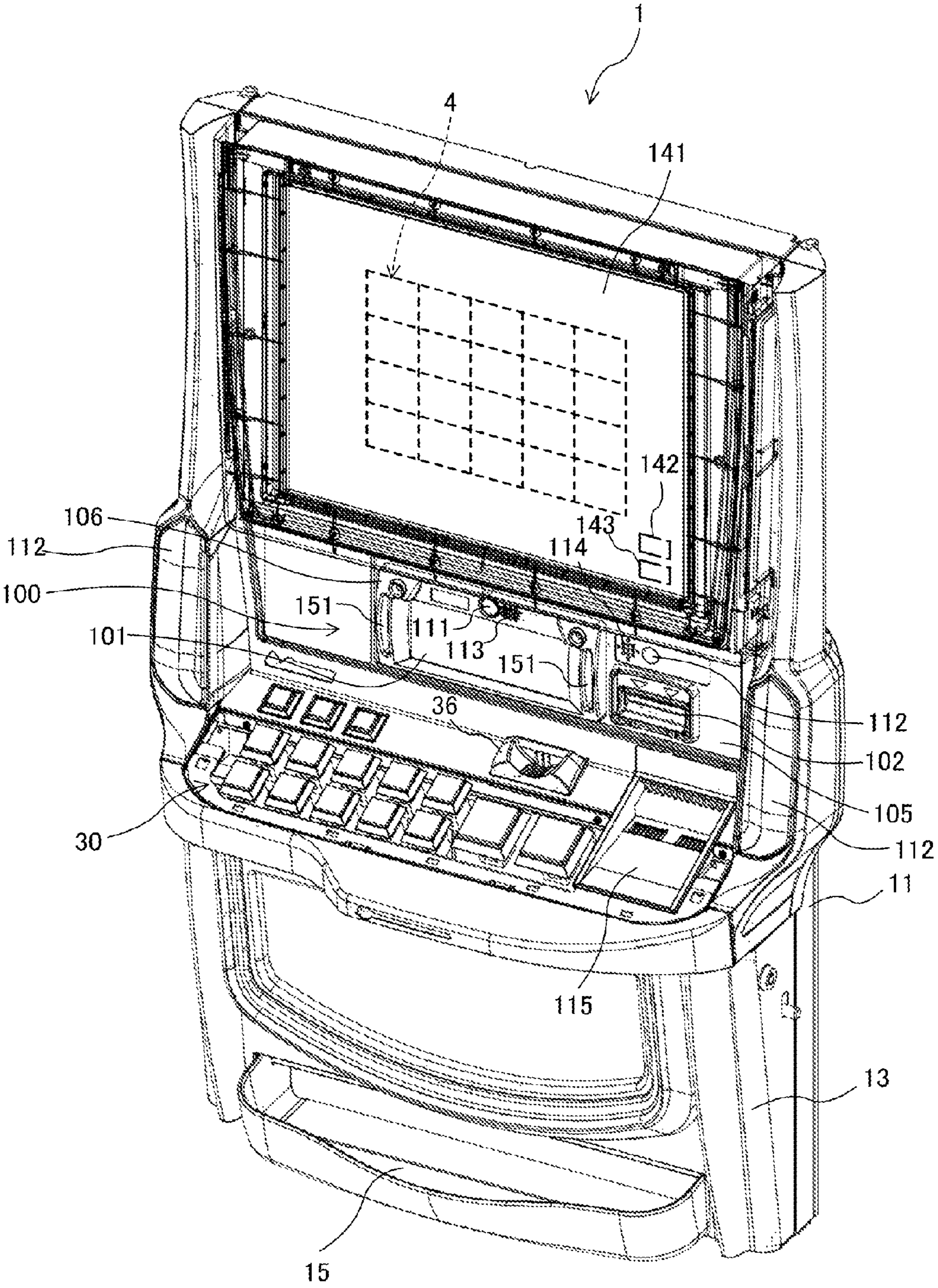
[FIG. 4] It is a view showing an entire configuration of the gaming machine on which the PTS terminal according to the embodiment of the present invention is mounted.

The game system according to the present embodiment has been described above. Next, with reference to FIG. 4, an overall configuration of the gaming machine 1 is described. FIG. 4 is a perspective view illustrating the outside of the gaming machine according to the embodiment of the present invention.

A coin, a bill, or electrically valuable information corresponding to these is used as a game medium in the gaming machine 1. In particular, in the embodiment, an IC card to be described later is employed as well. For example, in a case where a prize is awarded to a player according to a game result, amount-of-money information (local currency) is written into the IC card in place of awarding coins, and the written IC card can be awarded to the player. It is to be noted that the game medium is not limited to these, and for example a medal, a token, electric money or the like can be adopted.

The gaming machine 1 includes a cabinet 11, an image display panel 141 provided on the upper portion of the cabinet 11, and a main door 13 provided at the front face of the lower portion of the cabinet 11.

The image display panel 141 is provided at the center of the main door 13. The image display panel 141 includes a liquid crystal panel, and forms the display. The image display panel 141 has a symbol display region 4. To the symbol display region 4, five video reels 3 (3*a*, 3*b*, 3*c*, 3*d*, 3*e*) are displayed.

In the present embodiment, a video reel depicts through videos the rotational and stop motions of a mechanical reel having a plurality of symbols drawn on the peripheral surface thereof. To each of the video reels 3, a symbol array comprised of a previously determined plurality (22 in the present embodiment) of symbols is assigned (see FIG. 5 which is described later).

In the symbol display region 4, the symbol arrays assigned to the respective video reels 3 are separately scrolled, and are stopped after predetermined time has elapsed. As a result, a part (four consecutive symbols in the present embodiment) of each of the symbol arrays is displayed for the player. The symbol display region 4 has four regions, namely an upper region, an upper central region, a lower central region, and a lower region, for each video reel 3, and a single symbol is to be displayed to each region. That is, 20 (=5 columns×4 symbols) symbols are to be displayed in the symbol display region 4.

In the present embodiment, a line formed by selecting one of the aforementioned four regions for each of the video reels 3 and connecting the respective regions is referred to as a winning line (hereinafter also referred to as a “pay line”). It is to be noted that any desired shape of the winning line can be adopted, and examples of the shape of the winning line may include a straight line formed by connecting the upper central regions for the respective video reels 3, a V-shaped line, and a bent line. Also, any desired number of lines can be adopted, and the number can be for example 30 lines.

In addition, a number-of-credits display region 142 and a number-of-payouts display region 143 are set on the image display panel 141. In the number-of-credits display region 142, the number of credited coins is displayed by means of image. In the number-of-payouts display region 143, the number of coins to be paid out is displayed by means of image. In a case where an IC card is inserted through a card slot to be described later in place of coins, credit information that is read from the inserted IC card is displayed in the number-of-credits display region 142, and the number of credits is used as coins. In addition, in a case where amount-of-money information is written into an IC card in place of paying out coins, the amount-of-money information to be written into the IC card is displayed in the number-of-payouts display region 143.

Further, a touch panel 114 (refer to FIG. 6) is provided on a front face of the image display panel 141. A player operates the touch panel 114 to be thereby able to input a variety of instructions.

Downward of the image display panel 141, there are provided: a control panel 30 made of a plurality of buttons 31 to 35 for inputting instructions associated with the progress of game by a player; a coin accepting slot 36 for accepting coins in a cabinet 11; and a bill validator 115.

Figure 25:
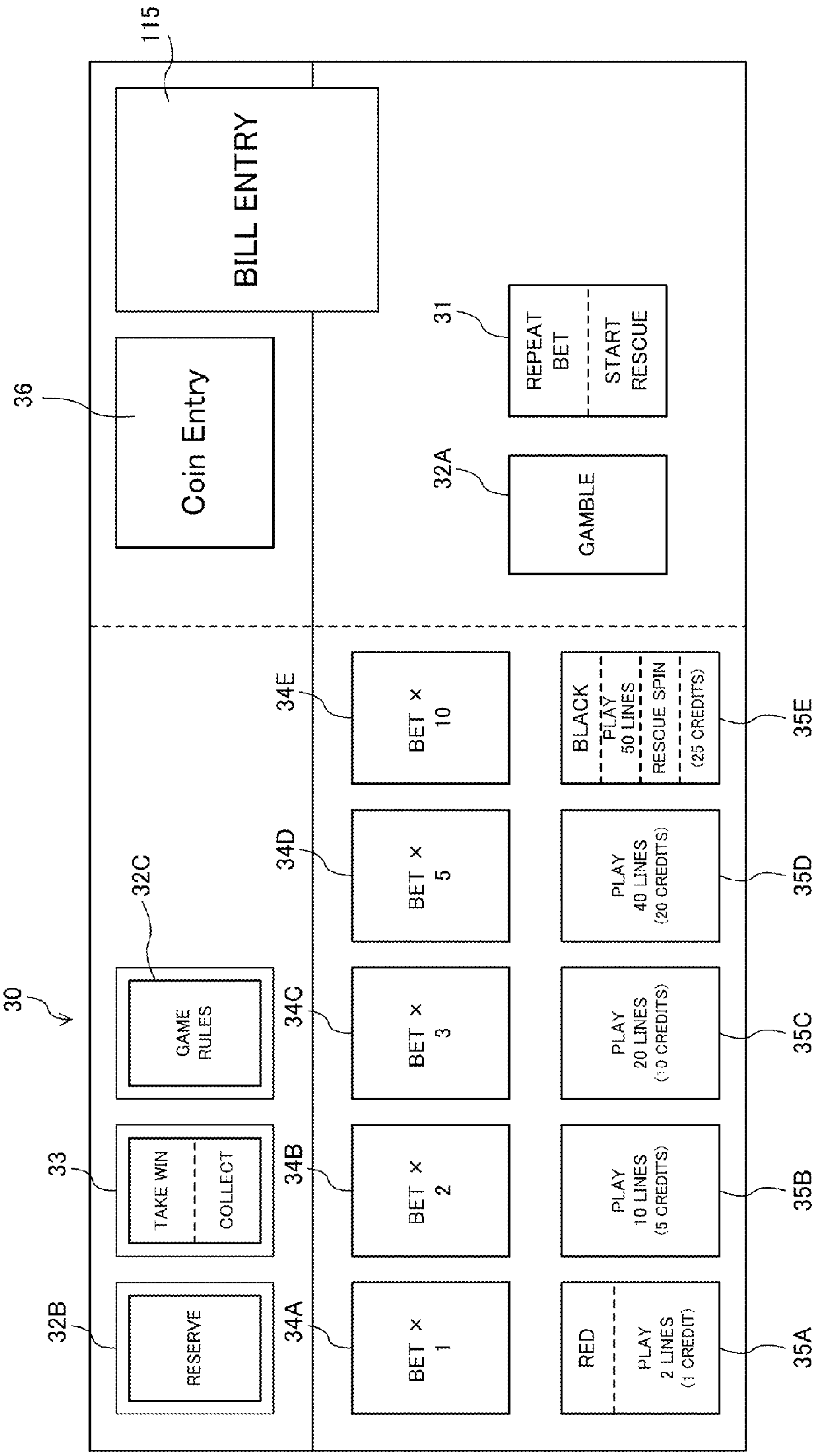
[FIG. 25] It is a schematic view showing a configuration of a control panel in the gaming machine on which the PTS terminal according to the embodiment of the present invention is mounted.

As shown in FIG. 25, on the control panel 30, there are provided: a spin button 31; a GAMABLE button 32A; BET buttons (1-BET button 34A to 10-BETS button 34E); line selection buttons (2-lines selection button 35A and 50-lines selection button 35E); a RESERVE button 32B, a TAKE WIN/COLLECT button 33; and a GAME RULES button 32C. Switches (not shown) are respectively provided for these buttons. Each of the switches detects that the corresponding button is pressed by a player, and outputs a signal that is indicative of the fact that the button is operated for a main CPU 71.

The spin button 31 is adapted to input an instruction for starting scrolling of symbol arrays of the respective video reels 3. The TAKE WIN/COLLECT button 33 is adapted to input an instruction for paying out credited coins to a coin tray 15 or an instruction for writing credit information that corresponds to the credited coins into an IC card. A signal indicative of the fact that the TAKE WIN/COLLECT button 33 is operated is supplied to the CPU 71 of a motherboard 70 to be described later. A signal indicative of the fact that the TAKE WIN/COLLECT button 33 is operated is supplied to a CPU 241 of a PTS terminal 64 as well. By doing this, the PTS terminal 64 is capable of writing the credit information that corresponds to the credited coins into the IC card. The signal indicative of the fact that the TAKE WIN/COLLECT button 33 is operated may be supplied to the PTS terminal 64 via the motherboard 70.

The 1-BET button 34A is adapted to input an instruction for betting one coin on game from among the credited coins; the 2-BET button 34B is adapted to input an instruction for betting two coins on game from among the credited coins; the 3-BET button 34C is adapted to input an instruction for betting three coins on game from among the credited coins; the 5-BET button 34D is adapted to input an instruction for betting five coins on game from among the credited coins; and the 10-BET button 34E is adapted to input an instruction for betting ten coins on game from among the credited coins.

The line selection buttons 35A to 35E are adapted to specify symbol arrays that are displayed in the symbol display region 4 on the image display panel 141 as a BET target. The 2-lines selection button 35A is a button for selecting two symbol lines; the 10-lines selection button 35B is a button for selecting 10 symbol lines; 20-lines selection button 35C is a button for selecting 20 symbol lines; the 40-lines selection button 35D is a button for selecting 40 symbol lines; and the 50-lines selection button 35E is a button for selecting 50 symbol lines.

A coin accepting slot 36 is provided to accept coins. A bill validator 115 is provided to accept bills. The bill validator 115 validates a bill, and accepts a valid bill into the cabinet 11. In addition, this bill validator 115 is capable of accepting bills in a plurality of countries other than basic currencies, and is capable of reading legitimacy, type, and number of bills accepted. It is to be noted that the bill validator 115 may be configured so as to be capable of reading a later-described ticket 175 with a barcode.

As shown in FIG. 4, a region (PTS terminal region 260) for PTS (player tracking system (individual tracking device)) terminal is provided between the image display panel 141 and the control panel 30, and in the PTS terminal region 260, a PTS terminal 64 is provided.

The PTS terminal 64 is a device for receiving a variety of information that is transmitted from an external control device 200 (refer to FIG. 2) and providing the received information to a specific player. At a front face part of the PTS terminal 64, there are provided: a liquid crystal display 253 (hereinafter, referred to as LCD 253); a card slot 262; player identification portions (first camera 251_a_, second camera 251_b_, first microphone 273, second microphone 274, and human body detection sensor 252); and a duct 151.

On the LCD 253, a variety of information that is received from the external control device 200 is displayed. The card slot 262 is an opening for inserting and ejecting an IC card. The player identification portions (first camera 251_a_, second camera 251_b_, first microphone 273, second microphone 274, and human body detection sensor 252) is adapted to detect a player who is playing a game in front of a gaming machine. The duct 151 is an opening for generating an effect sound or the like that is output from the speaker 257 (refer to FIG. 18).

The card slot 262 is provided lateral of the LCD 253 (at the right side in the case of the embodiment). Therefore, a player can insert an IC card by one hand (the right hand in the case of the embodiment) into the card slot 262 without need to vary a posture while looking at the LCD 253 or can receive the IC card that is ejected from the card slot 262.

In addition, inside of the PTS terminal 64, there are provided: an IC card R/W 258 (reader/writer device); a card stacker (not shown); an IC card carrying motor 254 (not shown); a speaker 257; and a controller.

The IC card R/W 258 (hereinafter, referred to as reader/writer 258) (refer to FIG. 18) is adapted to read data from an IC card that is carried to a load position inside of the PTS terminal 64 and to write data into the IC card. The stacker is adapted to stock a plurality of IC cards, and as described later, there are two different types of stackers; an ordinary stacker and an alert stacker. The IC card carrying motor 254 (hereinafter referred to as motor 254 (refer to FIG. 18)) is adapted to carry an IC card between the card slot 262 and the reader/writer 258 and the card stacker. The speaker 257 is adapted to output a voice or an effect sound generated from the front face part of the PTS terminal 64 via the duct 151 described above. The controller is adapted to control each of the abovementioned units that are provided at the PTS terminal 64, and is made of a CPU 241, a ROM 242, and a RAM 243 to be described later.

The motor 254 has a roller to be rotationally driven. This motor is adapted to carry an IC card that is inserted into the card slot 262 to a predetermined position (such as load position or stacker position to be described later) at the inside by means of rotation of a roller in a retraction position. In addition, the IC card that is present inside of the PTS terminal 64 is carried to the card slot 262 by means of rotation of the roller in an ejection direction. A position at which the IC card is positioned at the card slot 262 is referred to as an eject position.

The reader/writer 258 is adapted to read data from an IC card and to write data into the IC card by means of an RFID (Radio Frequency Identification). The reader/writer 258 is adapted to read credit information that is stored in an IC card that is inserted through the card slot 262 in a noncontact manner or to write credits that are imparted to a player according to a game result into the IC card in a noncontact manner.

As described above, amount-of-money information can be written into an IC card. In addition to writing amount-of-money information, the amount-of-money information can also be read out from the IC card. The reading and writing of the amount-of-money information are performed by means of the reader/writer 258.

At a gaming machine 1, in a case where a variety of denominations can be handled, the PTS terminal 64 converts to a predetermined amount of denomination, for example, to the amount of local currency, according to a rate at that time point, and writes the converted amount of money as amount-of-money information into an IC card.

Further, identification information such as serial number for identifying an IC card (hereinafter, referred to as card ID)

is also stored in the IC card. It is preferable that the card ID be only read out and be stored in advance in the IC card so as not to be rewritable.

As a player identification portion, the first camera 251*a* is provided upward of the LCD 253, and picks up an image of a player's face looking at the LCD 253 from a front side. The second camera 251*b* is provided upward of the card slot 262, and picks up an image of a player's face from an oblique side. Cameras that are installed to be able to pick up an image of a player's face are not limited in particular, and for example, a CCD camera or a CMOS sensor camera and the like can be exemplified. The first microphone 273 is provided upward of the LCD 253, and concentrates a player's voice as a sound from a front side. The second microphone 274 is provided upward of the card slot 262, and concentrates a player's voice as a sound from an oblique side. The human body detection sensor 252 is provided upward of the card slot 262, and detects a position of a player. As the human body detection sensor 252, an infrared-ray sensor or the like can be employed, and is not limited in particular. The player identification portion detects the presence of a player by means of the human body detection sensor 252 as well in addition to the first camera 251*a*, the second camera 251*b*, the first microphone 273, and the second microphone 274.

In addition, a touch panel 259 is provided so as to be superimposed on the LCD 253 described above. The touch panel 259 is made of a transparent film, and when a player touches the touch panel 259, a signal that is indicative of the pressed position on the touch panel 259 is issued from the touch panel 259. By detecting the signal from the touch panel 259, the PTS terminal 64 can be controlled according to a player operation.

The LCD 253, the card slot 262, the player identification portion, the speaker 257, and the duct 151 are provided integrally with the PTS panel 265. The PTS panel 265 is fixed to a cabinet 11 via a bracket. That is, at the gaming machine 1, in a PTS terminal region 260 between an image display panel 141 and the control panel 30, a PTS panel 265 on which the respective units constituting the PTS terminal 64, such as the liquid crystal display 253 (LCD 253), the card slot 262, the player identification portion, the speaker 257, and the duct 151 are integrally provided is fixed via a bracket.

In addition, the LCD 253, the first camera 251*a*, the first microphone 273, and the duct 151 are provided integrally with a bezel 266.

While, in the example described above, two camera made of the first camera 251*a* and the second camera 251*b* were provided, only either of these two cameras may be mounted. Similarly, only either of the first microphone 273 and the second microphone 274 may be mounted.

[Symbol Arrays of Video Reels]

The overall configuration of the gaming machine 1 has been described above. Next, with reference to FIG. 5, a configuration of the symbol arrays included in the video reels 3 of the gaming machine 1 is described. FIG. 5 is a view illustrating the arrangements of symbols drawn on the peripheral surfaces of the reels of the gaming machine according to the embodiment of the present invention.

A first video reel 3*a*, a second video reel 3*b*, a third video reel 3*c*, a fourth video reel 3*d*, and a fifth video reel 3*e* each is assigned with a symbol array consisting of 22 symbols that correspond to respective code numbers from "00" to "21".

Types of the symbols provided are "JACKPOT 7", "BLUE 7", "BELL", "CHERRY", "STRAWBERRY", "PLUM", "ORANGE", and "APPLE".

[Configuration of Circuit Included in Gaming Machine]

Figure 6:
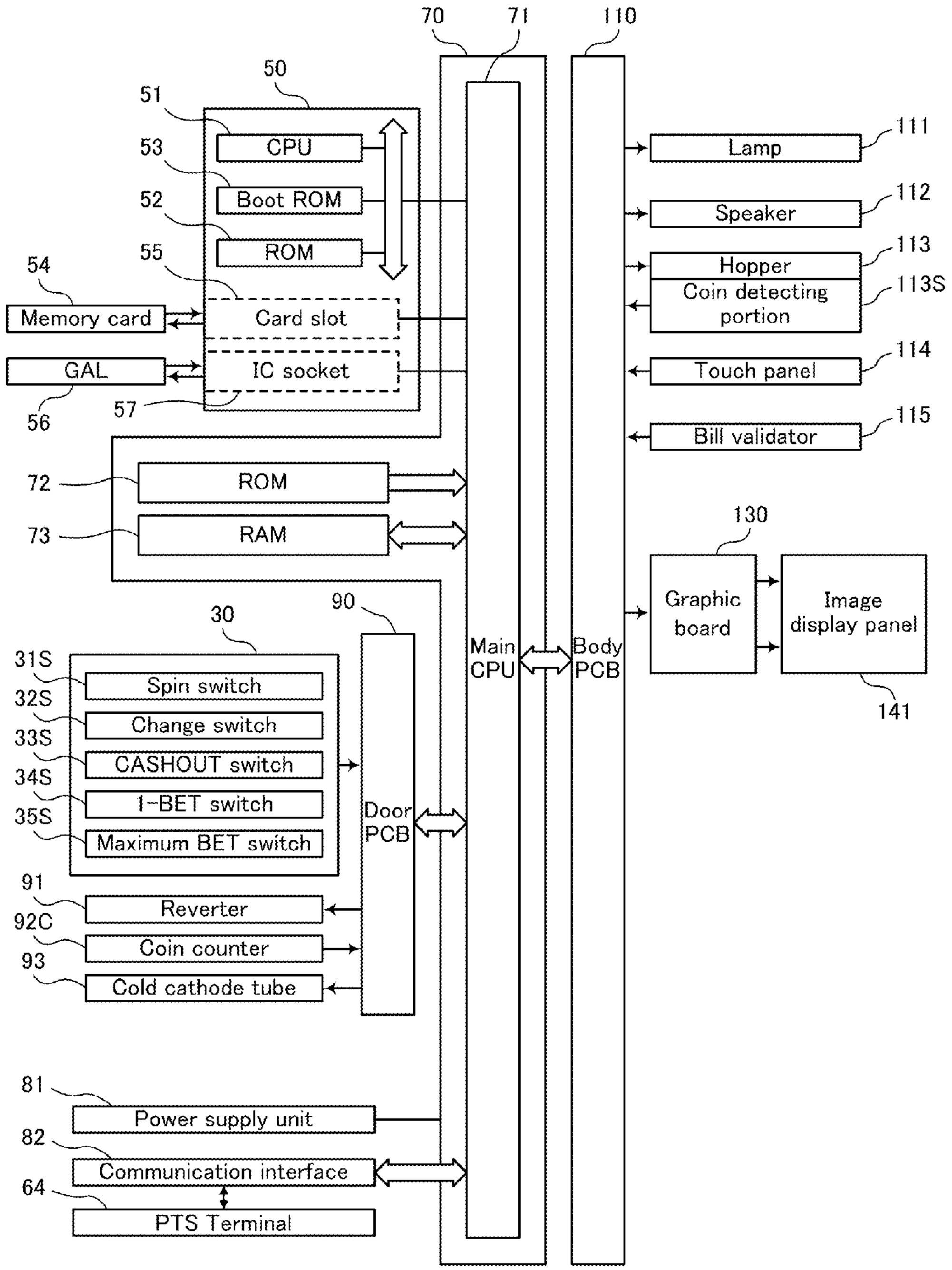
[FIG. 6] It is a block diagram depicting an internal configuration of the gaming machine on which the PTS terminal according to the embodiment of the present invention is mounted.

The configuration of the symbol arrays included in the video reels 3 of the gaming machine 1 has been described above. Next, with reference to FIG. 6, a configuration of a circuit included in the gaming machine 1 is described. FIG. 6 is a block diagram illustrating an internal configuration of the gaming machine according to the embodiment of the present invention.

A gaming board 50 is provided with: a CPU 51, a ROM 52, and a boot ROM 53, which are mutually connected by an internal bus; a card slot 55 corresponding to a memory card 54; and an IC socket 57 corresponding to a GAL (Generic Array Logic) 56.

The memory card 54 includes a non-volatile memory, and stores a game program and a game system program. The game program includes a program related to game progression, a lottery program, and a program for producing effects by images and sounds (e.g. see FIGS. 8 to 17 which are described later). Further, the aforementioned game program includes data (see FIG. 5) specifying the configuration of the symbol array assigned to each video reel 3.

The lottery program is a program for determining to-be stopped symbol of each video reel 3 by lottery. The to-be stopped symbol is data for determining four symbols to be displayed to the symbol display region 4 out of the 22 symbols forming each symbol array. The gaming machine 1 of the present embodiment determines as the to-be stopped symbol the symbol to be displayed in a predetermined region (for example, the upper region) out of the four regions provided for each of the video reels 3 of the symbol display region 4.

The aforementioned lottery program includes symbol determination data. The symbol determination data is data that specifies random values so that each of the 22 symbols (code numbers from "00" to "21") forming the symbol array is determined at an equal probability (i.e. 1/22), for each video reel 3. The probabilities of the respective 22 symbols being determined are basically equal. However, the numbers of the respective types of symbols included in the 22 symbols vary, and thus the probabilities of the respective types of symbols being determined vary (i.e. different weights on the probabilities are generated). For example, with reference to FIG. 5, the symbol array of the first video reel 3*a* includes one symbol of "JACKPOT7", and includes seven symbols of "ORANGE". Hence, the former is determined at the probability of "1/22", whereas the latter is determined at the probability of "7/22".

It is to be noted that, although the data specifies that the equal numbers of symbols be provided to form the symbol arrays of the respective video reels 3 in the present embodiment, different numbers of symbols may form the respective video reels 3. For example, the symbol array of the first video reel 3*a* may consist of 22 symbols whereas the symbol array of the second video reel 3*b* may consist of 30 symbols. Such a configuration increases the degree of freedom in setting the probabilities of the respective types of symbols being determined for each video reel 3.

Further, the card slot 55 is configured so that the memory card 54 can be inserted thereinto and removed therefrom, and is connected to a motherboard 70 by an IDE bus.

The GAL 56 is a type of PLD (Programmable Logic Device) having a fixed OR array structure. The GAL 56 is provided with a plurality of input ports and output ports, and predetermined input into the input port causes output of the corresponding data from the output port.

Further, the IC socket 57 is configured so that the GAL 56 can be inserted thereinto and removed therefrom, and is connected to the motherboard 70 by a PCI bus. The contents of the game to be played on the gaming machine 1 can be changed by replacing the memory card 54 with another memory card 54 having another program written therein or by rewriting the program written into the memory card 54 as another program.

The CPU 51, the ROM 52 and the boot ROM 53 mutually connected by the internal bus are connected to the motherboard 70 by a PCI bus. The PCI bus enables a signal transmission between the motherboard 70 and the gaming board 50, and power supply from the motherboard 70 to the gaming board 50.

The ROM 52 stores an authentication program. The boot ROM 53 stores a pre-authentication program, a program (boot code) to be used by the CPU 51 for activating the pre-authentication program, and the like. The authentication program is a program (tamper check program) for authenticating the game program and the game system program. The pre-authentication program is a program for authenticating the aforementioned authentication program. The authentication program and the pre-authentication program are written along a procedure (authentication procedure) for proving that the program to be the subject has not been tampered.

The motherboard 70 is provided with a main CPU 71, a ROM 72, a RAM 73, and a communication interface 82. The motherboard 70 corresponds to the controller of the present invention.

The ROM 72 includes a memory device such as a flash memory, and stores a program such as BIOS to be executed by the main CPU 71, and permanent data. When the BIOS is executed by the main CPU 71, processing for initializing predetermined peripheral devices is conducted; further, through the gaming board 50, processing of loading the game program and the game system program stored in the memory card 54 is started.

The RAM 73 stores data and programs which are used in operation of the main CPU 71. For example, when the processing of loading the aforementioned game program, game system program or authentication program is conducted, the RAM 73 can store the program. The RAM 73 is provided with working areas used for operations in execution of these programs. Examples of the areas include: an area that stores a counter for managing the number of games, the number of BETs, the number of payouts, the number of credits and the like; and an area that stores symbols (code numbers) determined by lottery.

The communication interface 82 is for communicating with the external control device 200 such as a server, through the communication line 301. Further, the motherboard 70 is connected with a later-described door PCB (Printed Circuit Board) 90 and a body PCB 110 by respective USBs. The motherboard 70 is also connected with a power supply unit 81. When the power is supplied from the power supply unit 81 to the motherboard 70, the main CPU 71 of the motherboard 70 is activated, and then the power is supplied to the gaming board 50 through the PCI bus so as to activate the CPU 51.

The door PCB 90 and the body PCB 110 are connected with input devices such as a switch and a sensor, and peripheral devices the operations of which are controlled by the main CPU 71. The door PCB 70 is connected with a control panel 30, a reverter 91, a coin counter 92C and a cold cathode tube 93.

The coin counter 92C validates a coin inserted into the coin accepting slot 36 based on its material, shape and the like, and outputs a signal to the main CPU 71 upon detection of a valid coin. Invalid coins are discharged from a coin payout exit 15A.

The reverter 91 operates based on a control signal outputted from the main CPU 71, and distributes valid coins validated by the coin counter 92C into a hopper 113 or a cash box (not illustrated). That is, coins are distributed into the hopper 113 when the hopper 113 is not filled with coins, while coins are distributed into the cash box when the hopper 113 is filled with coins.

The cold cathode tube 93 functions as a backlight installed on the rear face side of the image display panel 141, and lights up based on a control signal outputted from the main CPU 71.

The body PCB 110 is connected with the speaker 112, the hopper 113, a coin detecting portion 113S, the touch panel 114, the bill validator 115, a graphic board 130.

The speaker 112 outputs sounds such as BGM, based on a control signal outputted from the main CPU 71.

The hopper 113 operates based on a control signal outputted from the main CPU 71, and pays out coins of the specified number of payouts from the coin payout exit 15A to the coin tray 15. The coin detecting portion 113S outputs a signal to the main CPU 71 upon detection of coins paid out by the hopper 113.

The touch panel 114 detects a place touched by the player's finger or the like, and outputs to the main CPU 71*a* signal corresponding to the detected place. Upon acceptance of a valid bill, the bill validator 115 outputs to the main CPU 71*a* signal corresponding to the face amount of the bill. In addition, a signal corresponding to the amount of bill is also supplied to the PTS terminal 64. A signal corresponding to the amount of bill may also be supplied to the PTS terminal 64 via the motherboard 70. By doing this, it is possible to convert to amount-of-money information at a rate corresponding to the accepted amount of bill.

The graphic board 130 controls display of images conducted by the image display panel 141, based on a control signal outputted from the main CPU 71. The symbol display region 4 of the image display panel 141 displays the five video reels 3 by which the scrolling and stop motions of the symbol arrays included in the respective video reels 3 are displayed. The graphic board 130 is provided with a VDP generating image data, a video RAM temporarily storing the image data generated by the VDP, and the like. A credit number display region 142 of the image display panel 141 displays a credit number stored in RAM 73. A payout number display region 143 of the image display panel 141 displays a number of payout of coins.

The graphic board 130 is provided with the VDP (Video Display Processor) generating image data based on a control signal outputted from the main CPU 71, the video RAM temporarily storing the image data generated by the VDP, and the like. It is to be noted that the image data used in generation of image data by the VDP is included in the game program that has been read from the memory card 54 and stored into the RAM 73.

[Configuration of Symbol Combination Table]

A description of a circuit construction of a gaming machine 1 has been furnished above. Next, a symbol combination table will be described with reference to FIG. 7. FIG. 7 is a view showing a symbol combination table of a gaming machine according to the embodiment of the present invention.

The symbol combination table specifies combinations of symbols associated with winning prizes and the number of payouts. At the gaming machine 1, a winning prize is established in a case where scrolling of the symbol array of each video reel 3 is stopped and then a combination of symbols displayed on a winning line coincides with that of symbols specified according to the symbol combination table. According to the winning combination, a privilege such as coin payout or start of bonus game is awarded to a player. In a case where a combination of symbols displayed on a winning line does not coincide with any of the symbol combination specified according to the symbol combination table, no winning combination (a so called "losing") is established.

Basically, in a case where all of the symbols displayed on a winning line by means of the respective video reels 3 are symbols of one type from among "Jackpot 7", "APPLE", "BLUE 7", "BELL", "CHERRY", "STRAWBERRY", "PLUM" and "ORANGE", a winning prize is established. However, as to symbols of each of the types "CHERRY" and "ORANGE", even in a case where one or three of one type of symbol is displayed on a winning line by means of video reels 3, a winning prize is established. For example, in a case where symbols "BLUE 7" are arranged on a winning line by means of all of the video reels 3, a winning combination is established as "BLUE" and then 10 is determined as the number of payouts. Coin payout is then performed based on the determined number of payouts. Coin payout is performed by actually ejecting coins from a coin payout exit 15A, adding to the number of credits, or issuing a barcode ticket.

"JACKPOT 7" is a symbol associated with a jackpot trigger. In a case where a plurality of symbols "JACKPOT 7" is displayed on a winning line by means of all of the video reels 3, a winning combination is established as a jackpot and then a jackpot amount is determined as the number of payouts. "APPLE" is a symbol associated with a bonus game trigger. In a case where a plurality of symbols "APPLE" is displayed on a winning line by means of all of the video reels 3, a winning combination is established as a bonus game trigger and then a bonus game is started from a next play of the game.

[Contents of Program]

The symbol combination table has been described above. Next, with reference to FIGS. 8 to 17, the program to be executed by the gaming machine 1 is described.

<Main Control Processing>

Figure 8:
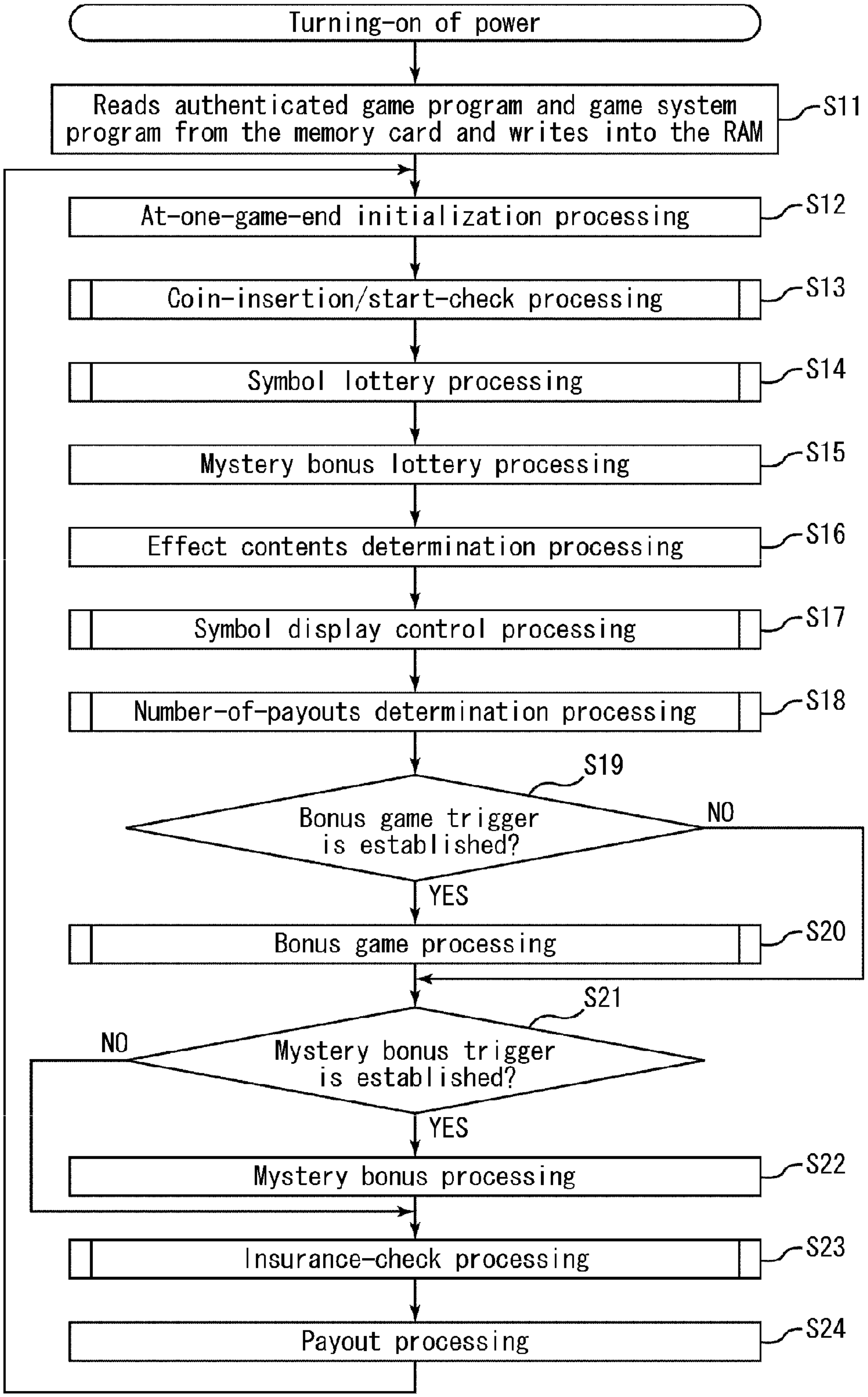
[FIG. 8] It is a flowchart showing a subroutine of main control processing in the gaming machine on which the PTS terminal according to the embodiment of the present invention is mounted.

First, with reference to FIG. 8, main control processing is described.

FIG. 8 is a view illustrating a flowchart of the main control processing for the gaming machine according to the embodiment of the present invention.

First, when the power is supplied to the gaming machine 1, the main CPU 71 reads the authenticated game program and game system program from the memory card 54 through the gaming board 50, and writes the programs into the RAM 73 (step S11).

Next, the main CPU 71 conducts at-one-game-end initialization processing (step S12). For example, data that becomes unnecessary after each game in the working areas of the RAM 73, such as the number of BETs and the symbols determined by lottery, is cleared.

The main CPU 71 conducts coin-insertion/start-check processing which is described later with reference to FIG. 9 (step S13). In the processing, input from the BET switch and the spin switch is checked.

The main CPU 71 then conducts symbol lottery processing which is described later with reference to FIG. 12 (step S14). In the processing, to-be stopped symbols are determined based on the random values for symbol determination.

Next, the main CPU 71 conducts mystery bonus lottery processing (step S15). In the processing, lottery determining whether or not to establish a mystery bonus trigger is held. For example, the main CPU 71 extracts a random value for mystery bonus from the numbers in a range of "0 to 99", and establishes the mystery bonus trigger when the extracted random value is "0".

The main CPU 71 conducts effect contents determination processing (step S16). The main CPU 71 extracts a random value for effect, and determines any of the effect contents from the preset plurality of effect contents by lottery.

The main CPU 71 then conducts symbol display control processing which is described later with reference to FIG. 13 (step S17). In the processing, scrolling of the symbol array of each video reel 3 is started, and the to-be stopped symbol determined in the symbol lottery processing of step S14 is stopped at a predetermined position (e.g. the upper region in the symbol display region 4). That is, four symbols including the to-be stopped symbol are displayed in the symbol display region 4. For example, when the to-be stopped symbol is the symbol associated with the code number of "10" and it is to be displayed to the upper region, the symbols associated with the respective code numbers of "11", "12" and "13" are to be displayed to the respective upper central region, lower central region and lower region in the symbol display region 4.

Next, the main CPU 71 conducts number-of-payouts determination processing which is described later with reference to FIG. 14 (step S18). In the processing, the number of payouts is determined based on the combination of symbols displayed along one of the winning lines, and is stored into a number-of-payouts counter provided in the RAM 73.

Next, the main CPU 71 determines that a bonus game trigger has not been established in (step S19). When the main CPU 71 determines that the bonus game trigger has been established, the main CPU 71 conducts bonus game processing shown in FIG. 16 to be described later (step S20).

Next, subsequent to the processing in step S20 or when the main CPU 71 determines that the bonus game trigger has not been established in step S19, the main CPU 71 determines whether or not a mystery bonus trigger has been established (step S21). When determining that the mystery bonus trigger has been established, the main CPU 71 conducts the mystery bonus processing (step S22). In the processing, the number of payouts (e.g. 300) being set for the mystery bonus is stored into the number-of-payouts storage area provided in the RAM 73.

After the processing of step S22 or when determining in step S21 that the mystery bonus trigger has not been established, the main CPU 71 conducts insurance-check processing which is described later with reference to FIG. 15 (step S23). In the processing, whether or not to conduct payout by the insurance is checked.

The main CPU 71 conducts payout processing (step S24). The main CPU 71 adds the value stored in the number-of-payouts counter to a number-of-credits counter provided in the RAM 73. It is to be noted that operations of the hopper 113 may be controlled based on operation from the TAKE WIN/COLLECT button 33, and coins of the number corresponding to the value stored in the number-of-payouts counter may be discharged from the coin payout exit 15A. Further, operations of the ticket printer 171 may be controlled and a ticket with a barcode may be issued on which a value stored in the number-of-payouts counter is recorded. After the processing has been conducted, the processing is shifted to step S12.

<Coin-Insertion/Start-Check Processing>

Figure 9:
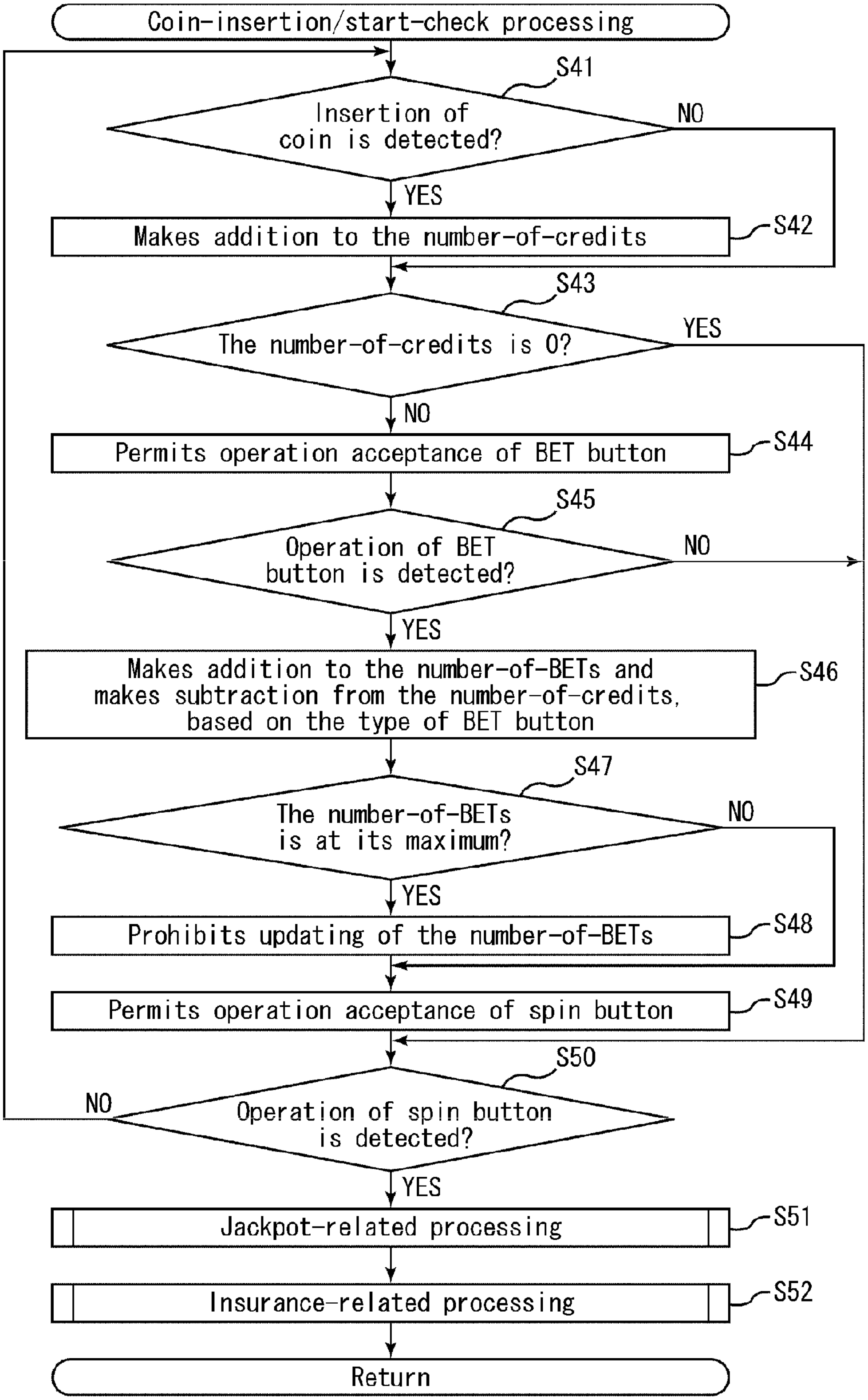
[FIG. 9] It is a flowchart showing a subroutine of coin insertion/start check processing in the gaming machine on which the PTS terminal according to the embodiment of the present invention is mounted.

Next, with reference to FIG. 9, coin-insertion/start-check processing is described. FIG. 9 is a view illustrating a flowchart of the coin-insertion/start-check processing for the gaming machine according to the embodiment of the present invention.

First, the main CPU 71 determines whether or not insertion of a coin has been detected by the coin counter 92C (step S41). When determining that the insertion of a coin has been detected, the main CPU 71 makes an addition to the number-of-credits counter (step S42). It is to be noted that, in addition to the insertion of a coin, the main CPU 71 may determine whether or not insertion of a bill has been detected by the bill validator 115, and when determining that the insertion of a bill has been detected, the main CPU 71 may add a value according to the bill to the number-of-credits counter.

After step S42 or when determining in step S41 that the insertion of a coin has not been detected, the main CPU 71 determines whether or not the number-of-credits counter is zero (step S43). When the main CPU 71 determines that the number-of-credits counter is not zero, the main CPU 71 permits operation acceptance of the BET buttons (step S44).

Next, the main CPU 71 determines whether or not operation of any of the BET buttons has been detected (step S45). When the main CPU 71 determines that the BET switch has detected press of the BET button by the player, the main CPU 71 makes an addition to a number-of-BETs counter provided in the RAM 73 and makes a subtraction from the number-of-credits counter, based on the type of the BET button (step S46).

The main CPU 71 then determines whether or not the number-of-BETs counter is at its maximum (step S47). When the main CPU 71 determines that the number-of-BETs counter is at its maximum, the main CPU 71 prohibits updating of the number-of-BETs counter (step S48). After step S48 or when determining in step S47 that the number-of-BETs counter is not at its maximum, the main CPU 71 permits operation acceptance of the spin button (step S49).

After step S49 or when determining in step S45 that the operation of any of the BET buttons has not been detected, or when determining in step S43 that the number-of-credits counter is zero, the main CPU 71 determines whether or not operation of the spin button has been detected (step S50). When the main CPU 71 determines that the operation of the spin button has not been detected, the processing is shifted to step S41.

When the main CPU 71 determines that the operation of the spin button has been detected, the main CPU 71 conducts jackpot-related processing which is described later with reference to FIG. 10 (step S51). In the processing, the amount to be accumulated to the amount of jackpot is calculated, and the amount is transmitted to the external control device 200.

Next, the main CPU 71 conducts insurance-related processing which is described later with reference to FIG. 11 (step S52). In the processing, counting of the number of games is conducted which triggers a payout by the insurance. After the processing has been conducted, the coin-insertion/start-check processing is completed.

<Jackpot-Related Processing>

Figure 10:
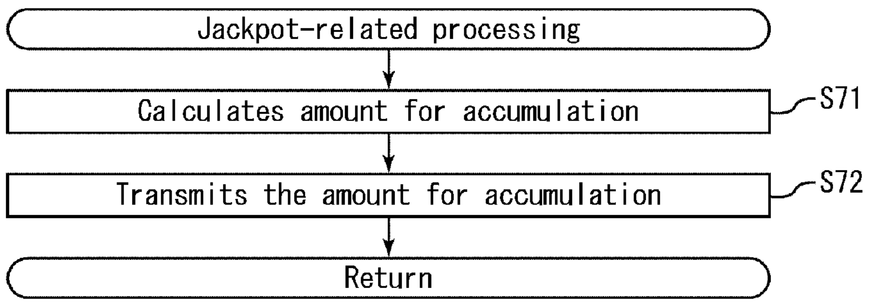
[FIG. 10] It is a flowchart showing a subroutine of jackpot-related processing in the gaming machine on which the PTS terminal according to the embodiment of the present invention is mounted.

Now, with reference to FIG. 10, the jackpot-related processing is described.

FIG. 10 is a view illustrating a flowchart of the jackpot-related processing for the gaming machine according to the embodiment of the present invention.

First, the main CPU 71 calculates the amount for accumulation (step S71). The main CPU 71 obtains the product of the value of the number-of-BETs counter and a preset accumulation ratio, so that the amount for accumulation to the amount of jackpot is calculated.

Next, the main CPU 71 transmits the calculated amount for accumulation to the external control device 200 (step S72). Upon reception of the amount for accumulation, the external control device 200 updates the amount of jackpot. After the processing has been conducted, the jackpot-related processing is completed.

<Insurance-Related Processing>

Figure 11:
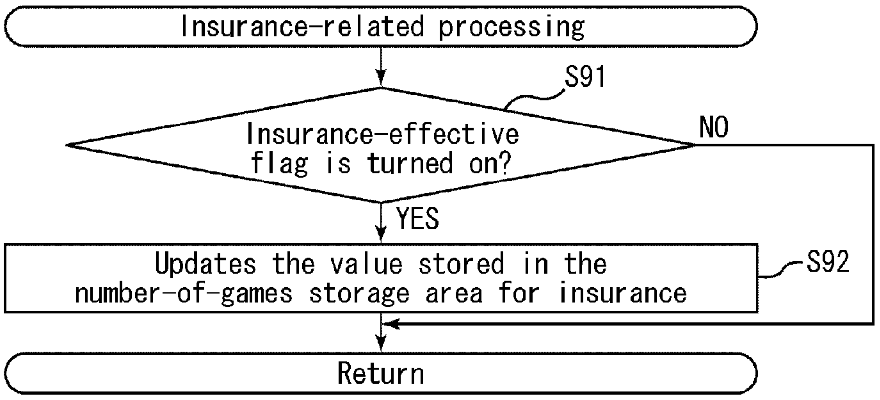
[FIG. 11] It is a flowchart showing a subroutine of insurance-related processing in the gaming machine on which the PTS terminal according to the embodiment of the present invention is mounted.

Next, with reference to FIG. 11, the insurance-related processing is described.

FIG. 11 is a view illustrating a flowchart of the insurance-related processing for the gaming machine according to the embodiment of the present invention.

First, the main CPU 71 determines whether or not an insurance-effective flag is turned on (step S91). The insurance-effective flag is turned on when a command to make the insurance effective is inputted by the player in the insurance selection processing which is described later with reference to FIG. 17.

When the main CPU 71 determines that the insurance-effective flag is not turned on, the main CPU 71 completes the insurance-related processing. On the other hand, when the main CPU 71 determines that the insurance-effective flag is turned on, the main CPU 71 updates a number-of-games counter for insurance provided in the RAM 73 (step S92). The number-of-games counter for insurance is a counter for managing the number of games up to the time of the payout by the insurance. In the processing of step S92, the main CPU 71 adds one to the number-of-games counter for insurance. After the processing has been conducted, the insurance-related processing is completed.

<Symbol Lottery Processing>

Figure 12:
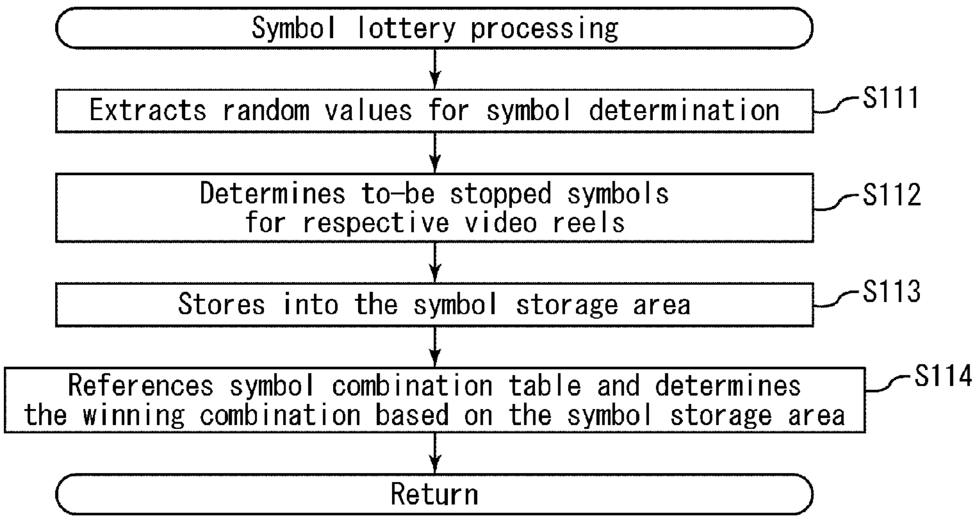
[FIG. 12] It is a flowchart showing a subroutine of symbol lottery processing in the gaming machine on which the PTS terminal according to the embodiment of the present invention is mounted.

Next, with reference to FIG. 12, the symbol lottery processing is described.

FIG. 12 is a view illustrating a flowchart of the symbol lottery processing for the gaming machine according to the embodiment of the present invention.

First, the main CPU 71 extracts random values for symbol determination (step S111). Next, the main CPU 71 then determines to-be stopped symbols for the respective video reels 3 by lottery (step S112). The main CPU 71 holds a lottery for each video reel 3, and determines any one of the 22 symbols (code numbers from "00" to "21") as a to-be stopped symbol. At this time, each of the 22 symbols (code numbers from "00" to "21") is determined at an equal probability (i.e. 1/22).

Next, the main CPU 71 then stores the determined to-be stopped symbols for the respective video reels 3 into a symbol storage area provided in the RAM 73 (step S113). Next, the main CPU 71 references the number-of-payouts determination table (FIG. 7) and determines a winning combination based on the symbol storage area (step S114). The main CPU 71 determines the winning combination based on the combination of symbols to be displayed along the winning line by the respective video reels 3 and the number-of-payouts determination table. After the processing has been conducted, the symbol lottery processing is completed.

<Symbol Display Control Processing>

Figure 13:
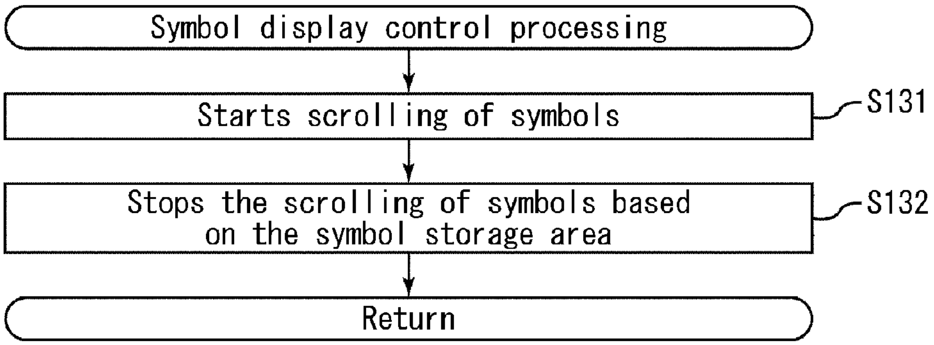
[FIG. 13] It is a flowchart showing a subroutine of symbol display control processing in the gaming machine on which the PTS terminal according to the embodiment of the present invention is mounted.

Next, with reference to FIG. 13, the symbol display control processing is described.

FIG. 13 is a view illustrating a flowchart of the symbol display control processing for the gaming machine according to the embodiment of the present invention.

First, the main CPU 71 starts scrolling of the symbol arrays of the respective video reels 3 that are displayed to the symbol display region 4 of the image display panel 141 (step S131). The main CPU 71 then stops the scrolling of the symbol arrays of the respective video reels 3, based on the aforementioned symbol storage area (step S132). After the processing has been conducted, the symbol display control processing is completed.

<Number-of-Payouts Determination Processing>

Figure 14:
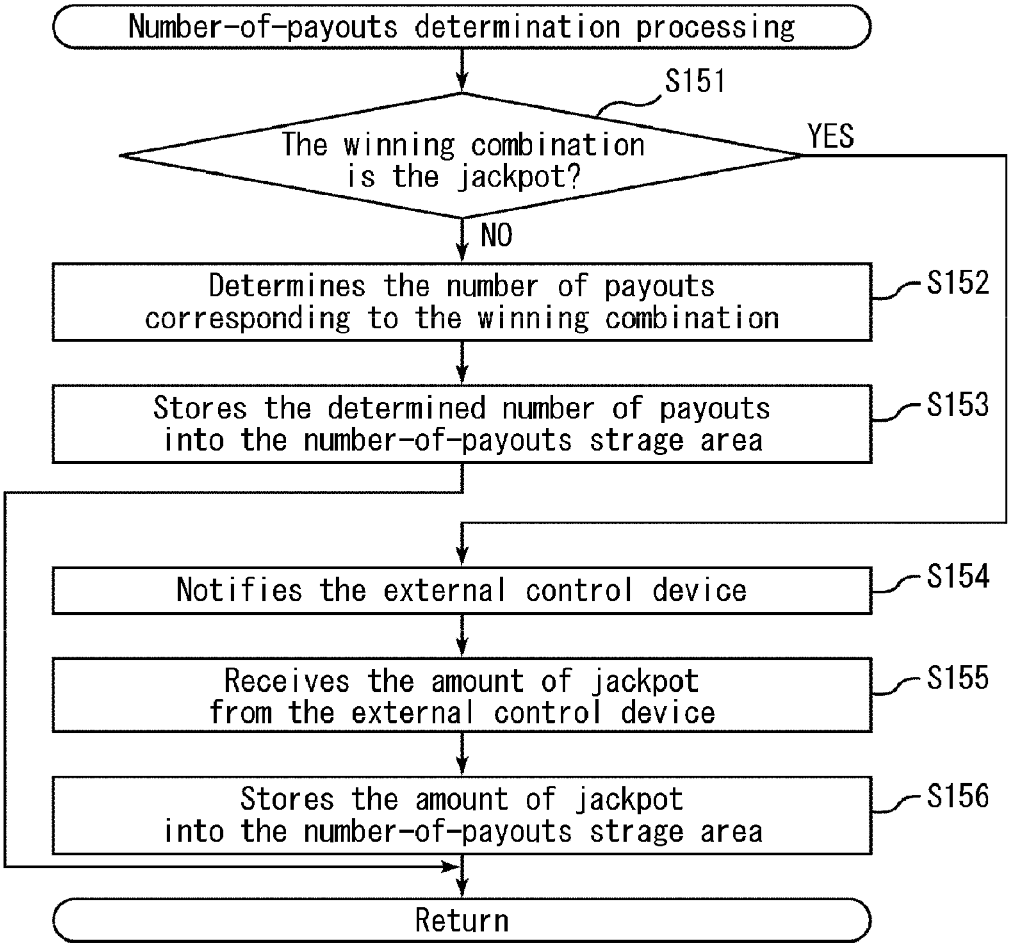
[FIG. 14] It is a flowchart showing a subroutine of number-of-payouts in the gaming machine on which the PTS terminal according to the embodiment of the present invention is mounted.

Next, with reference to FIG. 14, the number-of-payouts determination processing is described. FIG. 14 is a view illustrating a flowchart of the number-of-payouts determination processing for the gaming machine according to the embodiment of the present invention.

The main CPU 71 first determines whether or not the winning combination is the jackpot (step S151). When the main CPU 71 determines that the winning combination is not the jackpot, the main CPU 71 determines the number of payouts corresponding to the winning combination (step S152). The determination of the number of payouts is conducted in the way described with reference to FIG. 7. It is to be noted that the main CPU 71 determines "0" as the number of payouts in the case where the game is lost. Next, the main CPU 71 stores the determined number of payouts into the number-of-payouts counter (step S153). After the processing has been conducted, the number-of-payouts determination processing is completed.

When the main CPU 71 determines that the winning combination is the jackpot, the main CPU 71 notifies the external control device 200 of the winning of the jackpot (step S154). It is to be noted that, upon reception of the notification, the external control device 200 transmits to the gaming machine 1 the amount of jackpot having updated up to that time. At this time, a part (e.g. 80%) of the amount of jackpot may be the payout subject and the rest (e.g. 20%) may be carried over for the upcoming establishment of the jackpot trigger.

Next, the main CPU 71 receives the amount of jackpot from the external control device 200 (step S155). The main CPU 71 then stores the received amount of jackpot into the number-of-payouts counter (step S156). After the processing has been conducted, the number-of-payouts determination processing is completed.

<Insurance-Check Processing>

Figure 15:
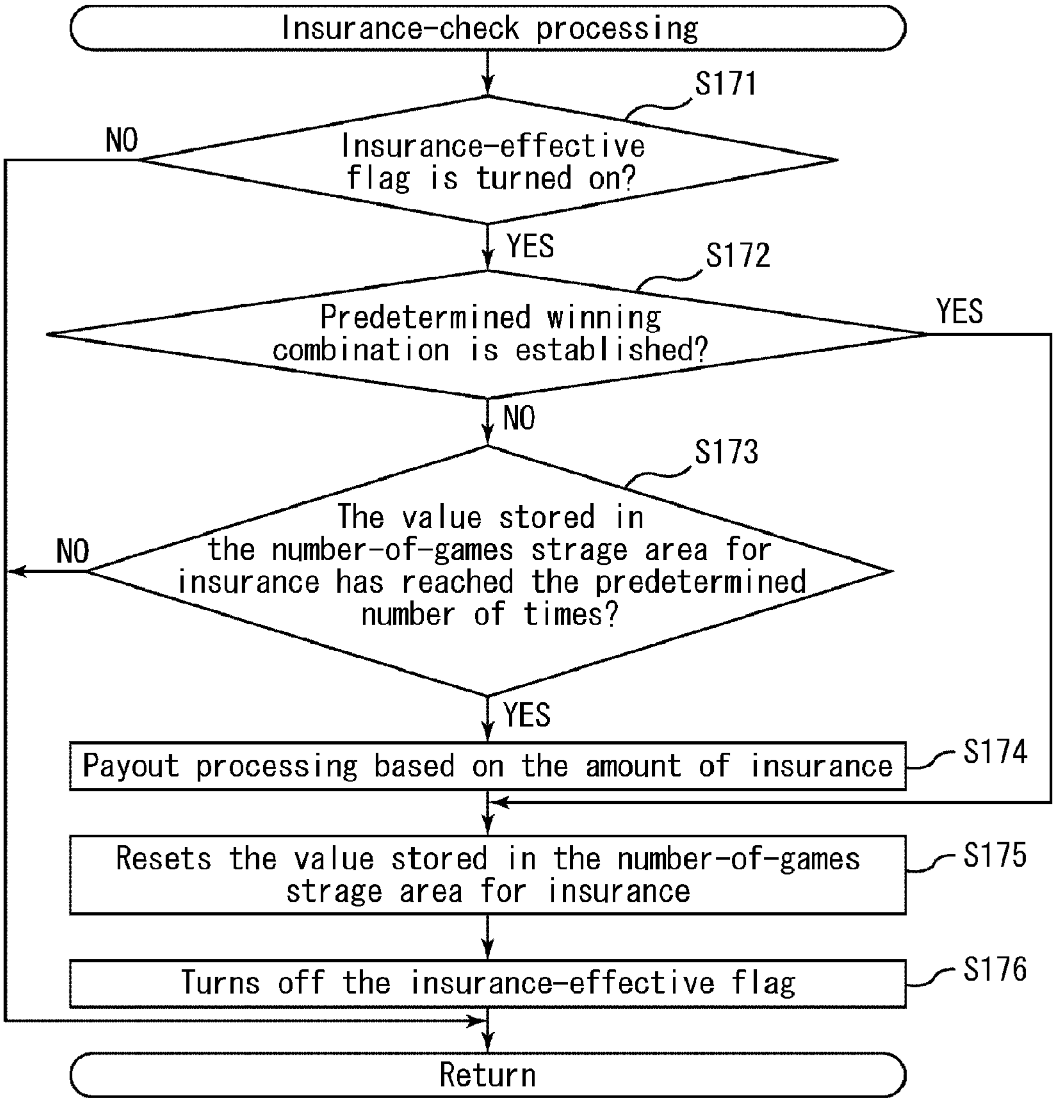
[FIG. 15] It is a flowchart showing a subroutine of insurance check processing in the gaming machine in which the PTS terminal according to the embodiment of the present invention is mounted.

Next, with reference to FIG. 15, the insurance-check processing is described. FIG. 15 is a view illustrating a flowchart of the insurance-check processing for the gaming machine according to the embodiment of the present invention.

First, the main CPU 71 determines whether or not the insurance-effective flag is turned on (step S171). When the main CPU 71 determines that the insurance-effective flag is not turned on, the main CPU 71 completes the insurance-check processing.

When the main CPU 71 determines that the insurance-effective flag is turned on, the main CPU 71 determines whether or not a predetermined winning combination has been established (step S172). In the present embodiment, "free game trigger", "jackpot" and "mystery bonus" are subjects of the predetermined winning combination.

When the main CPU 71 determines that the predetermined winning combination has not been established, the main CPU 71 determines whether or not the number-of-games counter for insurance has reached a predetermined number of times (e.g. 300) (step S173). When the main CPU 71 determines that the number-of-games counter for insurance has not reached the predetermined number of times, the main CPU 71 completes the insurance-check processing.

When the main CPU 71 determines that the number-of-games counter for insurance has reached the predetermined number of times, the main CPU 71 conducts payout processing based on the amount of insurance (step S174). The main CPU 71 adds an amount (e.g. 200) previously set as the amount of insurance to the number-of-credits counter.

After step S174 or when determining in step S172 that the predetermined winning combination has been established, the main CPU 71 resets the number-of-games counter for insurance (step S175). Next, the main CPU 71 turns the insurance-effective flag off (step S176). After the processing has been conducted, the insurance-check processing is completed.

<Bonus Game Processing>

Figure 16:
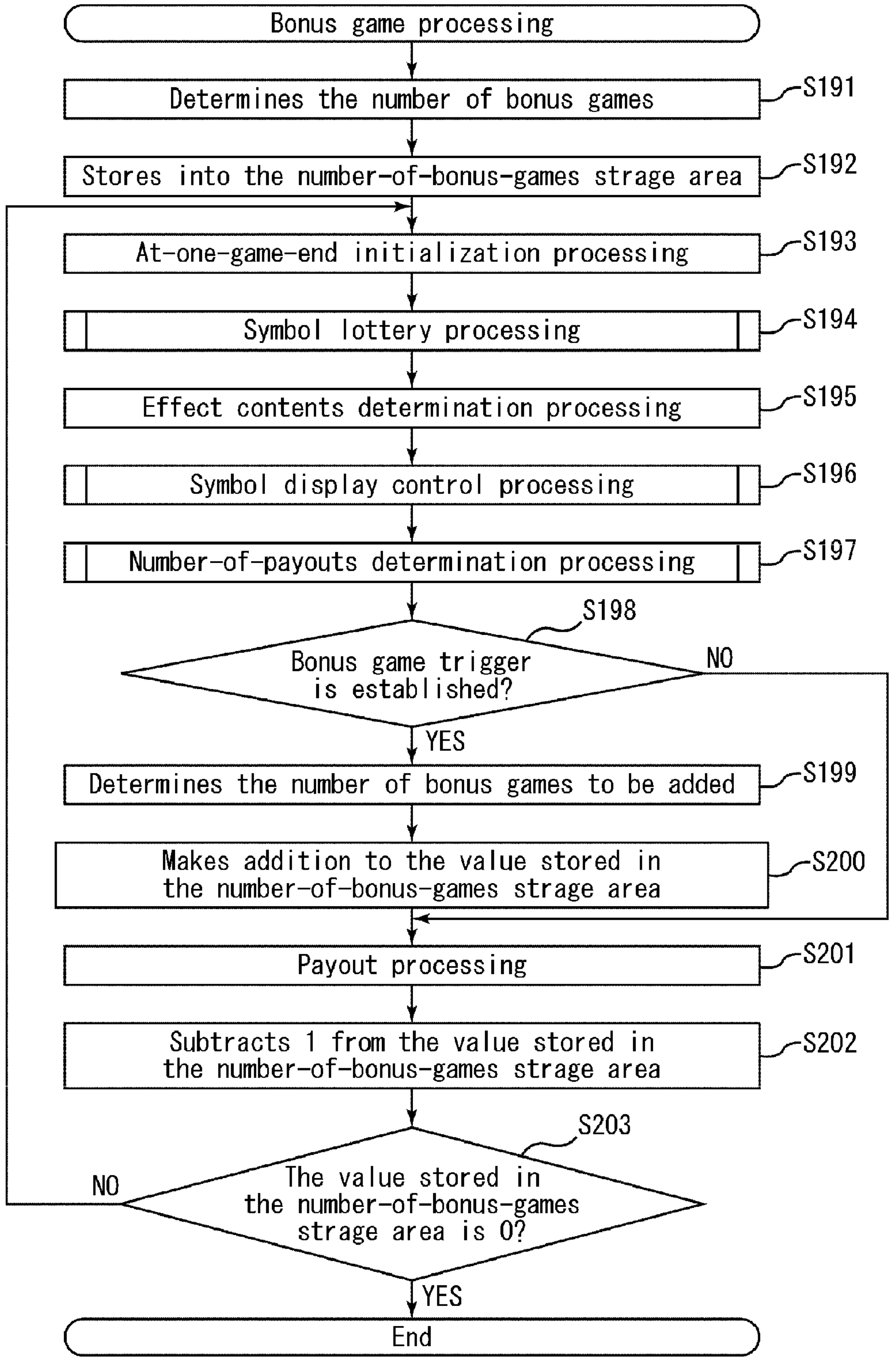
[FIG. 16] It is a flowchart showing a subroutine of bonus game processing in the gaming machine on which the PTS terminal according to the embodiment of the present invention is mounted.

Next, with reference to FIG. 16, the bonus game processing is described. FIG. 16 is a view illustrating a flowchart of the bonus game processing for the gaming machine according to the embodiment of the present invention.

First, the main CPU 71 determines the number of the bonus games (step S191). The main CPU 71 extracts random number values for determining the number of bonus games and then determines any of a plurality of playable times of bonus game such as "50", "70", and "100", for example, by means of lottery.

Next, the main CPU 71 stores the determined number of bonus games in a number-of-bonus-games storage region which is provided in the RAM 73 (step S192).

Next, like the processing of step S12 described with reference to FIG. 8, the main CPU 71 conducts at-one-game-end initialization processing (step S193). Next, the main CPU 71 then conducts symbol lottery processing described with reference to FIG. 12 (step S194). Next, the main CPU 71 conducts effect content determination processing in a manner similar to that in step S16 described with reference to FIG. 8 (step S195). Next, the main CPU 71 then conducts symbol display control processing described with reference to FIG. 13 (step S196). The main CPU 71 then conducts number-of-payouts determination processing described with reference to FIG. 14 (step S197).

Next, the main CPU 71 determines whether or not a bonus game trigger has been established (step S198). When the main CPU 71 determines that the bonus game trigger has been established, the main CPU 71 determines the number of bonus games to be added (step S199). The number of bonus games is determined in a manner similar to that in the processing of step 191 describe previously. The main CPU 71 then adds the determined number of bonus games to a value stored in a number-of-bonus game storage region (step S200).

Subsequent to the processing in step S200 or when the main CPU 71 determines that the bonus game trigger has not been established in step S198, the main CPU 71 conducts payout processing (step S201). In this payout processing, the main CPU 71 adds the value stored in the number-of-payouts storage region in the number-of-payouts determination processing in step S197 described previously to a value stored in a number-of-bonus-payouts storage region. The number-of-bonus-payouts storage region is directed to a region for storing a total number of payouts determined in bonus game. When bonus game processing completes, the main CPU 71 adds the value stored in the number-of-bonus-payouts storage region to a value stored in a number-of-payouts number provided in the RAM 73 in the payout processing of step S24 described with reference to FIG. 8. Namely, a total number of payouts determined in bonus game are collectively paid out. Coins may be ejected from the coin payout exit 15A or barcode-attached tickets may be issued.

Next, the main CPU 71 subtracts 1 from the value stored in the number-of-bonus games storage region (step S202). The main CPU 71 then determines whether or not the value stored in the number-of-bonus-games storage region is 0 (step S203). When the main CPU 71 determines that the value stored in the number-of-bonus-games storage region is not 0, the routine migrates to step S193. When the CPU 71 determines that the value stored in the number-of-bonus games storage region is 0, bonus game processing is completed. After the bonus game processing has been completed, the routine migrates to step S21 described with reference to FIG. 8.

<Insurance Selection Processing>

Figure 17:
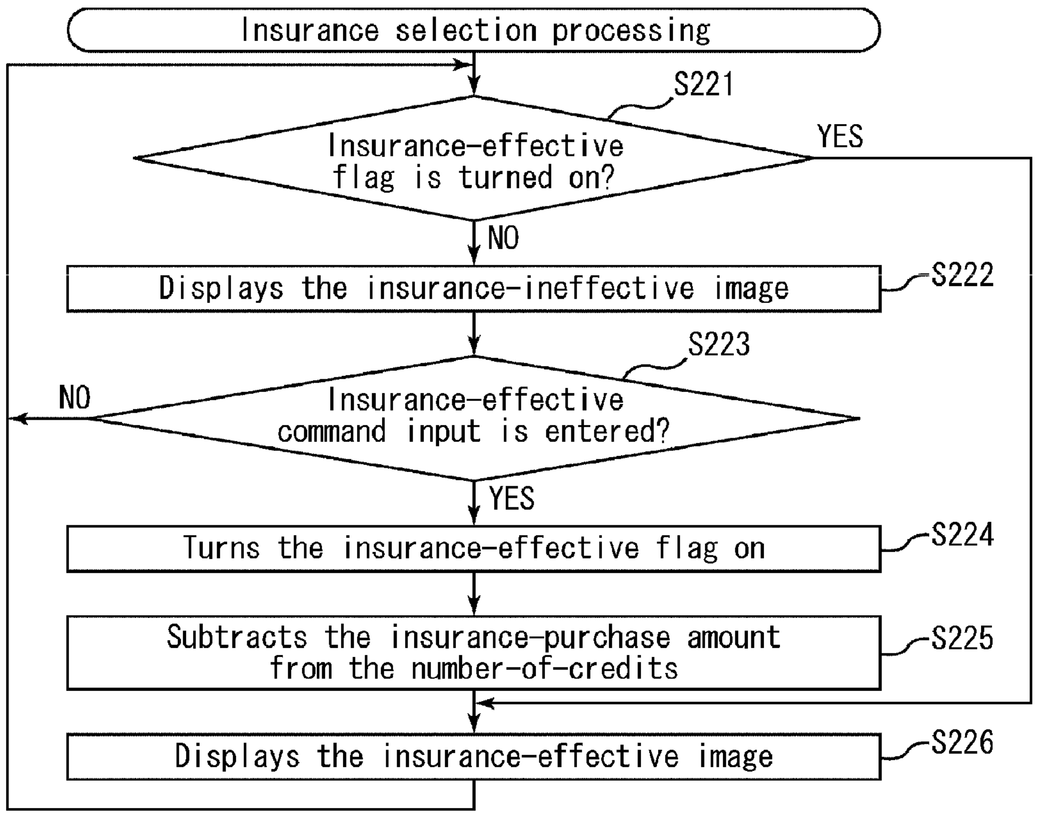
[FIG. 17] It is a flowchart showing a subroutine of insurance selection processing in the gaming machine on which the PTS terminal according to the embodiment of the present invention is mounted.

Next, with reference to FIG. 17, the insurance selection processing is described.

FIG. 17 is a view illustrating a flowchart of the insurance selection processing for the gaming machine according to the embodiment of the present invention.

First, the main CPU 71 determines whether or not the insurance-effective flag is turned on (step S221). When the main CPU 71 determines that the insurance-effective flag is not turned on, the main CPU 71 displays an insurance-ineffective image (step S222). The main CPU 71 transmits a command to display the insurance-ineffective image to the graphic board 130. Based on the command, the graphic board 130 generates the insurance-ineffective image and displays the image to the image display panel 141.

As the insurance-ineffective image, for example, an image showing "INSURANCE BET $1.00 TOUCH TO BET" is displayed. This image is an image for prompting the player to select whether or not to make the insurance effective, and notifying the player of the amount required for making the insurance effective. The player can input a command to make the insurance effective by touching a predetermined place on the touch panel 114.

Subsequently, the main CPU 71 determines whether or not an insurance-effective command input has been entered (step S223). When the main CPU 71 determines that the insurance-effective command input has not been entered, the main CPU 71 shifts the processing to step S221 with the insurance-effective flag turned off. On the other hand, when the main CPU 71 determines that the insurance-effective command input has been entered, the main CPU 71 turns the insurance-effective flag on (step S224).

Next, the main CPU 71 subtracts the insurance-purchase amount from the number-of-credits counter (step S225). In the present embodiment, an amount corresponding to, for example, one dollar is subtracted from the number-of-credits counter. After step S225 or when determining in step S221 that the insurance-effective flag is turned on, the main CPU 71 displays the insurance-effective image (step S226). As the insurance-effective image, for example, an image showing "INSURANCE CONTINUED WIN 200 CREDIT" is displayed. This image is an image informing the player that the insurance is effective, and that the value of "200" is to be added to the number-of-credits counter when the insurance condition is satisfied. After the processing has been conducted, the processing is shifted to step S221.

Figure 18:
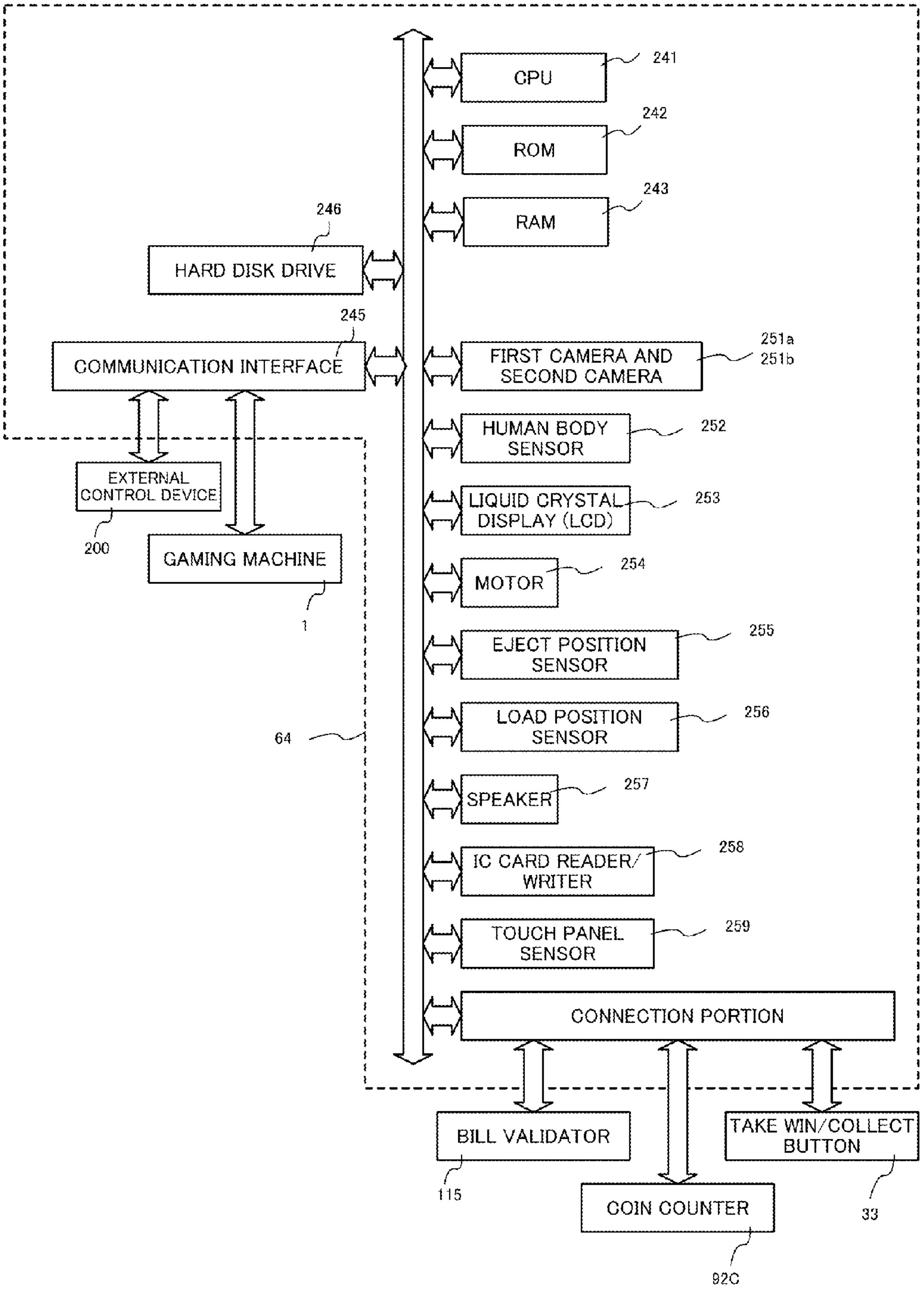
[FIG. 18] It is a block diagram depicting a configuration of the PTS terminal according to the embodiment of the present invention.

FIG. 18 is a bock diagram depicting an internal configuration of a PTS terminal 64 constituting a gaming machine 1. The PTS terminal 64 corresponds to a "player tracking system".

The PTS terminal 64 has a CPU 241, a ROM 242, a RAM 243, a connection portion 244, a communication interface 245, and a hard disk drive 246. A controller including the CPU 241, the ROM 242, and the RAM 243 corresponds to the "controller" in the present invention.

The communication interface 245 is connected, via a communication line, to a communication interface 82 of one slot machine 1 which is in a corresponding relationship with the PTS terminal 64. In addition, the communication interface 245 is connected to an external control device 200 as well, via a communication line. As described later, from the PTS terminal 64, a card ID or amount-of-money information is transmitted to the external control device 200. In addition, from the external control device 200, amount-of-money information corresponding to the card ID is transmitted to the PTS terminal 64.

The ROM 242 stores system programs for controlling an operation of the PTS terminal 64; programs shown in FIGS. 19, 20, 21, and 23; or permanent data and the like. In addition, the RAM 243 temporarily stores values such as variables used in these programs.

The hard disk drive 246 stores image data of a visual image of a player that is picked up by means of the CCD camera 251.

Further, the PTS terminal 64 is provided with a clock function, and performs clocking every time a predetermined period elapses. Clocking is performed by acquiring clock data from a clock included in the external control device 200 (management server) or from the outside via the Internet. By doing this, the PTS terminal 64 is capable of acquiring date and time information.

Furthermore, the PTS terminal 64 has a timer function, and activates a timer with a predetermined timing and then measures a timer value to thereby able to measure time having elapsed when the timer is activated. The measured timer value is supplied to the CPU 241. A timer may be the one which is formed by means of hardware or may be formed by means of software.

A bill validator 115 and a coin counter 92C are connected to the connection portion 244 via a communication line.

The bill validator 115 validates types and legitimacy of bills in a plurality of countries other than basic currencies and accepts legitimate bills. When the bill validator 115 accepts a legitimate bill, the bill validator outputs an input signal to the CPU 241, based on the type and amount of the bill. The input signal includes: currency type data that is indicative of the validated type of currency; and amount-of-currency data that is indicative of the amount of the currency. That is, the input signal includes information relating to the type and amount of the accepted bill.

The coin counter 92C is provided inside of the coin accepting slot 36, and validates legitimacy of a coin that is entered into the coin accepting slot 36 by a player. Those other than a legitimate coin are ejected through a coin payout outlet 15A. In addition, the coin counter 92C outputs an input signal to the CPU 241 when a legitimate coin is detected.

The PTS terminal 64 has a CCD camera 251. The CCD camera 251 picks up a visual image of a player who has played a game at a gaming machine 1, and the image data picked up as an image by means of the CCD camera 251 is supplied to the CPU 241. As described above, the image data picked up as an image by means of the CCD camera 251 is stored in the hard disk drive 246. By doing this, the visual image of the player who has played a game at the gaming machine 1 can be recorded. The CCD camera 251 corresponds to the "player detection device".

Further, at the PTS terminal 64, apart from the CCD camera 251, the human body detection sensor 252 may be provided. the human body detection sensor 252 is adapted to detect whether or not a player exists at the gaming machine 1. The human body detection sensor 252 may be able to detect the presence or absence of a player, and may be a reflection-type photo interrupter exerted by a photosensor or a sensor employing infrared-rays or the like. In addition, the CCD camera 251 may be employed as a human body detection sensor.

The PTS terminal 64 has a liquid crystal display 253 (hereinafter, referred to as LCD 253). On the LCD 253, alerting is displayed for a player or the staff in gaming facility.

The PTS terminal 64 has a motor 254. The motor 254 is adapted to carry an IC card through the card slot 262 into the PTS terminal 64 or to carry the IC card from the inside of the PTS terminal 64 to the card slot 262. A position at which the IC card is positioned at the card slot 262 is referred to as an eject position. The IC card stored into the PTS terminal 64, and a position that is capable of reading out an IC card from or writing it into an IC card reader/writer 258 to be described later (hereinafter, referred to as reader/writer 258) is referred to as a load position.

The motor 254 is capable of carrying an IC card to an ordinary stacker and an alert stacker as well. As described later, the ordinary stacker is adapted to house an initialized IC card. The alert stacker is adapted to house an IC card targeted to be alerted by meeting a predetermined alert condition. Thus, by driving the motor 254, it is possible to carry an IC card to the card slot 262 and then positioned it thereat (eject position), to carry an IC card to the load position inside of the PTS terminal 64 and then position it thereat, or to carry an IC card to the ordinary stacker or alert stacker to thereby able to house the IC card to the ordinary stacker or alert stacker.

The PTS terminal 64 has an eject position sensor 255. The eject position sensor 255 is a sensor for detecting whether or not an IC card is positioned at the card slot 262 (eject position).

Specifically, at an opening part of the card slot 262, a shutter (not shown) for preventing additional entry of an IC card is provided. In a case where an IC card is set at a load position, the shutter is closed so as not to able to additionally enter an IC card. Alternatively, in a case where an IC card is not set at the load position, the shutter is opened so as to be able to the IC card to the load position. When an IC card is positioned at the card slot 262 (eject position), the shutter is in an opened state.

The eject position sensor 255 is disposed near this shutter. The eject position sensor 255 detects whether or not an IC card is positioned at the card slot 262 (eject position). When the IC card is positioned at the card slot 262, a signal that is indicative of the fact that the IC card is positioned at the card slot 262 is issued. According to the presence or absence of this signal, a determination is made as to whether or not the IC card is detected in step S2013 or S2027 in FIG. 20 to be described later.

The PTS terminal 64 has a load position sensor 256. The load position sensor 256 is a sensor for detecting whether or not an IC card is positioned at a position that is capable of reading or writing by means of the reader/writer 258 (load position).

The PTS terminal 64 has a speaker 257. From the speaker 257, an alert sound is output.

The PTS terminal 64 has an IC card R/W 258 (reader/writer 258). The reader/writer 258 reads data from an IC card or to transmits the read data to the CPU 241 or write data into the IC card, based on a control signal from the CPU 241.

As described above, amount-of-money information can be written into an IC card. In addition to writing amount-of-money information, the amount-of-money information can be read out from the IC card as well. The reading and writing of the amount-of-money information are performed by means of the reader/writer 258.

At the gaming machine 1, in a case where a variety of denominations can be handled, the PTS terminal 64 converts to the amount of local currency according to a rate at that time point, and writes the converted amount of money as amount-of-money information into the IC card.

Further, identification information such as serial number for identifying an IC card (card ID) is also stored in the IC card. It is preferable that the card ID be only read out, and be stored in advance in the IC card so as not to be rewritable. This card ID can also be read out by means of the reader/writer 258.

<<IC Card Processing>>

Figure 19:
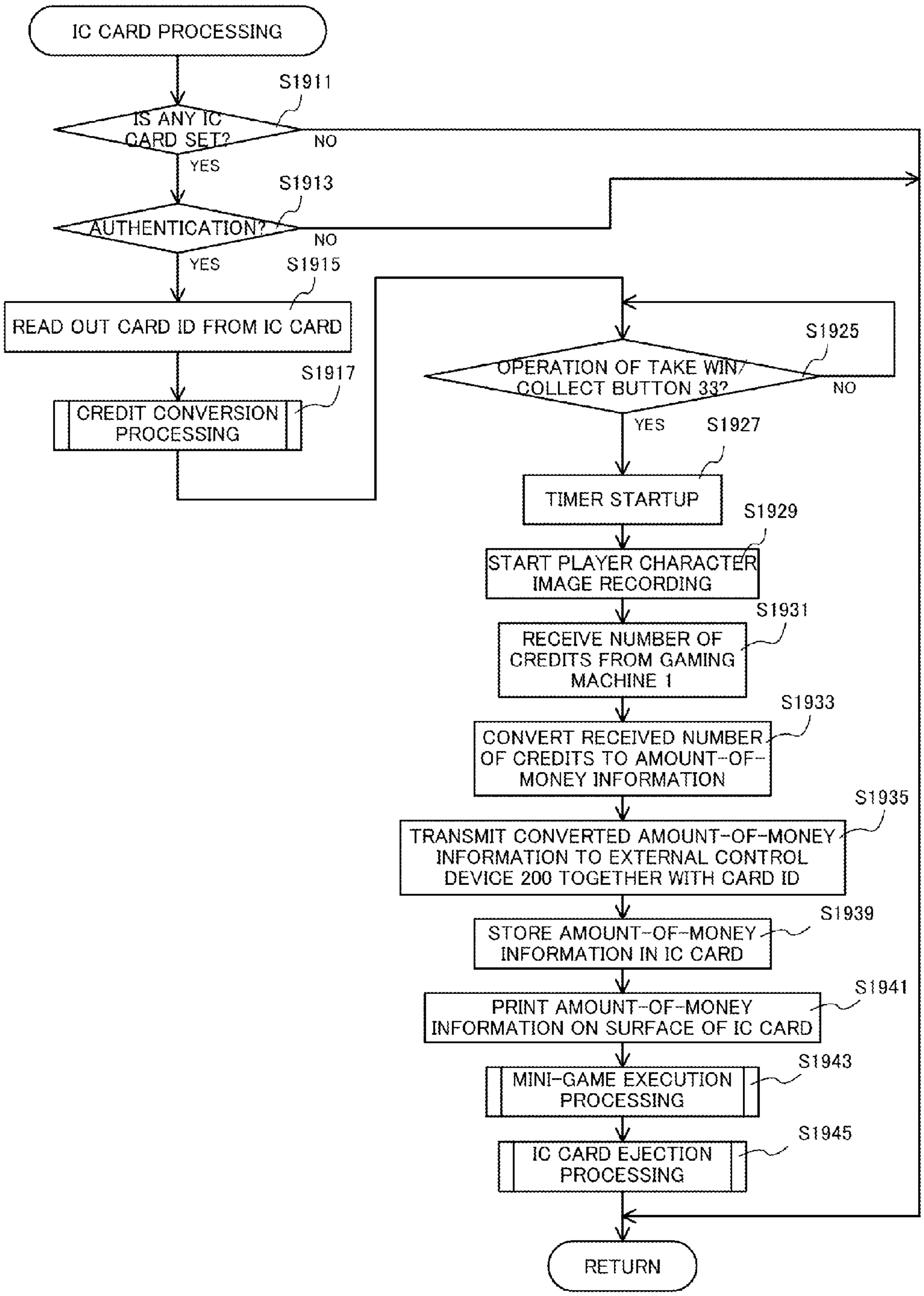
[FIG. 19] It is a flowchart showing a subroutine of IC card processing that is employed at the PTS terminal according to the embodiment of the present invention.

FIG. 19 is a flowchart showing a subroutine of executing processing operations relating to IC card. An IC card is inserted through a card slot 262 by means of a player operation. A motor 254 (IC card carrying motor 254) is driven, whereby the IC card that is inserted into a card slot 262 is loaded up to a position at which reading and writing of the IC card are possible (hereinafter, referred to as load position). In addition, by driving the motor 254, the IC card can be carried to a position of a stacker (not shown). There are two different types of stackers, an ordinary stacker (not shown) and an alert stacker (not shown). In either of the stackers, a predetermined number of IC cards can be housed.

The ordinary stacker is adapted to house an initialized IC card. A PTS terminal 64 is electrically connected to a gaming machine 1, and when a player operates a TAKE WIN/COLLECT button 33 of the gaming machine 1, a signal that is indicative of the fact that an operation is made is supplied to the PTS terminal 64. When the PTS terminal 64 receives signal, one IC card is carried from the ordinary stacker up to the load position by means of a retraction motor. When the IC card is carried up to the load position, the amount-of-money information is stored in the IC card, the amount-of-money information being indicative of the amount of money corresponding to the number of credits left as a result of a game that the player has been played so far, and then the card is carried to an eject position. The eject position is a position in a state in which part of the IC card is exposed or protruded from the card slot 262. By doing this, the player pinches a part of the IC card that is exposed or protruded from the card slot 262, thereby making it possible to remove the IC card.

The alert stacker is adapted to house an IC card targeted to be alerted, in a case where a predetermined alert condition is met. This alert condition is that, even if a predetermined period of time has elapsed after an IC card has been carried to the eject position, a player fails to remove that IC card from the card slot 262. In a case where this alert condition is met, the IC card is carried from the eject position up to the alert stacker and then the carried IC card is housed in the alert stacker by driving the motor 254.

First, a CPU 241 determines whether or not an IC card exists at the load position (step S1911). This determination processing is made based on whether or not a detection signal is issued from a sensor that is provided at the load position of the IC card. Any sensor may be employed as long as it is capable of detecting the existence of the IC card and then outputting a detection signal irrespective of whether it is optical or mechanical. By the presence or absence of the detection signal, it is possible to determine whether or not the IC card is set at the load position in a readable or writable manner.

At the load position described above, a reader/writer 258 is disposed for reading and writing an IC card. The IC card is disposed at the load position, thereby making it possible to write information into the IC card or read out information from the IC card via the reader/writer 258. When it is determined that no IC card exists at the load position (NO), this subroutine is completed immediately.

When the CPU 241 determines that the IC card exists at the load position (YES), the CPU 241 determines whether or not authentication is successful (step S1913). Authentication is a processing operation for reading out information specific to the IC card and then determining that the read can be processed by means of the PTS terminal 64. By doing this, it is possible to verify that a card related to the PTS terminal 64 is not set. Alternatively, in a case where a user ID is stored in an IC card, the contents of that user ID is determined, thereby making it possible to determine whether or not the IC card is a legitimate IC card issued by that gaming facility. When it is determined that authentication is not successful (NO), this subroutine is completed immediately.

When the CPU 241 determines that authentication is successful, the CPU 241 reads out the card ID that is stored in the IC card (step S1915). The card ID is information for identifying the IC card, and a serial number or the like can be employed. Next, the CPU 241 invokes and executes a subroutine of credit conversion processing shown in FIG. 29 to be described later (step S1917).

Next, the CPU 241 determines whether or not a player operates a TAKE WIN/COLLECT button 33 of the gaming machine 1 (step S1925). When it is determined that the player does not operate the TAKE/COLLECT button 33 of the gaming machine 1 (NO), the routine is reverted to step S1925. Thus, when the determination processing of step S1925 is repeatedly performed, a game is advanced according to a player operation at the gaming machine 1. In this duration, at the gaming machine 1, the number of credits is varied according to the progress of the game.

When the CPU 241 determines that the TAKE WIN/COLLECT button 33 of the gaming machine 1 is operated in the determination processing of step 1925 (YES), a timer (not shown) of the PTS terminal 64 is activated (step S1927). This timer may be formed by means of hardware or may be formed by means of software.

Next, the CPU 241 picks up a visual image of a player by means of a CCD camera 251 that is provided at the PTS terminal 64, and causes that image data in a hard disk drive 246 of the PTS terminal 64 (step S1929). By doing this, the visual image of the player can be recorded.

Next, the CPU 241 receives the number of credits that is transmitted from the gaming machine 1 (step S1933), converts the received number of credits to amount-of-money information (step S1935), and transmits the converted amount-of-money information to an external control device 200 together with the card ID of the IC card (step S1937). At the external control device 200, the transmitted amount-of-money information is associated with the card ID, and is stored in a storage unit of the external control device 200.

By executing the processing operations of steps S1919 to S1935 described above, when the TAKE WIN/COLLECT button 33 of the gaming machine 1 is operated by a player, the number of credits that is stored in a RAM 243 of the gaming machine 1 at that time point is transmitted to the PTS terminal 64, making it possible to store the amount-of-money information corresponding to the number of credits in the storage unit of the external control device 200. By doing this, the amount-of-money information that is to be managed by the external control device 200 can be updated to the latest one. Every time a game of the gaming machine 1 is advanced, the number of credits may be transmitted from the gaming machine 1 to the PTS terminal 64.

Next, the CPU 241 causes the IC card to store the converted amount-of-money information in the processing operation of step S1935 (step S1939), and prints the amount-of-money information on a surface of the IC card (step S1941). The surface of the IC card, character information is adapted to be able to print character information to be variable, by utilizing E-INK, memory-based liquid crystal or electronic paper. At the load position of the IC card described above, in addition to the reader/writer 258 associated with a storage region inside the IC card, a printing mechanism is provided for performing printing on the surface of the IC card.

Next, the CPU 241 reads out and executes a subroutine for executing a mini-game 1 shown in FIG. 21 or a subroutine for executing a mini-game 2 shown in FIG. 28 to be described later (step S1943), reads out and executes a subroutine for ejecting an IC card shown in FIG. 22 to be described later (step S1945), and completes this subroutine.

By executing this subroutine shown in FIG. 19, amount-of-money information of a result obtained when a game is played at the gaming machine 1 can be stored in the storage region inside of the IC card, and the amount-of-money information can be printed on the surface of the IC card. By doing this, a player can recognize his or her own amount-of-money information at that time point by means of the amount-of-money information that is printed on the surface of the IC card without need to employ the reader of the IC card.

In the processing operation of step S1943 described above, only either one of the mini-game 1 and the mini-game 2 is defined to be always executed, thereby making it possible to selectively execute either of them. In a case where either of the mini-games is selectively executed, it may be defined to be invoked by means of lottery processing.

<<IC Card Ejection Processing>>

Figure 20:
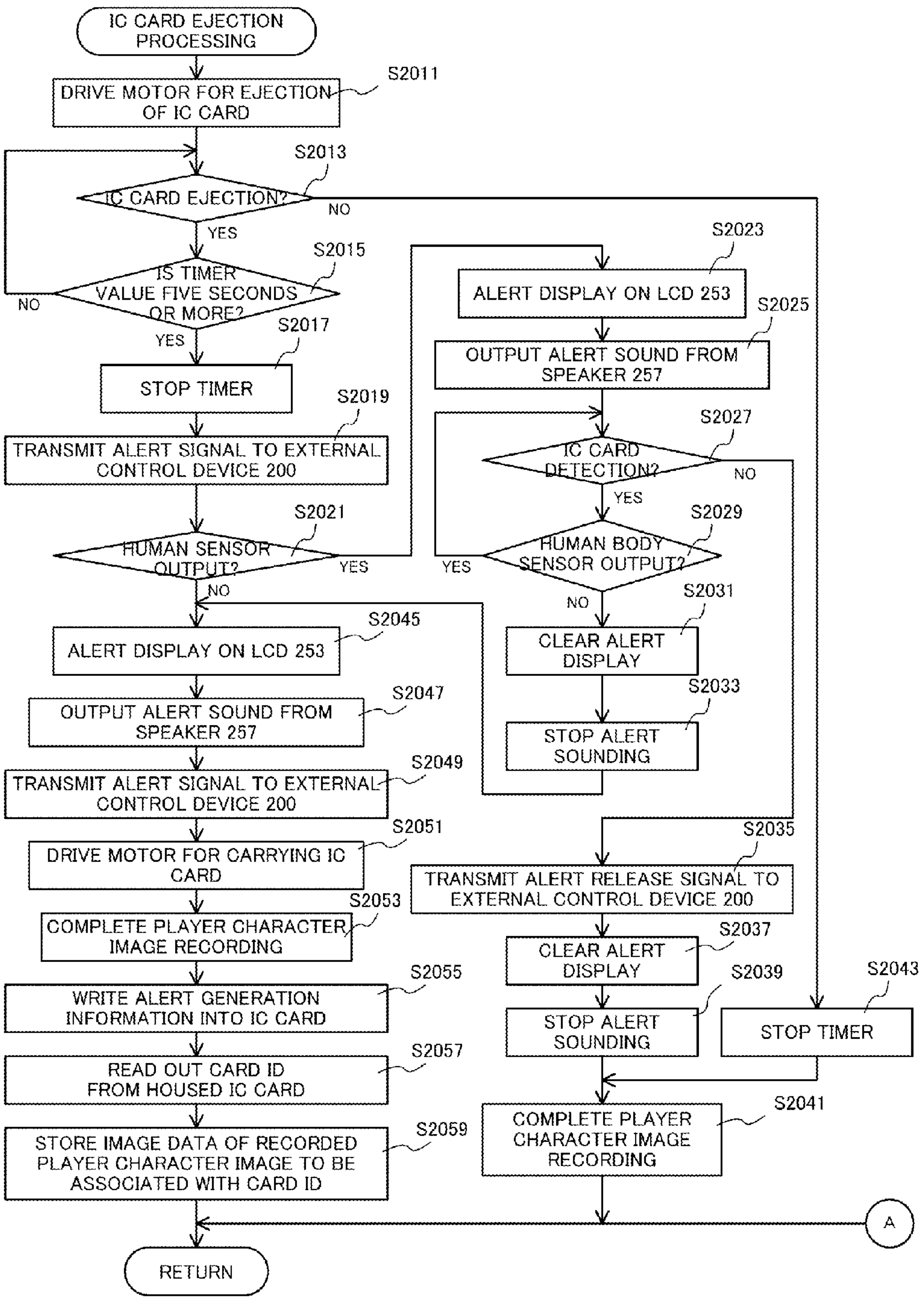
[FIG. 20] It is a flowchart showing a subroutine of IC card ejection processing that is employed at the PTS terminal according to the embodiment of the present invention.

FIG. 20 is a flowchart showing a subroutine for executing processing operation when an IC card is carried from a load position to an eject position and then the carried IC card is ejected therefrom.

First, a CPU 241 drives a motor 254 for carrying an IC card (step S2011). Next, the CPU 241 determines whether or not an IC card exists at a card slot 262, that is, determines whether or not an IC card exists at an eject position (step S2013). At the card slot 262, a sensor for detecting an IC card is provided. The determination processing of step S2013 is made based on whether or not a detection signal is issued from this sensor. Any sensor may be employed as long as it is capable of detecting the existence of the IC card and outputting a detection signal whether it is of a optical type or a mechanical type. By the presence or absence of the detection signal, it is possible to determine whether or not the IC card is set at the card slot 262 (eject position).

Next, when the CPU 241 determines that the IC card exists at the card slot 262 (YES), the CPU 241 determines whether or not a timer value activated in the processing operation of step S1927 described above is a predetermined period of time or more, for example, five seconds or more (step S2015). The predetermined period of time may be defined based on time required from carrying of an IC card to the card slot 262 to a player removing that IC card. When it is determined that the timer value is less than the predetermined period of time (YES), the routine is reverted to step S2013.

Alternatively, when the CPU 241 determines that the timer value is the predetermined period of time or more in the determination processing of step S2015, the CPU 241 stops the timer (step S2017) and then transmits an alert signal to an external control device 200 (so called hall server) (step S2019). By doing this, it is possible to broadcast the external control device 200 that there is a possibility that failure to take an IC card at a gaming machine 1 occurs. In the processing operation of step S2019, it is preferable to transmit the alert signal to the external control device 200 together with a specific identification number that is assigned to the gaming machine 1. By doing this, the external control device 200 is capable of specifying the fact that no IC card is removed from the card slot 262 and a gaming machine 1 from which no IC card is removed.

Next, the CPU 241 determines whether or not an output signal is issued from a human body detection sensor 252 (step S2021). The human body sensor 252 is adapted to determine whether or not a player exists in front of a gaming machine 1. The human body detection sensor 252, in general, may be a reflection-type photo interrupter exerted by a photosensor in addition to the CCD camera 251 described above or may be the one that is capable of detecting whether or not a human exists in front of a gaming machine 1. The human body detection sensor 252 issues a detection signal when the sensor detects that a human body exists.

When the CPU 241 determines that the output signal is issued from the human body detection sensor 252 in the determination processing of step S2021, that is, when the CPU 241 determines that a player exists in front of the gaming machine 1, an alert indication is displayed on a LCD 253 of a PTS terminal 64 (step S2023) and then an alert sound is output from a speaker 257 of the PTS terminal 64 (step S2025). The display of the alert or the output of the alert sound is performed for a player who has played a game at the gaming machine, and is adapted to cause the player to recognize that there is a possibility that he or she fails to take an IC card and then prompt the player to remove the IC card.

Next, the CPU 241 determines whether or not an IC card exists at the card slot 262, that is, determines whether or not an IC card exists at an eject position (step S2027). This determination is similar to the determination processing of step S2013 described above. The determination is made based on whether or not a detection signal is issued from a sensor that is provided at the card slot 262.

When the CPU 241 determines that the IC card exists at the card slot 262 (YES), the CPU 241 determines whether or not a detection signal is issued from the human body detection sensor (step S2029). This determination processing of step S2029 is a processing operation that is similar to that of step S2021 described above. When it is determined that the detection signal is issued from the human body sensor (YES), the routine is reverted to step S2027. That is, since a player exists in front of the gaming machine 1, an alert indication is displayed for or an alert sound is output to that player to be thereby able to make the player recognize that there is possibility that he or she fails to take an IC card and then prompt the player to take the IC card.

When the CPU 241 determines that no IC card exists at the card slot 262, that is, determines that no IC card exists at the eject position (NO), in the determination processing of step S2027 described above, an alert elimination signal indicative of the fact that an alert is eliminated is transmitted to the external control device 200 (step S2035). The alert elimination signal is transmitted to the external control device 200, thereby making it possible to broadcast the external control device 200 the fact that a player recognizes that he or she fails to take an IC card by means of display of the alert of step S2023 described above or by means of output of the alert sound of step S2025 described above and then the player removes the IC card from the card slot 262, thereby eliminating an alert condition.

After executing the processing operation of step S2035, the CPU 241 clears an alert indication that is displayed in the processing operation of step S2023 (step S2037), and stops the alert sound that is activated in the processing operation of step S2025 (step S2039). Next, the CPU 241 completes recording of the visual image of the player, which is started in the processing operation of step S1929 in FIG. 19 (step S2041) and then completes this subroutine.

In addition, when the CPU 241 determines that no IC card exists at the card slot 262 in the determination processing of step S2013 described above (NO), that is, in a case where a player removes an IC card from the card slot 262 without display of an alert or output of an alert sound, the timer that is activated in the processing operation of step S1927 is stopped (step S2043) and then the routine is reverted to step S2041 described above.

The routine is executed in accordance with the procedures as described above in a case where a player removes an IC card from a card slot without display of an alert or output of an alert sound or in a case where a player recognizes failure to take the IC card, by means of the display of the alert or output of the alert sound, and then, removes the IC card from the card slot 262, for example.

Alternatively, when the CPU 241 determines that no detection signal is issued from the human body detection sensor in the determination processing of step S2029 (NO), the alert indication that is displayed in the processing operation of step S2023 is eliminated (step S2031), and the alert sound that is issued in the processing operation of step S2025 is stopped (step S2033). That is, since no player exists in front of the gaming machine 1, there is no need to display an alert for or output an alert sound to that player, and the alert indication is stopped and then the output of the alert sound is stopped.

When the CPU 241 determines that no output signal is issued from the human body detection sensor 252 in the determination processing of step S2021 described above (NO), that is, when the CPU 241 determines that no player exists in front of the gaming machine 1 or when the CPU 241 executes the processing operation of step 2033 described above, an alert indication is displayed on the LCD 253 of the PTS terminal 64 (step S2045), an alert sound is output from the speaker 257 of the PTS terminal 64 (step S2047), and then, an alert signal is transmitted to the external control device 200 (so called hall server) (step S2049).

These processing operations of steps S2045, S2047, and S2049 are processing operations to be executed when it is determined that no player exists in front of the gaming machine 1 in the determination processing of step S2021 or S2029. That is, the processing operations of steps S2045, S2047, and S2049 are processing operations for gaming facility in which gaming machines 1 are installed, not for causing a player to recognize that he or she fails to take an IC card. Therefore, it is preferable that an alert indication or an alert sound and the like be different from that in the processing operation of step S2023 or S2025. By doing thus, it is possible to appropriately broadcast the staff in gaming facility that there exists a gaming machine 1 from which a player fails to take an IC card. By means of these alert indication and alert sound, it is possible for the staff in gaming facility to go to that gaming machine 1 and take appropriate action speedily.

In addition, date and time when the alert signal in the processing operation of step S2049 is issued or identification information of gaming machines 1 is stored in the external control device 200, thereby making it possible to manage the fact that an IC card is left. It is possible for the staff in gaming facility to appropriately take action when the player makes inquiry of the fact later.

Next, the CPU 241 houses the IC card from the eject position into the PTS terminal 64 by driving a motor for IC card retraction (step S2051). In particular, it is preferable that the IC card be housed into the alert stacker. The alert stacker is adapted to house an IC card targeted to be alerted in a case where a predetermined alert condition is met. The alert condition is that even if a predetermined period of time elapsed (step S2015) after an IC card is positioned after carried to the eject position (step S2011), a player does not take that IC card from the card slot 262 (step S2021 or S2025). In the case where the alert condition is met, the motor 254 is driven by means of the processing operation of step S2051, whereby the IC card is carried from the eject position to the alert stacker and then is housed in the alert stacker. As described later, in order to execute processing operations of writing the alert generation information into the IC card and reading the card ID of the IC card, it is preferable to temporarily carry the IC card to the load position, execute these processing operations, and house the IC card into the alert stacker prior to housing the alert stacker.

If a user fails to take an IC card, it is preferable that the staff in gaming facility go to the gaming facility and then take appropriate action, as described above. However, in a case where the staff in gaming facility is busy doing another service, it is presupposed that he or she cannot go there immediately. In such a case, there is a possibility that another player obtained the left IC card thereby to illegally obtain credits. Thus, even in the case where the staff in gaming facility cannot go there immediately, the left IC card is housed in the alert stacker, thereby making it possible to prevent illegal act in advance.

After executing the processing operation of step S2051, the CPU 241 completes recording of a visual image of a player, which is started in the processing operation of step S1929 in FIG. 19 (step S2053), temporarily carry the IC card to the load position, and then, writes the alert generation information indicative of the fact the alert condition is met, in the IC card (step S2055). By doing this, it is possible to identify that the IC card is left.

Next, the CPU 241 reads out the card ID of the IC card (step S2057), associates the read out card ID with recording data of the recorded visual image, stores the associated data in the hard disk drive 246 of the PTS terminal 64 (step S2059), and completes this subroutine.

A table indicative of a correlation between the card ID that is stored in the hard disk drive 246 of the PTS terminal 64 and the recording data of the visual image by means of the processing operation of step S2059 is shown in FIG. 22. The table shown in FIG. 22 conceptually shows the data that is stored in the hard disk drive 246 of the PTS terminal 64. In the example shown in FIG. 22, the card ID is "001245", and may be information that is capable of identifying a card ID. For example, a serial number of the card ID or identification number assigned at the gaming facility may be employed. In addition, recording data is mobile data or the like, for example, and there can be employed a variety of formats for mobile data that can be stored in the hard disk drive 246. In the example shown in FIG. 22, recording data is "090715-131213-0012.avi", which is a file name for storing the data in the hard disk drive 246.

The read out card ID and recording data of the recorded visual image are stored in the hard disk drive 246, whereby, in a case where a player makes inquiry to the staff in gaming facility as to failure to take the IC card later, it is possible to speedily and appropriately return the IC card to the authorized player by referring to the card ID and the recording data of the visual image.

In a case where it is detected that a player exists, by means of the human body detection sensor 252 in the determination processing of step S2021 in FIG. 20, first, as an alert of a first step, an alert indication is displayed for the player or an alert sound is generated. In a case where the player does not recognize failure to take an IC card by means of such alert indication or alert sound and then leave a gaming machine 1 without removing the IC card, as an alert at a second step, an alert indication is displayed for gaming facility or an alert sound is generated.

By doing this, it is possible to cause a player to actively recognize failure to take an IC card, and when the player fails to recognize the fact, the current alert is switched to an alert for gaming facility, thereby making it possible to prevent illegal act in advance such that another player obtains the credits.

It is desirable that plural types of alert indications or an alert sounds be defined in advance, a type of alert indication or alert sound be varied according to the amount of money indicated by amount-of-money information. For example, an alert determination table in which types of alerts are defined in advance according to the amount of money indicated by the amount-of-money information is stored in the ROM 242 of the PTS terminal 64. As types of alert indications displayed on the LCD 253, there are exemplified the contents of messages, character sizes or colors, and modes of blinking or the like. In addition, as types of voice alerts to be output from the speaker 257, there are exemplified sounds of music, alert sounds, volumes or pitches of sounds and the like.

An alert determination table is searched for by using amount of money indicated by amount-of-money information that is stored in the IC card, and then, a type of alert is determined according to the amount of money indicated by the amount-of-money information. In a case where an IC card is left at the card slot 262 in spite of the fact the amount of money indicated by the amount-of-money information is large, there is a possibility that a player merely fails to leave the IC card, and therefore, it is desirable that there be a conspicuous alert to make the player easily recognized. This processing operation may be performed by employing the number of credits in place of the amount of money indicated by the amount-of-money information.

In the determination processing of step S2021 or S2029, a determination as to whether or not a player exists by means of the human body detection sensor may be made a plurality of times or over a predetermined period of time in place of being made only once. In a case where a player is getting ready to go home or is getting ready to move a gaming machine 1, there is a possibility that the player is set in a crouched position or is changing his or her posture, and the determination as to whether or not a player exists is made a plurality of times or is made over a predetermined period of time, thereby making it possible to appropriately determine whether or not the player exists.

<<Execution Processing of Mini-Game 1>>

Figure 21:
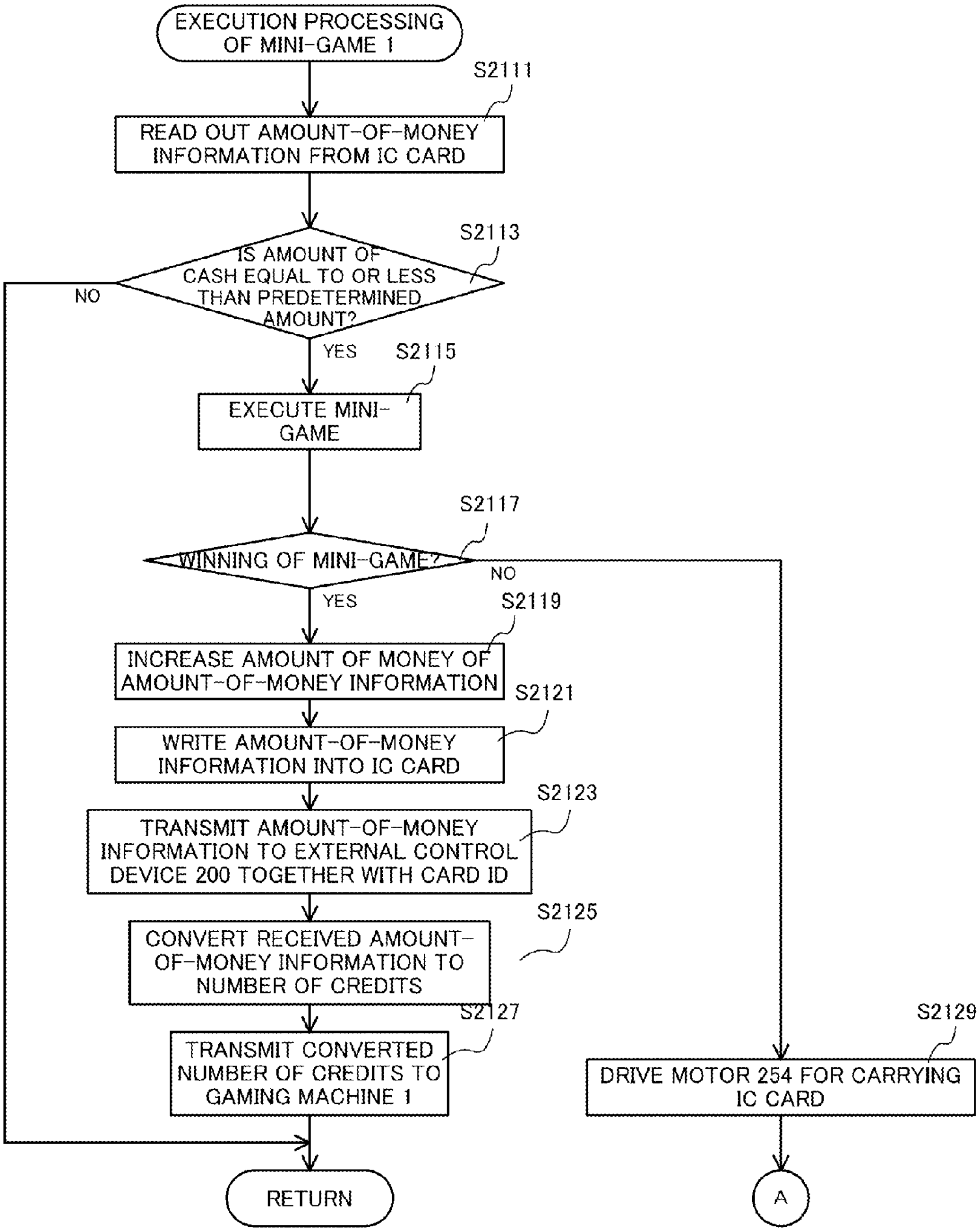
[FIG. 21] It is a flowchart showing a subroutine of processing in a mini-game 1 that is performed at the PTS terminal according to the embodiment of the present invention.

FIG. 21 is a flowchart showing a subroutine for executing a mini-game 1 to be invoked and executed in the processing operation of step S1943 in FIG. 19 described above. Therefore, in the embodiment, the mini-game 1 is executed at a PTS terminal 64.

At the PTS terminal 64 of the embodiment, bills of different denominations can be exchanged to credits for game. That is, a bill is entered to a bill validator 115 of a gaming machine 1, thereby making it possible to exchange the amount indicated by that bill to the number of credits at the PTS terminal 64.

Specifically, a bill is exchanged to the number of credits by means of the processing operations as described below.

First, when a bill is entered to the bill validator 115 of a gaming machine 1, a denomination of the bill is determined. For example, it is determined that the entered bill is Hong Kong dollars. As described above, the bill validator 115 of the gaming machine 1 is configured to be able to enter bills of different denominations. When the denomination of the entered bill is a specified one, it is exchanged to the number of credits according to the amount of money for the entered bill immediately by means of a predetermined conversion standard (by employing a conversion formula or the like). For example, in a case where the entered bill is Hong Kong dollars, it is exchanged to the number of credits according to the amount of money defined for that fill.

Alternatively, when the denomination of the entered bill is not the specified one, the amount of money for the entered bill is temporarily converted to the amount of money for a specific denomination, according to a rate at that time point. For example, it is converted to US dollars or from Japanese Yen to Hong Kong dollars. The rate at that time point are stored for each denomination in the RAM 243 of the PTS terminal 64, thereby making it possible to convert to the amount of money for a specific denomination.

Next, the amount of money that is converted to a specific denomination is exchanged to the number of credits by means of the predetermined conversion standard described above (by employing a conversion formula or the like). For example, the denomination of the entered bill is US dollars or Yens, first, the amount of money defined for that bill is converted to Hong Kong dollars. Next, the converted amount of money is exchanged to the number of credits.

As described above, when the amount of money is converted to different denomination, a fraction may occur to the amount of money after converted, depending on a rate. The amount of money after converted is stored in an IC card in order to impart a disadvantage to a player by means of conversion even if a fraction thus occurs to the amount of money after converted.

Figure 26:
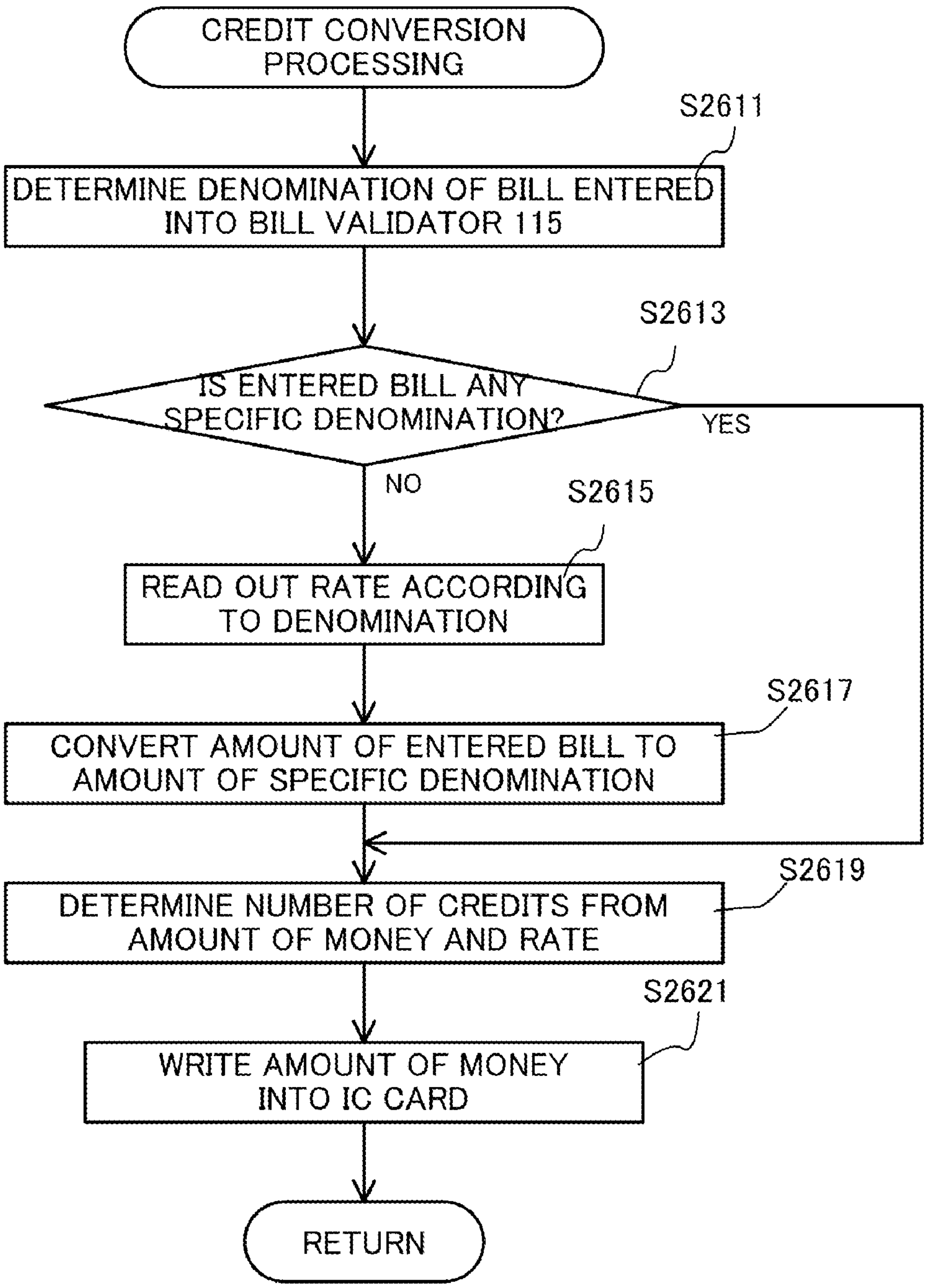
[FIG. 26] It is a flowchart showing a subroutine for converting to the number of credits in accordance with a denomination of a bill entered into a bill validator in the gaming machine on which the PTS terminal according to the embodiment of the present invention is mounted.

FIG. 26 is a flowchart of processing operations to be executed at the PTS terminal 64, showing a subroutine for converting bills to the amount of money for different denominations or to the number of credits, according to the denomination of the entered bill to a bill validator 115 of a gaming machine 1. This subroutine is invoked and executed when it is detected that a bill is entered to the bill validator 115.

First, a CPU 241 determines the denomination of the entered bill to the bill validator 115 of the gaming machine 1 (step S2611). Next, the CPU 241 determines whether or not the entered bill is a specific denomination (step S2613). When the CPU 241 determines that the entered bill is not the specific denomination (NO), the rate that is stored in the RAM 243 of the PTS terminal 64 is read out according to the denomination (step S2615). Next, the CPU 241 converts the amount of money for the entered bill to the amount of money for the specific denomination by employing the read out rate (step S2617).

When the CPU 241 determines that the entered bill is not the specific denomination in the determination processing of step S2613 described above (NO) or when the CPU 241 execute the processing operation of step S2617, the number of credits is determined from the amount of money indicated by the entered bill or the amount of money that is converted in the processing operation of step S2617 and the rate according to the denomination (step S2619). Lastly, the CPU 241 writes the amount of money into the IC card (step S2621) and then completes this subroutine.

Since the rate gradually varies, for example, it is preferable that the rate be stored in the RAM 243 of the PTS terminal 64 so as to be able to be updated to the latest one every predetermined time interval or every predetermined period of time. It is preferable that the value of the latest rate be transmitted from the external control device 200 to the PTS terminal 64.

Figure 27:
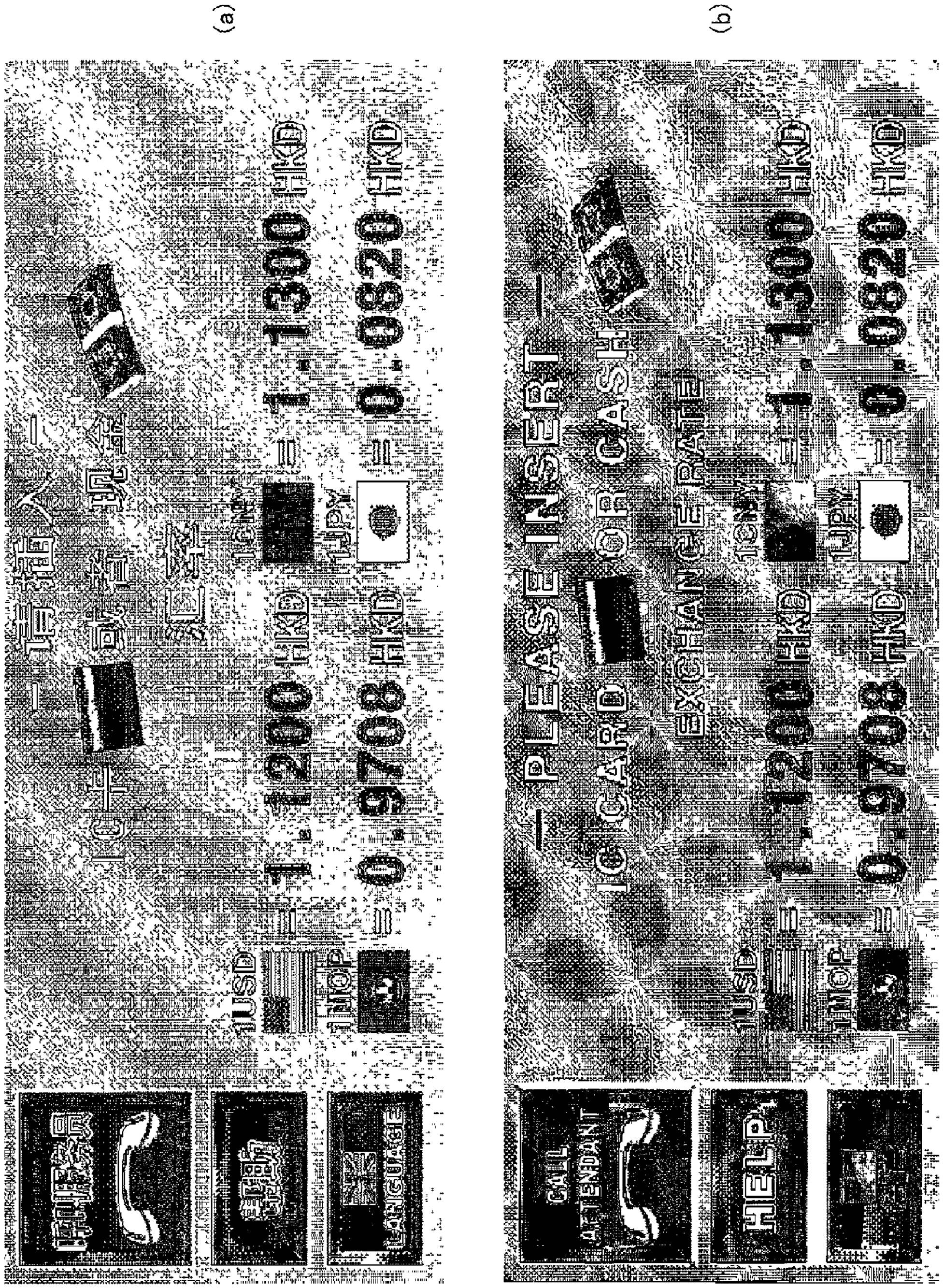
[FIG. 27] It is a view showing an example of a screen that is displayed in an LCD of the PTS terminal when a bill is entered into the bill validator in the gaming machine on which the PTS terminal according to the embodiment of the present invention is mounted.

FIG. 27 shows an example of a screen to be displayed on the LCD 253 of the PTS terminal 64 when a bill is entered to the bill validator 115 of the gaming machine 1. FIG. 26(*a*) shows a screen to be displayed prior to entering a bill, and a message in the Chinese language is displayed at an upper side of the screen. In addition, at a lower side of the screen, each of the rates of denominations in a case of exchange to Hong King dollars is displayed. Thus, each of the rates is defined up to four digits below a decimal point so as not to make a player disadvantageous by exchange of denomination. In addition, FIG. 26(*b*) shows a screen to be displayed when a US bill is entered. It is determined that the US bill is entered to the bill validator 115, and a message in the English language is displayed at an upper side of the screen.

As described above, each of the rates corresponding to a denomination is defined up to four digits below a decimal point. Thus, if a bill is converted by means of arithmetic processing of the CPU 241 of the PTS terminal 64, since the bill can be precisely exchanged, no disadvantage is imparted to a player; and however, there may be a case in which a fraction occurs to the amount of money by exchange of denomination. It is preferable that a value including the fraction that occurs be displayed on the LCD 253. In particular, it is preferable that the above value be displayed on the LCD 253 when a mini-game is executed by means of the processing operation of step S2115 to be described later. By doing this, it is possible to cause a player to recognize that the mini-game is executed due to the occurrence of the fraction.

In a case where the amount of money left in an IC card is thus extremely small as is the case with a fraction that occurs due to exchange of denomination, since adjustment is cumbersome, there is a possibility that a player attempts to intentionally leave the IC card at the gaming machine 1. However, in such a case, if a configuration is employed such that an alert due to failure to take an IC card is generated, there is a possibility that alerting frequently occurs. Thus, as described later, it is preferable that the amount of money that is stored in the IC card be intentionally varied by executing a mini-game.

In a subroutine of a mini-game, shown in FIG. 21, first, the CPU 241 reads out amount-of-money information from an IC card set at a load position (step S2111). Next, the CPU 241 determines whether or not the amount of money indicated by the read out amount-of-money information is equal to or less than a predetermined number, for example, is equal to or less than the number equivalent to one dollar that is the least adjustment unit (step S2113). When it is determined that the amount of money indicated by the read out amount-of-money information is greater than the predetermined number (NO), this subroutine is completed immediately.

Alternatively, in a case where the amount of money indicated by the read out amount-of-money information is equal to or less than the predetermined number (YES), the CPU 241 execute a mini-game at the PTS terminal 64 (step S2115). In the mini-game, it is preferable that the LCD 253 of the PTS terminal 64 be employed. For example, a mini-game adapted to select one from two cards is performed. In a case where a player selects a card with its greater number from among these two cards, the player becomes a winner, and as described later, the amount of money obtained by the amount of money indicated by the read out amount-of-money information×120% is defined as a new item of amount-of-money information, or alternatively, if a player selects a card with its smaller number, the player becomes a loser. As described later, in the case of losing in the mini-game, the IC card is housed inside of the PTS terminal 64 without being ejected from the card slot 262. A card selection can be made employing a signal issued from the touch panel 259 by a player touching the touch panel 259.

Next, the CPU 241 determines whether or not the player wins in the mini-game executed in step S2115 (step S2117). When the CPU 241 determines that the player loses in the mini-game (NO), the IC card is housed inside of the PTS terminal 64, as described above (step S2129), and this subroutine is completed. By doing this, in a case where the amount of money indicated by the amount-of-money information is equal to or less than the predetermined number, the card is not ejected from the card slot 262.

Alternatively, when the CPU 241 determines that the player wins in the mini-game in the determination processing of step S2117 (YES), the amount of money is increased by performing arithmetic processing of (amount of money indicated by the read out amount-of-money information)×120% (step S2119).

Next, the CPU 241 writes the amount-of-money information corresponding to the increased amount of money into the IC card (step S2121) and then transmits the amount-of-money information corresponding to the increased amount of money to the external control device 200 together with the card ID of the IC card (step S2123). In the external control device 200, the transmitted amount-of-money information is associated with the card ID and then is stored in the storage unit of the external control device 200.

Next, the CPU 241 converts the amount-of-money information to the number of credits (step S2125), transmits the converted number of credits to the gaming machine 1 (step S2127), and completes this subroutine. By doing this, a player having successfully increased the number of credits by playing the mini-game can continuously play a game. Alternatively, in a case where a player does not want to continue any more game, even if the number of credits is increased after the play of the mini-game, the player can complete the game by operating the TAKE WIN/COLLECT button 33 of the gaming machine 1.

In a case where the amount-of-money information corresponding to a certain degree of large amount of money in IC card is left, it is possible to image that there is a little possibility that a player fails to take the IC card unless in an case of emergency. However, in a case where the amount of money left in IC card is extremely small, it is assumed that there may be a player who leaves the IC card at the gaming machine 1 on purpose because adjustment is cumbersome, for example. Thus, in a case where a configuration is employed such that an alert due to failure to take IC card is generated, there is a possibility that alerting frequently occurs.

However, in a case where a player loses after executing the mini-game shown in FIG. 21 described above, the player is forced to agree that the IC card is housed inside of the PTS terminal 64. By doing this, it is possible to prevent an IC card from being left at the card slot 262 and to reduce the cumbersomeness or burden on the staff in gaming facility. In addition, since an IC card is housed inside of the PTS terminal 64, a next player can start the play of game at that gaming machine 1 immediately without any delay, and workability of the gaming machine 1 can be enhanced.

Further, in spite of the fact that only a small amount of money is left in IC card, in a case where the IC card is ejected from the PTS terminal 64 and then a player remove that IC card, since only the small amount of money is left, there is also a possibility that the player cannot feel the value of that IC card and then discard the IC card. Thus, when the player discards the IC card, fewer IC cards are available in gaming facility. Therefore, in gaming facility, in order to resupply IC cards, there has been need to newly purchase the IC cards. However, in a case where the player loses after executing the mini-game, the IC card housed inside of the PTS terminal 64, thereby making it possible for gaming facility to re-collect the IC card available. The re-collected IC card is reused in gaming facility, thereby making it possible to reduce costs required for IC cards as well.

Alternatively, in a case where the amount of money in IC card is increased by means of mini-game, the value of the IC card is enhanced, causing a player to actively recognize the presence of the IC card and then making it possible to prevent failure to take the IC card.

<<IC Card Initialization/Resupply Processing>>

Figure 23:
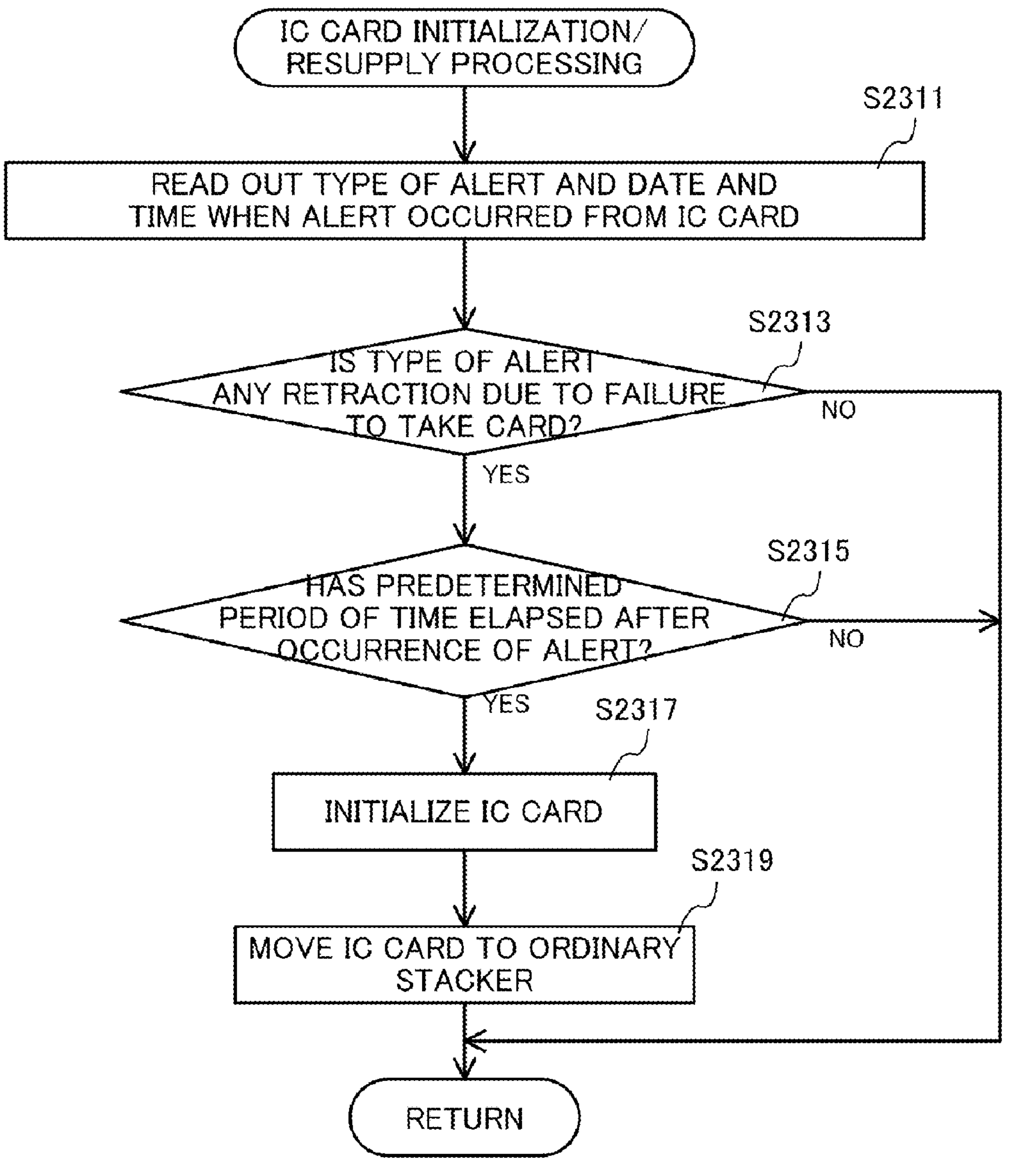
[FIG. 23] It is a flowchart showing a subroutine of IC card initialization/resupply processing that is employed at the PTS terminal according to the embodiment of the present invention.

FIG. 23 is a flowchart showing a subroutine for initializing an IC card targeted to be alerted and then newly resupplying the initialized IC card to an ordinary stacker. This processing operation is invoked and executed when game is not played over a predetermined period of time, for example, for 10 minutes or more, at a gaming machine 1. By doing this, the processing operation of initializing or resupplying the IC card can be executed without preventing the game to be played at the gaming machine 1.

First, a CPU 241 carries a IC card that is housed in an alert stacker, to a load position, and reads out a type of alert and the date and time when the card is targeted to be alerted, from the IC card (step S2311). As described above, the IC card that is housed in the alert stacker is targeted to be alerted.

The CPU 241 determines that a type of alert of which an IC card is targeted to be alerted is due to failure to take the IC card (step S2313). When the type of alert is not due to failure to take the IC card (NO), this subroutine is completed immediately. While the alert related to the IC card is due to another reason, the IC card initialization/resupply processing is performed only in a case where a player leaves an IC card at the card slot 262. This is because, in another type of alert, it may be possible to be inadequate to initialize and reuse the IC card. For example, this is because a case or the like in which an IC card may fail from the viewpoint of hardware, for example, is eliminated.

Alternatively, when the type of alert is due to failure to take the IC card (YES), the CPU 241 determines whether or not a predetermined period, for example, one month has elapsed from the date and time when the card is targeted to be alerted (step S2315). When it is determined that the predetermined period has not elapsed from the date and time when the card is targeted to be alert (NO), this subroutine is completed immediately. In a case where the predetermined period has not elapsed, there is a possibility that a player makes inquiry as to the left IC card; and therefore, it is preferable that the IC card be targeted to be initialized after elapse of the predetermined period.

Alternatively, when the CPU 241 determines that the predetermined period has elapsed from the date and time when the card is targeted to be alerted (YES), the CPU 241 initializes the IC card that exists at the load position (step S2317). In a predetermined storage region of the IC card, items of information are stored. FIG. 24 is a view of a table showing an example of the information that is stored in the predetermined storage region of the IC card. In the example shown in FIG. 24, the IC card stores the card ID (identification information described above), amount-of-money information, types of alert, date and time of alert, identification numbers of gaming machines and the like. Among them, the IC card can be initialized by eliminating information other than the card ID. The IC card is thus initialized, thereby making it possible to reuse the IC card in that gaming facility.

Next, the CPU 241 carries the IC card from the load position to the ordinary stacker and then resupplies the carried IC card as a new IC card to the ordinary stacker (step S2319). By doing this, the gaming facility can resupply the IC card without need to newly purchase an IC card, thus making it possible to reduce costs required for IC cards. In addition, the IC cards can be resupplied without need to open the gaming machine 1, thus making it possible to enhance safety and to prevent the resupply work of the IC cards from being complicated.

<<Execution Processing of Mini-Game 2>>

Figure 28:
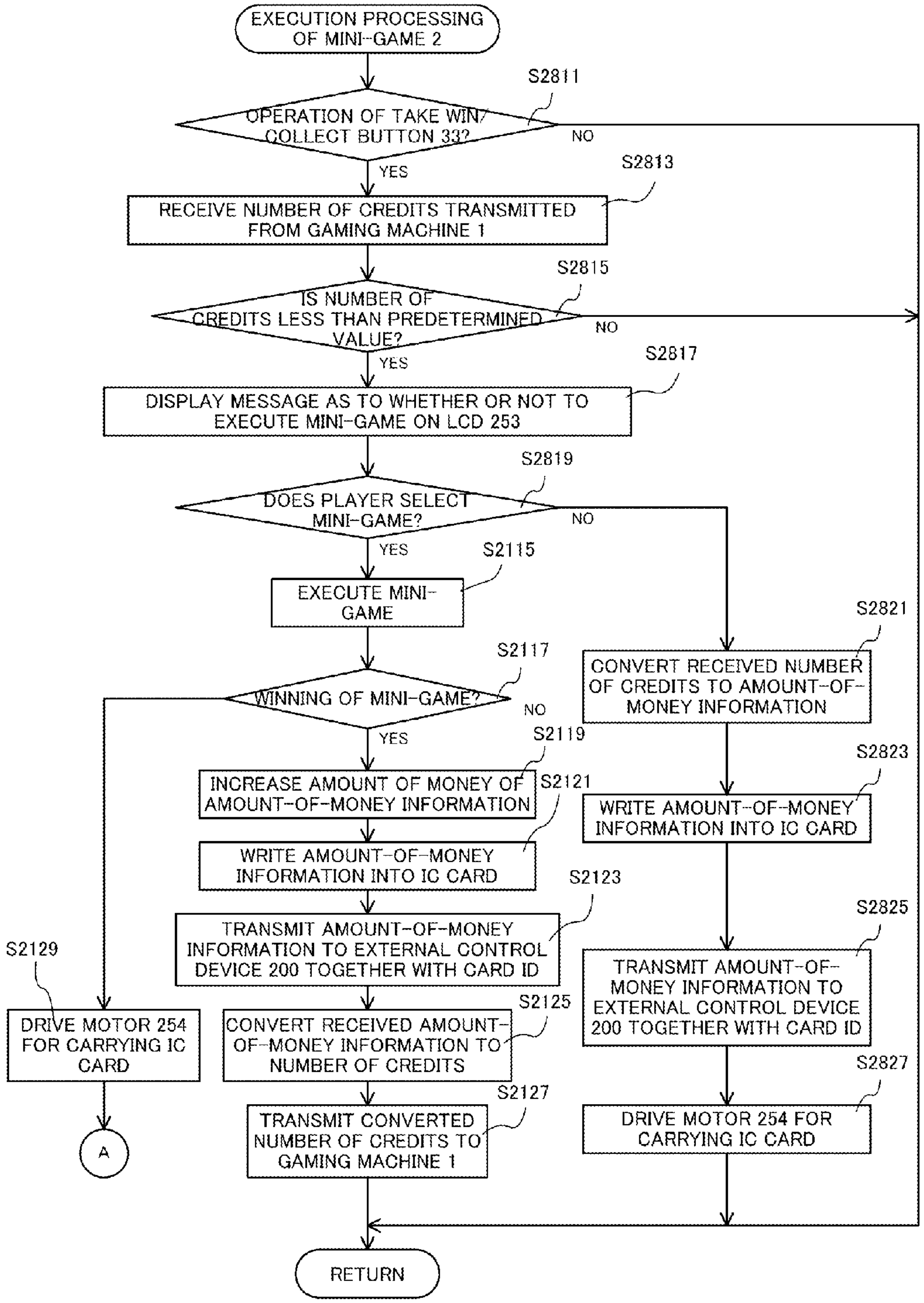
[FIG. 28] It is a flowchart showing a subroutine of processing in a mini-game 2 that is performed at the PTS terminal according to the embodiment of the present invention.

FIG. 28 is a flowchart showing a subroutine for executing a mini-game 2 to be invoked and executed in the processing operation of step S1943 in FIG. 19 described above. This mini-game 2, like the mini-game 1, is executed at a PTS terminal 64. The same steps of performing processing, which are similar to those in the mini-game 1 shown in FIG. 21 are designated by the same reference numerals.

First, a CPU 241 determines whether or not a player operates a TAKE WIN/COLLECT button 33 of a gaming machine 1 (step S2811). When the CPU 241 determines that the player does not operate the TAKE WIN/COLLECT button 33 of the gaming machine 1 (NO), this subroutine is completed immediately.

When the CPU 241 determines that the TAKE WIN/COLLECT button 33 is operated in the determination processing of step S1925 (YES), the CPU 241 receives the number of credits that is transmitted from the gaming machine 1 (step S2813). Next, the CPU 241 determines whether or not the received number of credits is less than a predetermined value (step S2815). When the CPU 241 determines that the received number of credits is equal to or greater than the predetermined value (NO), this subroutine is completed immediately.

Alternatively, when the CPU 241 determine that the received number of credits is less than the predetermined value (YES), a message indicating whether or not to execute a mini-game is displayed on the LCD 253 (step S2817). Next, the CPU 241 determines whether or not a player selects a mini-game (step S2819). When the CPU 241 determines that the player selects the mini-game (YES), the routine is reverted to step S2115. The processing operations of step S2115 to step S2129 shown in FIG. 28 are identical to those in the mini-game 1 shown in FIG. 21. The determination processing of step S2819 can be performed by employing a signal issued from the touch panel 259 by a player touching the touch panel 259.

When the CPU 241 determines that the player does not select the mini-game (NO), the number of credits that is transmitted from the gaming machine 1 is converted to the amount of money and then amount-of-money information is generated in the processing operation of step S2813 (step S2821). Next, the CPU 241 writes the generated amount-of-money information into the IC card (step S2823), transmits the written amount-of-money information including the card ID to the external control device 200 (step S2825), drives the IC card carrying motor 254 to carry the IC card to the eject position (step S2827), and then, completes this subroutine.

By doing this, if a player does not play the mini-game, even in a case the number of credits is less than the predetermined value, the amount-of-money information is stored in the IC card and then the IC card is returned to the player. By doing this, even if the amount of money is small, cash is returned to the player, and thus, no disadvantage is imparted to the player.

It is preferable that the predetermined value employed in the determination processing of step S2815 described above be able to be set at each of the gaming machines 1. For example, it is preferable to employ a configuration in which a predetermined value setting change switch is connected to a connection portion 244 of the PTS terminal 64. By doing this, the predetermined value can be variably determined by operating the predetermined value setting change switch.

The predetermined value can be set at each of the gaming machine 1, whereby player's preference at the gaming machine 1 can be reflected. For example, the predetermined value is set to be high in the case of a gaming machine for high roller. By doing this, the balance of the IC card can be increased to some extent, and thus, even in the case of a player at the gaming machine for high roller, a possibility of discarding the IC card can be lowered.

<<Credit Conversion Processing>>

Figure 29:
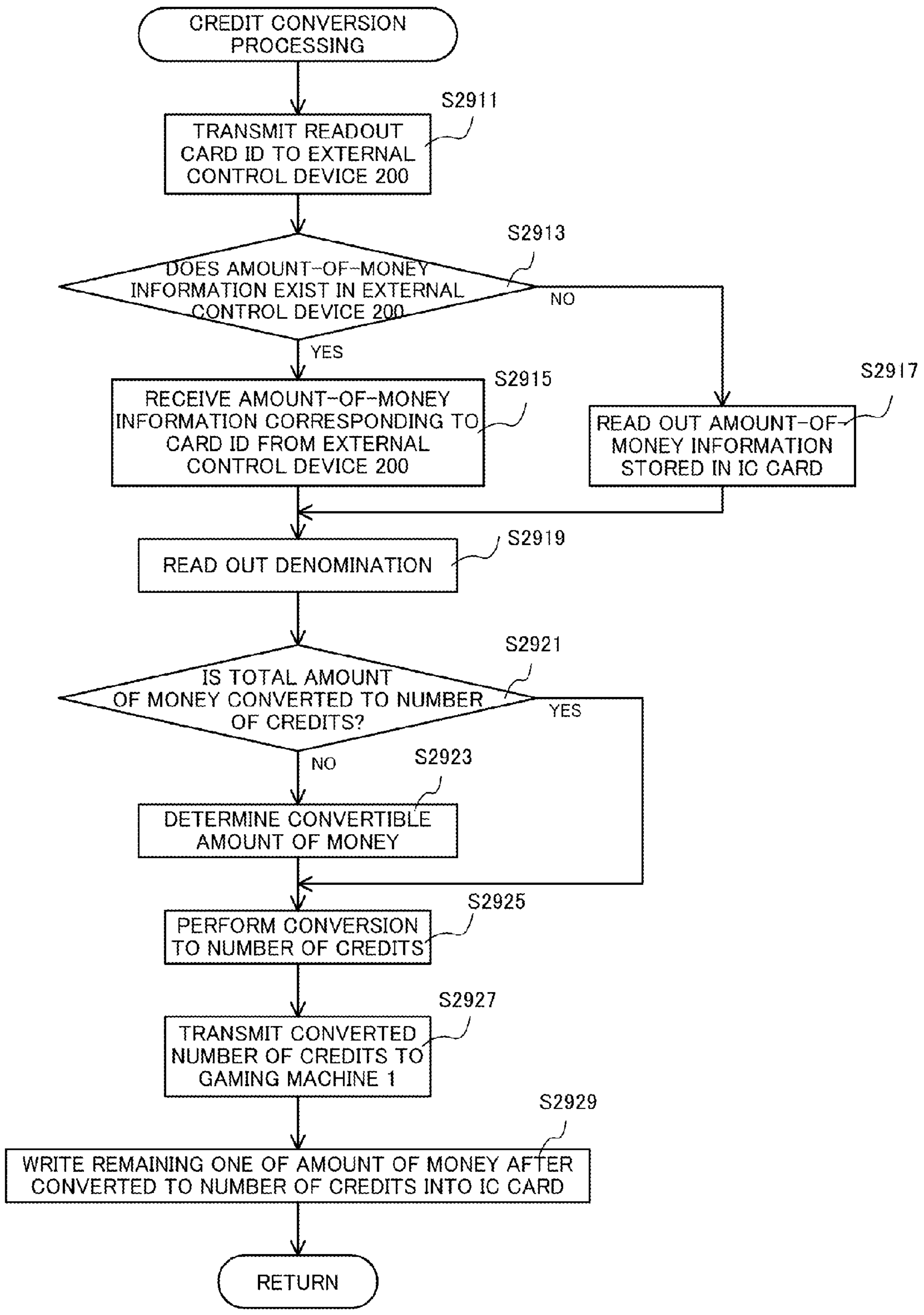
[FIG. 29] It is a flowchart showing a subroutine of credit conversion processing that is executed at the PTS terminal according to the embodiment of the present invention.

FIG. 29 is a flowchart showing a subroutine of credit conversion processing to be invoked and executed in the processing operation of step S1917 in FIG. 19 described above.

First, a CPU 241 transmits a card ID that is read out from an IC card to an external control device 200 (step S2911). The external control device 200 receives the card ID, reads out amount-of-money information corresponding to the card ID, and transmits a PTS terminal 64 from which the card ID is transmitted.

When the card ID is transmitted, the external control device 200 searches for amount-of-money information associated with the card ID by employing the card ID and then determines whether or not the amount-of-money information is associated with the card ID is stored in a storage unit of the external control device 200. When the amount-of-money information that is associated with the card ID is stored, the amount-of-money information is transmitted to the PTS terminal 64. Alternatively, the amount-of-money information is not stored, information indicative of the fact that the information is not is transmitted to the PTS terminal 64.

In gaming facility, a plurality of gaming machines 1 is installed. A player often searches for his or her favorite one from among the plurality of gaming machines 1 by playing game while changing the gaming machines 1 from one to another. Thus, after a game has been played at one gaming machine 1, in a case where a game is played at another gaming machine 1, the amount-of-money information obtained when the game is played at one gaming machine 1 is already stored in the storage unit of the external control device 200. Thus, in a case where the game is played at another gaming machine 1, the amount-of-money information that is stored in the storage unit of the external control device 200 is invoked at such another gaming machine 1, thus making it possible to appropriately manage the amount-of-money information in the external control device 200 and to prevent illegal act in advance.

Next, the CPU 241 determines whether or not amount-of-money information exists in the external control device 200 (step S2913). When the CPU 241 determines that the amount-of-money information exists in the external control device 200 (YES), the CPU 241 receives the amount-of-money information that is transmitted from the external control device 200 (step S2915). Alternatively, when the CPU 241 determines that the amount-of-money information does not exist in the external control device 200 (NO), the CPU 241 reads out the amount-of-money information that is stored in the IC card (step S2917).

Next, the CPU 241 reads out denomination that is stored in a RAM 73 of a gaming machine 1 (step S2919). Denomination means a minimum unit of a bet on one game. It is preferable that the denominations in the embodiment be denominations of currency values. As the denominations of currency values, for example, there can be exemplified 0.001 Hong Kong dollar, 0.01 Hong Kong dollar, and 0.1 Hong Kong dollar or the like. By defining denominations at each of the gaming machines, the lowest bet or game unit price that is different depending on such each gaming machine can be set. In this manner, a player can enjoy a game with a small amount of wages for betting over a long period of time or can enjoy a game by selecting a gaming machine, according to a player owned amount of money while aiming to get getting rich quick with a large amount of wages for betting.

It is preferable that denominations be determined by means of the external control device 200, the determined denominations be transmitted from the external control device 200 to a gaming machine 1, and the transmitted denominations be stored in the RAM 73 of the gaming machine 1.

Next, the CPU 241 determines whether or not all of the amount of money indicated by the amount-of-money information that is received in the processing operation of step S2915 or all of the amount of money indicated by the amount-of-money information that is read out from the card ID in the processing operation of step S2917 can be converted to credits (step S2921). In a case where the amount of money that cannot be converted to the credits is included (NO), that is, in a case where a fraction occurs in units of credits, the maximum amount of money that can be converted to the credits is determined (step S2923).

In a case where the amount of money that cannot be converted to the credits is not included (YES) or when executing the processing operation of step S2923, the CPU 241 converts the convertible amount of money to the credits, according to the denominations read out in the processing operation of step S2919 (step S2925) and then transmits the converted number of credits to the gaming machine 1 (step S2927). Further, the CPU 241 writes the amount of money that could not be converted to the credits, that is, the remaining amount of money from among the converted amount of money into the IC card (step S2929) and then completes this subroutine.

<<Sports Book Function>>

The PTS terminal 64 also has a function of performing sports book. The sports book is a game that is organized to mainly place a bet in order to predict a win or loss of sports (such as baseball, succor, basketball, or tennis, for example). In the present specification, targets for betting may be a variety of events without being limitative to the sports as long as the win or loss or ranking can be clarified.

As described above, the PTS terminal 64 has a communication interface 245. The PTS terminal 64 is connected to be able to communicate with a sports book management server 1300 and a broadcast transmission server 1310 via a network of a casino system 1000 shown in FIG. 30. The sports book management server 1300 corresponds to an "event management server", the broadcast transmission server 1310 corresponds to a "broadcast transmission server", and the communication interface 245 corresponds to a "communication device".

The casino system 1000 is provided with a management server block 1220, a customer terminal clock 1221, and a staff terminal block 1222.

The management server block 1220 is provided with a casino hall server 1261, a money exchange server 1262, a casino/hotel staff management server 1260, a members management server 1264, an IC card/cash management server 1265, a megabucks server 1266, and an image server 1267.

The casino hall server 1261 is a server for summing the cash flow in casino, preparing a balance sheet, and managing each server in the management server block 1220. The money exchange server 1262 is a server for acquiring money exchange information from the outside (network line 1015) via the communication 1223. The casino/hotel staff management server 1260 is a server for performing work management of the staff working in casino/hotel or grasping the current position of the staff in casino or the like. The members management server 1264 is a server for performing management of members information such as privacy information or past game results. The IC card/cash management server 1265 is a server for summing the sales by means of cashless IC card. The megabucks server 1266 is a server for performing management of cumulative values for progressive awarding or determination of progressive awarding. The image server 1267 is a server for storing and managing images of the staffs' or players' faces that are packed up by mean of the camera that is provided in casino.

The customer terminal block 1221 is provided with: a gaming machine 1 having a player tracking system (PTS) terminal 64 incorporated therein; and a adjustment machine 1268. The gaming machine 1 is connected to the management server block 1220 via the PTS terminal 64 by means of network. In the embodiment, for one gaming machine 1 one PTS terminal 64 that is part of the cabinet thereof is provided.

The staff terminal block 1222 is provided with a staff management terminal 1269 and a members' card issuance terminal 1270. The staff management terminal 1269 is controlled by means of the casino/hotel staff management server 1260. The staff management terminal 1269 is adapted to transmit information to a Personal Digital Assistant (PDA) (not shown) or the like that is hand-held by the staff, or alternatively, to start communication with a cellular phone that is hand-held by the staff, based on a signal that is received from the casino/hotel staff management server 1260.

The members' card issuance terminal 1270 is provided with a camera, and picks up a face of a player who receives issuance of an IC card at the time of issuance of a members' card (IC card). The picked up image is stored in the image server 1267 after associated with a customer ID. In addition, the members' privacy information that is input at the time of issuance of the members' card or at the time of member registration is stored in the members management server 1264 after associated with a customer ID.

The sports book management server 1300 is connected to the network line 1015 described above. The sports book management server 1300 manages an event selected by a player, the prediction and result, or the bet amount and the like, stores prize magnifications (so called odds) relative to the result of the event, and computes prize money, based on the bet amount that is transmitted from the player. The terminal device that is connected to the network line 1015 is not limitative to the PTS terminal 64, and can be employed as a general-purpose device such as a personal computer or a cellular phone.

In addition, when data indicative of a bet amount is transmitted, the sports book management server 1300 provides an access to the cash management server 1265, and transmits information indicative of the fact that the amount of money according to the bet amount is subtracted to the cash management server 1265. Further, in a case where a player's prediction and an actual result are matched, information indicative of the fact that the amount of prize money according to the prize money is added is transmitted to the cash management server 1265. The information relating to the amount of prize money may be transmitted to a management server that is managed or owned by a variety of financial institutes in place of being transmitted to the cash management server 1265.

Figure 30:
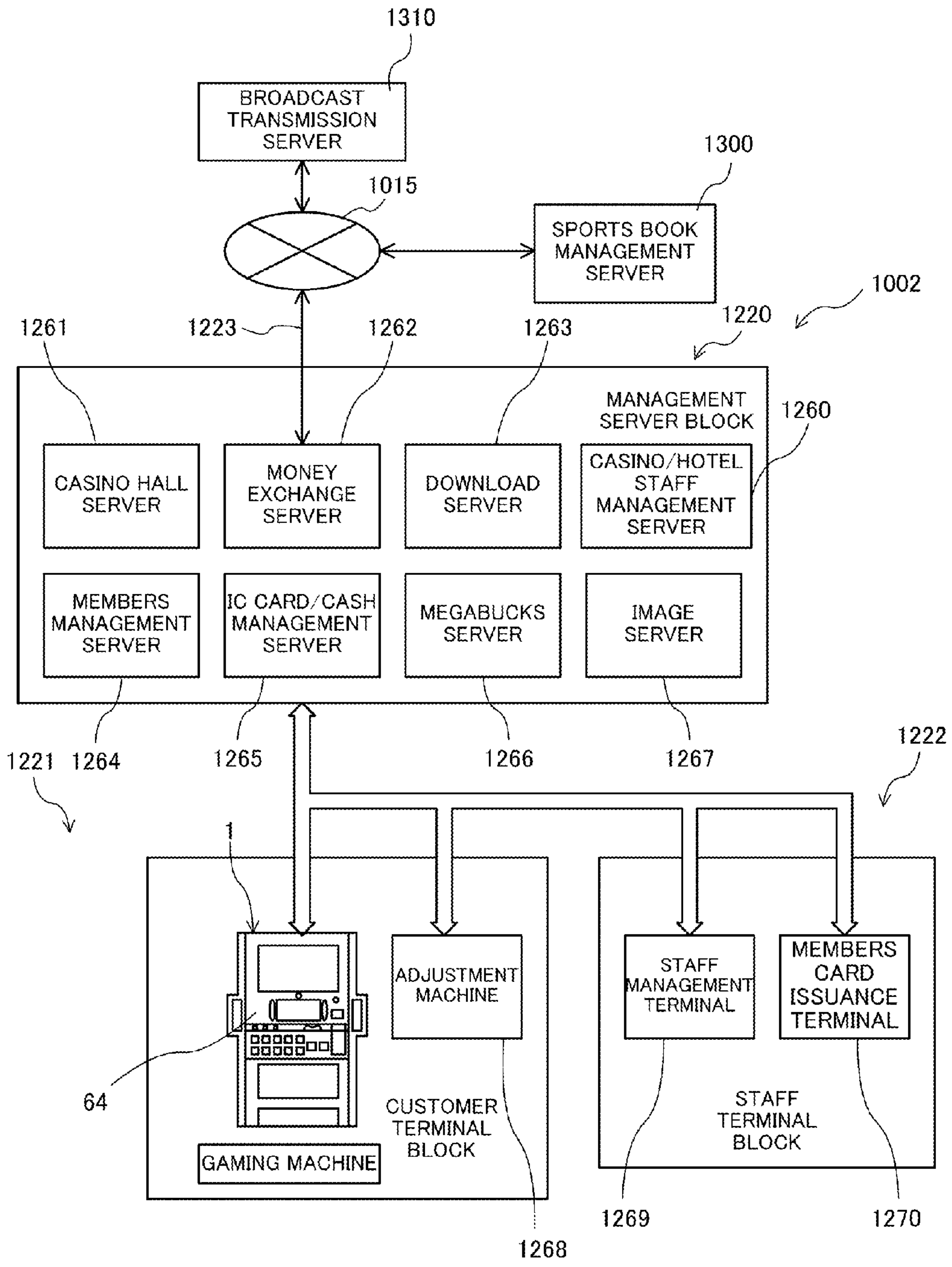
[FIG. 30] It is a block diagram depicting a schematic of a casino system 1000 shown in FIG. 30, according to the embodiment of the present invention.

While, in the diagram depicted in FIG. 30, it was shown that the sports book management server 1300 was connected to the network line 1015, the sports book management server 1300 may be provided in the management server block 1220 in such a manner that the staff in casino directly manages or owns the sports book management server 1300. In any case, a communication function of the PTS terminal 64 may be employed to be thereby able to communicate with the sports book management server 1300.

In addition, the broadcast transmission server 1310 is connected to the network line 1015 described above. The broadcast transmission server 1310 transmits data of real situation broadcast of an event selected by a player, to the PTS terminal 64. The data of the real situation broadcast includes image data, voice data, and character data. It is sufficient if the data of real situation broadcast be data that enables a player to recognize a real situation of the event selected by the player at the PTS terminal 64.

Figure 31:
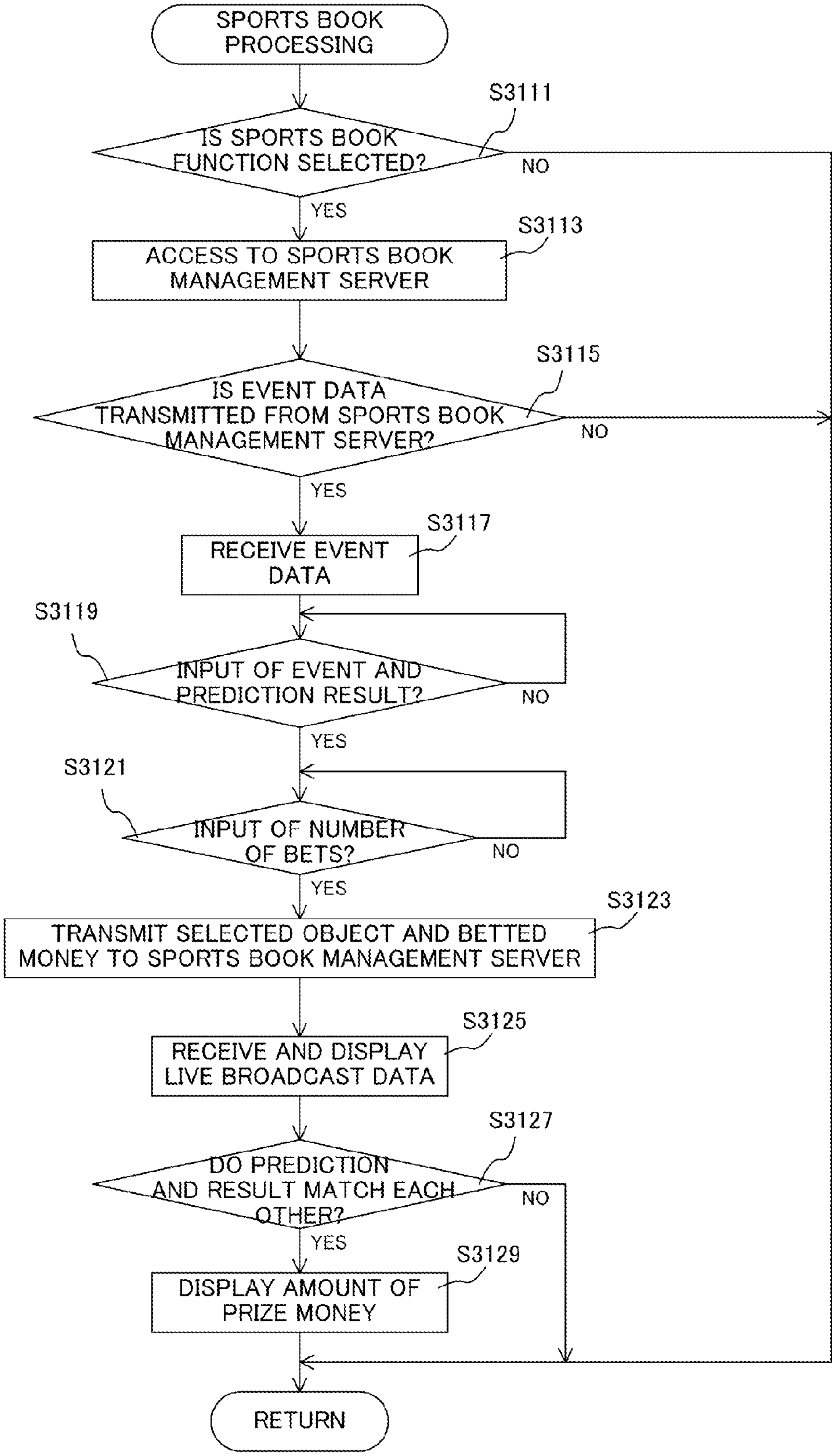
[FIG. 31] It is a flowchart showing a subroutine of sports book processing that is executed at the PTS terminal according to the embodiment of the present invention.

FIG. 31 is a flowchart showing a subroutine of sports book processing to be executed at a PTS terminal 64.

First, a CPU 241 determines that a sports book function selected by a player operating a touch panel 259 of a PTS terminal 64 (step S3111). As described above, the touch panel 259 is disposed to be superimposed on an LCD 253. When a player touches the touch panel 259 with his or her finger, positional information that is indicative of the thus touched position is output from the touch panel 259. By means of this positional information, the touched position on the touch panel 259 can be acquired. The touch panel 259 corresponds to an "input device".

A menu image for selecting a variety of processing operations is displayed on the LCD 253 of the PTS terminal 64. When the menu screen is displayed, a sports book can be selected by the player touching a region indicative of the sports book from the menu image. When it is determined that the player does not selected the sports book (NO), this subroutine is completed immediately.

Alternatively, when it is determined that the player selects the sports book (YES), the CPU 241 transmits predetermined data via a network line 1015 and then provides an access to a sports book management server 1300 (step S3113). This is to check to see if the PTS terminal 64 is capable of communicating with the sports book management server 1300.

Next, the CPU 241 determines whether or not event data that can be targeted to be betted at that time point is transmitted from the sports book management server 1300 (step S3115). When it is determined that the event data that can be targeted to be betted is not transmitted (NO), that is, when communication with the sports management server 1300 is disabled, this subroutine is completed immediately.

Alternatively, when it is determined that the event data that can be targeted to be betted is transmitted (YES), the CPU 241 receives the transmitted event data and then displays on the LCD 253 a list of events that can be targeted to be betted (step S3117). Next, the CPU 241 determines whether or not an event and its related prediction and result are input by a player operating the tack panel 259 (step S3119). When it is determined that the player does not input the event and its related prediction and result (NO), the routine is reverted to step S3119.

Alternatively, when it is determined that the player inputs the event and its related prediction and result (YES), the CPU 241 determines whether or not a bet amount is input by the player operating the touch panel 259 (step S3121). When it is determined that the bet amount is not input (NO), the routine is reverted to step S3121.

When it is determined that the player inputs the bet amount (YES), the CPU 241 transmits the event selected by the player, its related prediction and result, and the bet amount to the sports book management server 1300 together with identification information for identifying players (step S3123). The sports book management server 1300 causes a type of an event, its related prediction and result, and the bet amount that are input from the PTS terminal 64, to be associated with the player identification information, and stores them in a database (not shown).

Next, data of a real situation broadcast of the event selected by the player is received from the broadcast transmission server 1310 via the network line 1015, and the real situation broadcast is displayed on the LCD 253 or is output from a speaker 257. For example, a player selects a baseball event the broadcast transmission server 1310 transmits real situation broadcast data of the baseball to a PTS terminal 64. The CPU 241 displays the real situation broadcast data that is transmitted from the broadcast transmission server 1310 on the LCD 253 or outputs the data from the speaker 257 (step S3125). The LCD 253 or the speaker 257 corresponds to a "broadcasting device".

The real situation broadcast data to be transmitted from the broadcast transmission server 1310 may be character data in addition to image data or voice data. It is sufficient if the broadcast transmission server 1310 transmit data by means of the PTS terminal 64 in such a manner that a player can recognize a real situation of the event selected by the player. By doing this, it is possible for the player to watch the real situation of the target event that selected by the player, using the PTS terminal 64, and to grasp the situation of his or her selected event while playing a game at a gaming machine 1. While the real situation broadcast data is transmitted from the broadcast transmission server 1310, the event selected by the player advances.

Afterwards, when the event selected by the player completes, the sports book management server 1300 determines whether or not the player prediction and actual result is matched (step S3127). This judgment is a processing operation of determining whether or not the player prediction and actual result of the event are matched. When the player prediction and actual result are matched (YES), the sports book management server 1300 transmits the amount of prize money according to a bet amount, and the CPU 241 displays the amount of prize money that is transmitted from the sports book management server 1300, on the LCD 253 (step S3129), and then, completes this subroutine. When the player prediction and actual result are not matched (NO), this subroutine is completed immediately.

While the example described above showed a case in which the cash management server 1265 or financial institute manages or owns information relating to the amount of prize money, information relating to the amount of prize money, which is transmitted from the sports book management server 1300 to a PTS terminal 64, may be stored in an IC card via an IC card R/W 258 of the PTS terminal 64. By storing the information in the IC card, a player can bet the prize money that is acquired by sports book in order to play a game at a gaming machine 1, enabling the player to play the game at the gaming machine 1 over a long period of time.

The invention claimed is:

1. A device for reading information data storage medium, comprising:

a player detection device for detecting a presence of a player playing at a gaming machine;

a carrying device for carrying a removable information data recording medium to a housing position or an eject position;

a recording medium detection device for detecting that the information data recording medium exists at the eject position;

a reader/writer for reading or writing amount-of-money information relating to a cash for a game to be played at a gaming machine from or into the information data recording medium; and a controller that is programmed to execute processing operations of:

(A) determining whether or not the information data recording medium exists at the eject position by means of the recording medium detection device;

(B) determining whether or not the player exists by means of the player detection device;

(C) carrying the information data recording medium from the eject position to the housing position by means of the carrying device when it is determined that the information data recording medium exists at the eject position and when it is determined that the player does not exist;

(E) writing the amount-of-money information relating to the cash for the game to be played at the gaming machine into the information data recording medium;

(F) executing a mini-game when an amount of money indicated by the amount-of-money information that is written into the information data recording medium is less than a predetermined number, and according to a result of the executed mini-game, changing the amount-of-money information; and (G) carrying the information data recording medium to the eject position by means of the carrying device when the amount of money indicated by the amount-of-money information that is written into the information data recording medium is equal to or greater than the predetermined number.

2. The device for reading information data storage medium, according to claim 1, further comprising an alert output device for outputting alert information, wherein the controller is programmed to execute a processing operation of:

(D) outputting alert information from the alert output device when it is determined that the information data recording medium exists at the eject position and when it is determined that the player does not exist.

3. The device for reading information data recording medium, according to claim 1, wherein the controller is programmed to execute a processing operation of (H) converting a cash that is entered into a gaming machine to amount-of-money information, according to a rate corresponding to a predetermined denomination.

* * * * *